US012608010B2

(12) United States Patent (10) Patent No.: US 12,608,010 B2
Zhu et al. (45) Date of Patent: Apr. 21, 2026

(54) OBJECTIVE-BASED CONTROL OF AN AUTONOMOUS UNMANNED AERIAL VEHICLE

(71) Applicant: Skydio, Inc., San Mateo, CA (US)

(72) Inventors: Jack Louis Zhu, San Mateo, CA (US); Hayk Martirosyan, San Francisco, CA (US); Abraham Bachrach, Emerald Hills, CA (US); Matthew Donahoe, Redwood City, CA (US); Patrick Lowe, Palo Alto, CA (US); Kristen Marie Holtz, Menlo Park, CA (US); Adam Bry, Redwood City, CA (US)

(73) Assignee: Skydio, Inc., San Mateo, CA (US)

( * ) Notice: Subject to any disclaimer, the term of this patent is extended or adjusted under 35 U.S.C. 154(b) by 206 days.

(21) Appl. No.: 18/356,332

(22) Filed: Jul. 21, 2023

(65) Prior Publication Data

US 2024/0053771 A1 Feb. 15, 2024

Related U.S. Application Data

(63) Continuation of application No. 17/360,495, filed on Jun. 28, 2021, now Pat. No. 11,755,041, which is a (Continued)

(51) Int. Cl.
G05D 1/00 (2024.01)
G06T 7/20 (2017.01)
(Continued)

(52) U.S. Cl.
CPC ............. *G05D 1/12* (2013.01); *G05D 1/0094* (2013.01); *G05D 1/101* (2013.01); *G06T 7/20* (2013.01); *H04N 5/272* (2013.01); *H04N 23/695* (2023.01); *B64U 2201/10* (2023.01); *B64U 2201/104* (2023.01); *G06T 2207/30241* (2013.01); *G06T 2207/30261* (2013.01)

(58) Field of Classification Search
None
See application file for complete search history.

(56) References Cited

U.S. PATENT DOCUMENTS 5,155,683 A 10/1992 Rahim
5,701,408 A 12/1997 Cornell et al.
(Continued)

*Primary Examiner* — Daniel L Greene

(57) ABSTRACT

Techniques are described for controlling an autonomous vehicle (AV) using objective-based inputs. The underlying functionality of an autonomous navigation system can be is exposed via an application programming interface (API) or similar methodology allowing the UAV to be controlled through specifying a behavioral objective, for example, using a call to the API to set parameters for the behavioral objective. The autonomous navigation system can then incorporate perception inputs such as sensor data from sensors mounted to the UAV and the set parameters using a multi-objective motion planning process to generate a proposed trajectory that most closely satisfies the behavioral objective in view of certain constraints. Developers can utilize the API to build customized applications for the AV. Such applications, also referred to as "skills," can be developed, shared, and executed to control behavior of an autonomous AV.

19 Claims, 28 Drawing Sheets

Related U.S. Application Data continuation of application No. 16/240,394, filed on Jan. 4, 2019, now Pat. No. 11,048,277.

(60) Provisional application No. 62/621,243, filed on Jan. 24, 2018.

(51) Int. Cl.
| | |
|---|---|
| *H04N 5/272* | (2006.01) |
| *H04N 23/695* | (2023.01) |

(56) References Cited

U.S. PATENT DOCUMENTS

| | | | | |
|---|---|---|---|---|
| 6,748,325 | B1 | 6/2004 | Fujisaki | |
| 6,975,246 | B1 * | 12/2005 | Trudeau | G01S 13/89 |
| | | | | 340/555 |
| 8,591,161 | B1 | 11/2013 | Bernhardt | |
| 8,948,932 | B2 | 2/2015 | Yeager et al. | |
| 9,766,622 | B1 | 9/2017 | Yang et al. | |
| 10,168,674 | B1 | 1/2019 | Buerger et al. | |
| 10,361,802 | B1 | 7/2019 | Hoffberg-Borghesani et al. | |
| 10,996,683 | B2 | 5/2021 | O'Flaherty et al. | |
| 11,307,584 | B2 | 4/2022 | Jobanputra et al. | |
| 11,829,139 | B2 | 11/2023 | Jobanputra et al. | |
| 2004/0068415 | A1 | 4/2004 | Solomon | |
| 2005/0004723 | A1 | 1/2005 | Duggan et al. | |
| 2006/0184292 | A1 | 8/2006 | Appleby et al. | |
| 2011/0044541 | A1 * | 2/2011 | Kress | G06T 7/0002 |
| | | | | 382/168 |
| 2012/0166411 | A1 * | 6/2012 | MacLaurin | G06F 16/951 |
| | | | | 707/706 |
| 2012/0235885 | A1 | 9/2012 | Miller et al. | |
| 2012/0280087 | A1 | 11/2012 | Coffman et al. | |
| 2012/0303179 | A1 * | 11/2012 | Schempf | F41H 7/005 |
| | | | | 701/2 |
| 2014/0316616 | A1 | 10/2014 | Kugelmass | |
| 2014/0324253 | A1 | 10/2014 | Duggan et al. | |
| 2016/0125739 | A1 | 5/2016 | Stewart et al. | |
| 2016/0241767 | A1 | 8/2016 | Cho et al. | |
| 2016/0373655 | A1 * | 12/2016 | Kobayashi | H04N 23/62 |
| 2017/0076194 | A1 | 3/2017 | Versace et al. | |
| 2017/0097640 | A1 | 4/2017 | Wang et al. | |
| 2017/0127652 | A1 | 5/2017 | Shen et al. | |
| 2017/0329324 | A1 | 11/2017 | Bachrach et al. | |
| 2018/0129211 | A1 | 5/2018 | Vidyadharan et al. | |
| 2018/0157252 | A1 * | 6/2018 | Lee | G05D 1/0038 |
| 2018/0196435 | A1 | 7/2018 | Kunzi et al. | |
| 2018/0241936 | A1 | 8/2018 | Li et al. | |
| 2018/0246529 | A1 | 8/2018 | Hu et al. | |
| 2018/0290748 | A1 | 10/2018 | Corban et al. | |
| 2018/0356823 | A1 | 12/2018 | Cooper | |
| 2018/0362190 | A1 | 12/2018 | Chambers et al. | |
| 2019/0003862 | A1 | 1/2019 | Reed et al. | |
| 2019/0011908 | A1 | 1/2019 | Liu et al. | |
| 2019/0049968 | A1 | 2/2019 | Dean et al. | |
| 2019/0064794 | A1 | 2/2019 | Chen | |
| 2019/0068829 | A1 | 2/2019 | Van Schoyck et al. | |
| 2019/0068962 | A1 | 2/2019 | Van Schoyck et al. | |
| 2019/0158755 | A1 | 5/2019 | Chou et al. | |
| 2019/0250601 | A1 | 8/2019 | Donahoe et al. | |
| 2019/0250640 | A1 | 8/2019 | O'Flaherty et al. | |
| 2019/0259108 | A1 | 8/2019 | Bongartz et al. | |
| 2019/0377345 | A1 | 12/2019 | Bachrach et al. | |
| 2019/0378423 | A1 | 12/2019 | Bachrach et al. | |
| 2020/0019189 | A1 | 1/2020 | Chen et al. | |
| 2021/0089040 | A1 | 3/2021 | Ebrahimi et al. | |

* cited by examiner

OBJECTIVE-BASED CONTROL OF AN AUTONOMOUS UNMANNED AERIAL VEHICLE

CROSS-REFERENCE TO RELATED APPLICATION(S)

This application is a continuation of U.S. patent application Ser. No. 17/360,495, titled "OBJECTIVE-BASED CONTROL OF AN AUTONOMOUS UNMANNED AERIAL VEHICLE," filed Jun. 28, 2021, and issued as U.S. Pat. No. 11,755,041 on Sep. 12, 2023; which is a continuation of U.S. patent application Ser. No. 16/240,394, titled "OBJECTIVE-BASED CONTROL OF AN AUTONO-MOUS UNMANNED AERIAL VEHICLE," filed Jan. 4, 2019, and issued as U.S. Pat. No. 11,048,277 on Jun. 29, 2021; which is entitled to the benefit and/or right of priority of U.S. Provisional Patent Application No. 62/621,243, titled "OBJECTIVE-BASED CONTROL OF AN AUTONOMOUS UNMANNED AERIAL VEHICLE," filed Jan. 24, 2018, the contents of each of which are hereby incorporated by reference in their entirety for all purposes. This application is therefore entitled to a priority date of Jan. 24, 2018.

TECHNICAL FIELD

The present disclosure generally relates to autonomous vehicle technology.

BACKGROUND

Unmanned aerial vehicles (UAV) are increasingly being used as platforms for taking images (including video) from the air. A number of UAV systems are currently available that provide for image and video capture and remote control from a device on the ground. However, currently available systems require piloting using direct control of the UAV similar to other fixed wing or rotor craft. In other words, control by directly adjusting the pitch, roll, yaw, and power of the UAV, for example using common control inputs such as a joystick and throttle control. While effective to a degree, such control systems require expertise on the part of the remote pilot and are prone to crashes caused by pilot error.

DETAILED DESCRIPTION

From the foregoing, it will be appreciated that specific embodiments of the invention have been described herein for purposes of illustration, but that various modifications may be made without deviating from the scope of the invention. Accordingly, the invention is not limited except as by the appended claims.

Overview

To alleviate the need for direct pilot control, UAVs used as aerial image capture platforms can be configured for autonomous operation. Achieving autonomous flight in a safe and intelligent manner involves a complex hierarchy of physics, control systems, scene understanding, and motion planning. The complex nature of autonomous vehicle technology creates a high barrier of entry for application developers seeking to leverage the high capabilities of an autonomous UAV as an image capture platform.

To address such challenges, techniques are introduced that hide the underlying complexity of an autonomous navigations system and provide for control of an autonomous vehicle such as a UAV through specifying a collection of intuitive, high-level behavioral intentions also referred to herein "behavioral objectives" or simply as "objectives." In some embodiments, objectives utilized to perform motion planning are exposed through an application programming interface (API). Developers can utilize the API to build customized applications for utilizing an autonomous UAV to capture images of the physical environment. Such applications may comprise or include what are referred to herein as "skills," or "skill sets." Skills may comprise software and/or assets configured to modify objective inputs to the underlying autonomous navigation system, thereby controlling vehicle behavior during actual flight, during simulated flight, as well as pre-flight and post-flight behavior. For example, a developer-created skill may change and adjust the type of data collected during a flight (image stills vs video, frame rate, etc.), change and adjust objective inputs to the navigation engine during flight, perform customized post-processing on received data after landing, etc.

As will be described, skills can be developed using the API, shared with other users via an online storefront, downloaded and executed by other users using other UAVs, tested in an online simulation environment, and/or utilized to improve operation of the autonomous control systems.

Example Implementation of an Autonomous Vehicle

Figure 1A:
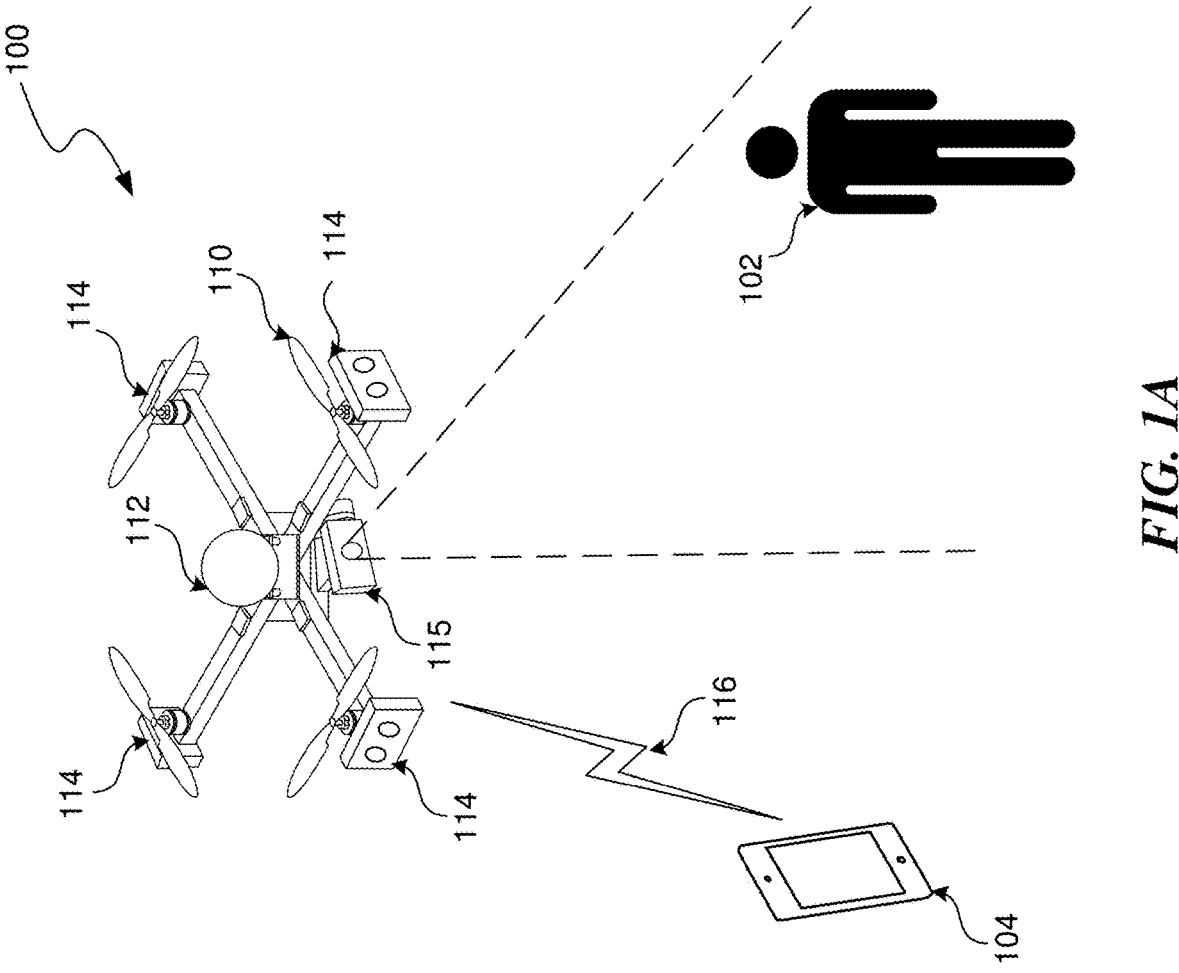
FIG. 1A shows an example configuration of an autonomous vehicle in the form of an unmanned aerial vehicle (UAV) within which certain techniques described herein may be applied.

FIG. 1A shows an example configuration of a UAV 100 within which certain techniques described herein may be applied. As shown in FIG. 1A, UAV 100 may be configured as a rotor-based aircraft (e.g., a "quadcopter"). The example UAV 100 includes propulsion and control actuators 110 (e.g., powered rotors or aerodynamic control surfaces) for maintaining controlled flight, various sensors for automated navigation and flight control 112, and one or more image capture devices 114 and 115 for capturing images of the surrounding physical environment while in flight. "Images," in this context, include both still images and capture video. Although not shown in FIG. 1A, UAV 100 may also include other sensors (e.g., for capturing audio) and systems for communicating with other devices (e.g., a mobile device 104) via a wireless communication channel 116.

In the example depicted in FIG. 1A, the image capture devices 114 and/or 115 are depicted capturing an object 102 in the physical environment that happens to be a person. In some cases, the image capture devices may be configured to capture images for display to users (e.g., as an aerial video platform) and/or, as described above, may also be configured for capturing images for use in autonomous navigation. In other words, the UAV 100 may autonomously (i.e., without direct human control) navigate the physical environment, for example, by processing images captured by any one or more image capture devices. While in autonomous flight, UAV 100 can also capture images using any one or more image capture devices that can be displayed in real time and or recorded for later display at other devices (e.g., mobile device 104).

FIG. 1A shows an example configuration of a UAV 100 with multiple image capture devices configured for different purposes. In the example configuration shown in FIG. 1A, the UAV 100 includes multiple image capture devices 114 arranged about a perimeter of the UAV 100. The image capture devices 114 may be configured to capture images for use by a visual navigation system in guiding autonomous flight by the UAV 100 and/or a tracking system for tracking other objects in the physical environment (e.g., as described with respect to FIG. 2). Specifically, the example configuration of UAV 100 depicted in FIG. 1A includes an array of multiple stereoscopic image capture devices 114 placed around a perimeter of the UAV 100 so as to provide stereoscopic image capture up to a full 360 degrees around the UAV 100.

In addition to the array of image capture devices 114, the UAV 100 depicted in FIG. 1A also includes another image capture device 115 configured to capture images that are to be displayed but not necessarily used for navigation. In some embodiments, the image capture device 115 may be similar to the image capture devices 114 except in how captured images are utilized. However, in other embodiments, the image capture devices 115 and 114 may be configured differently to suit their respective roles.

In many cases, it is generally preferable to capture images that are intended to be viewed at as high a resolution as possible given certain hardware and software constraints. On the other hand, if used for visual navigation and/or object tracking, lower resolution images may be preferable in certain contexts to reduce processing load and provide more robust motion planning capabilities. Accordingly, in some embodiments, the image capture device 115 may be configured to capture relatively high resolution (e.g., 3840×2160) color images while the image capture devices 114 may be configured to capture relatively low resolution (e.g., 320×240) grayscale images.

The UAV 100 can be configured to track one or more objects such as a human subject 102 through the physical environment based on images received via the image capture devices 114 and/or 115. Further the UAV 100 can be configured to track image capture of such objects, for example, for filming purposes. In some embodiments, the image capture device 115 is coupled to the body of the UAV 100 via an adjustable mechanism that allows for one or more degrees of freedom of motion relative to a body of the UAV 100. The UAV 100 may be configured to automatically adjust an orientation of the image capture device 115 so as to track image capture of an object (e.g., human subject 102) as both the UAV 100 and object are in motion through the physical environment. In some embodiments, this adjustable mechanism may include a mechanical gimbal mechanism that rotates an attached image capture device about one or more axes. In some embodiments, the gimbal mechanism may be configured as a hybrid mechanical-digital gimbal system coupling the image capture device 115 to the body of the UAV 100. In a hybrid mechanical-digital gimbal system, orientation of the image capture device 115 about one or more axes may be adjusted by mechanical means, while orientation about other axes may be adjusted by digital means. For example, a mechanical gimbal mechanism may handle adjustments in the pitch of the image capture device 115, while adjustments in the roll and yaw are accomplished digitally by transforming (e.g., rotating, panning, etc.) the captured images so as to effectively provide at least three degrees of freedom in the motion of the image capture device 115 relative to the UAV 100.

Figure 2:
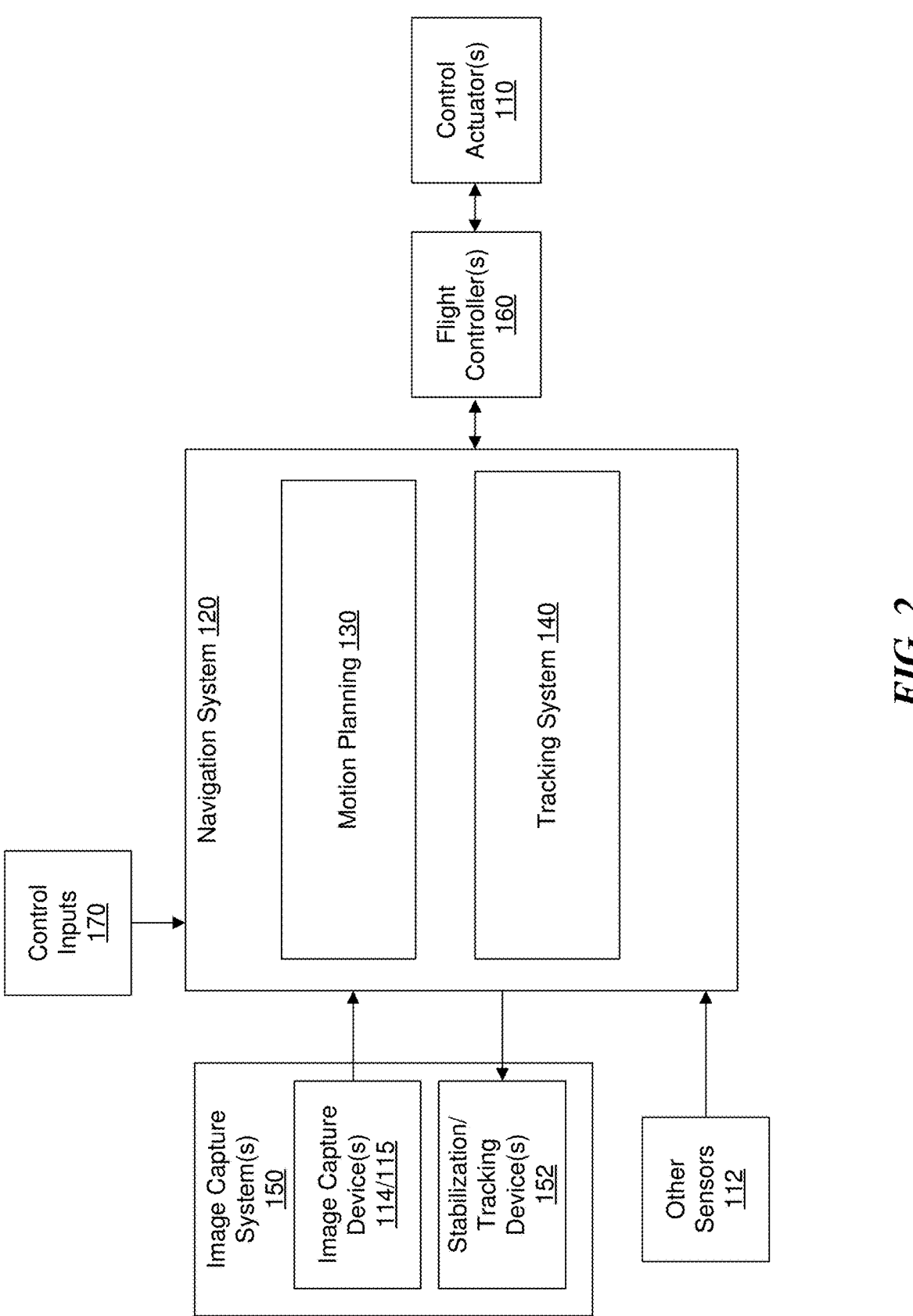
FIG. 2 shows a block diagram of an example navigation system that may be implemented with the UAV of FIGS. 1A and/or 1B.

FIG. 2 is a block diagram that illustrates an example navigation system 120 that may be implemented as part of the example UAV 100 described with respect to FIG. 1A.

The navigation system 120 may include any combination of hardware and/or software. For example, in some embodiments, the navigation system 120 and associated subsystems, may be implemented as instructions stored in memory and executable by one or more processors.

As shown in FIG. 2, the example navigation system 120 includes a motion planning system 130 for autonomously maneuvering the UAV 100 through a physical environment and a tracking system 140 for tracking one or more objects in the physical environment. The tracking subsystem 140 may include one or more subsystems such as an object detection subsystem, an instance segmentation subsystem, an identity recognition subsystem, and any other subsystems (all not shown). The purposes of such subsystems are described in more detail later. Note that the arrangement of systems shown in FIG. 2 is an example provided for illustrative purposes and is not to be construed as limiting. For example, in some embodiments, the tracking system 140 may be completely separate from the navigation system 120. Further, the subsystems making up the navigation system 120 may not be logically separated as shown in FIG. 2.

In some embodiments, the motion planning system 130, operating separately or in conjunction with the tracking system 140, is configured to generate a planned trajectory through a three-dimensional (3D) space of a physical environment based, for example, on images received from image capture devices 114 and/or 115, data from other sensors 112 (e.g., IMU, GPS, proximity sensors, etc.), one or more control inputs 170 from external sources (e.g., from a remote user, navigation application, etc.), and/or one or more specified navigation objectives. As will be described in more detail, the control inputs 170 may include calls to an application programming interface (API) associated with navigation system 120. For example, API calls may be made by an application for setting one or more navigation objectives as part of the motion planning process. Navigation objectives will be described in more detail later, but may include, for example, avoiding collision with other objects and/or maneuvering to follow a particular object (e.g., an object tracked by tracking system 140). In some embodiments, the generated planned trajectory is continuously or continually (i.e., at regular or irregular intervals) updated based on new perception inputs (e.g., newly captured images) and/or new control inputs 170 received as the UAV 100 autonomously navigates the physical environment.

In some embodiments, the navigation system 120 may generate control commands configured to cause the UAV 100 to maneuver along the planned trajectory generated by the motion planning system 130. For example, the control commands may be configured to control one or more control actuators 110 (e.g., rotors and/or control surfaces) to cause the UAV 100 to maneuver along the planned 3D trajectory. Alternatively, a planned trajectory generated by the motion planning system 120 may be output to a separate flight controller system 160 that is configured to process trajectory information and generate appropriate control commands configured to control the one or more control actuators 110.

The tracking system 140, operating separately or in conjunction with the motion planning system 130, may be configured to track one or more objects in the physical environment based, for example, on images received from image capture devices 114 and/or 115, data from other sensors 112 (e.g., IMU, GPS, proximity sensors, etc.), one or more control inputs 170 from external sources (e.g., from a remote user, navigation application, etc.), and/or one or more specified tracking objectives. Again, in some embodiments, tracking objectives may be set based on API calls from an application, for example, based on user inputs received through the application. Tracking objects will be described in more detail later, but may include, for example, a designation by a user to track a particular detected object in the physical environment or a standing objective to track objects of a particular classification (e.g., people).

As alluded to above, the tracking system 140 may communicate with the motion planning system 130, for example, to maneuver the UAV 100 based on measured, estimated, and/or predicted positions, orientations, and/or trajectories of objects in the physical environment. For example, the tracking system 140 may communicate a navigation objective to the motion planning system 130 to maintain a particular separation distance to a tracked object that is in motion.

In some embodiments, the tracking system 140, operating separately or in conjunction with the motion planning system 130, is further configured to generate control commands configured to cause a mechanism to adjust an orientation of any image capture devices 114/115 relative to the body of the UAV 100 based on the tracking of one or more objects. Such a mechanism may include a mechanical gimbal or a hybrid digital-mechanical gimbal, as previously described. For example, while tracking an object in motion relative to the UAV 100, the tracking system 140 may generate control commands configured to adjust an orientation of an image capture device 115 so as to keep the tracked object centered in the field of view (FOV) of the image capture device 115 while the UAV 100 is in motion. Similarly, the tracking system 140 may generate commands or output data to a digital image processor (e.g., that is part of a hybrid digital-mechanical gimbal) to transform images captured by the image capture device 115 to keep the tracked object centered in the FOV of the image capture device 115 while the UAV 100 is in motion.

The UAV 100 shown in FIG. 1A and the associated navigation system 120 shown in FIG. 2 are examples provided for illustrative purposes. A UAV 100 in accordance with the present teachings may include more or fewer components than are shown. Further, the example UAV 100 depicted in FIG. 1A and associated navigation system 120 depicted in FIG. 2 may include or be part of one or more of the components of the example UAV system 2600 described with respect to FIG. 26 and/or the example computer processing system 2700 described with respect to FIG. 27. For example, the aforementioned navigation system 120 and associated tracking system 140 may include or be part of the UAV system 2600 and/or processing system 2700.

Figure 1B:
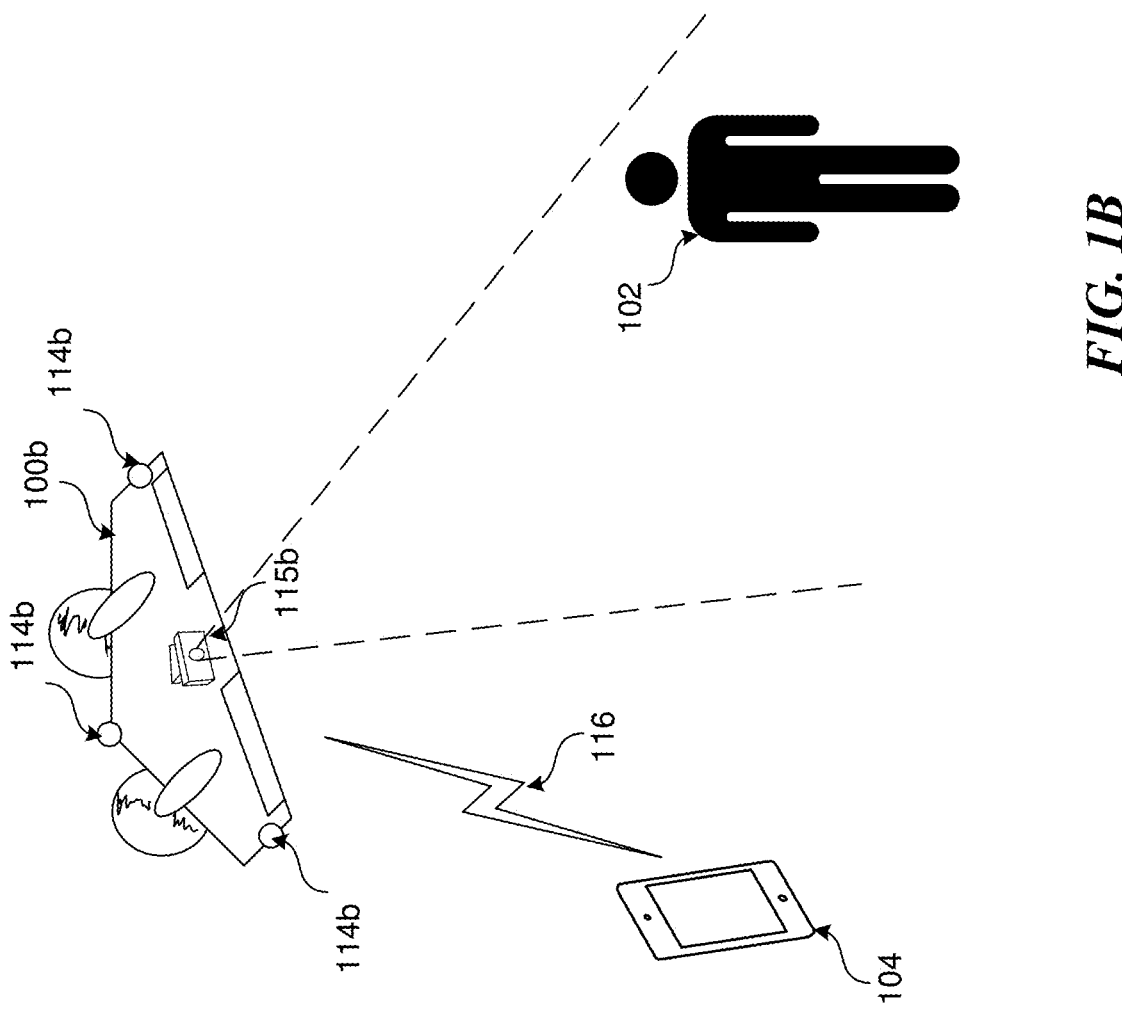
FIG. 1B shows another configuration of an autonomous vehicle in the form of a fixed-wing UAV within which certain techniques described herein may be applied.

While the introduced technique for objective-based control of an autonomous vehicle using an API is described in the context of an aerial vehicle such as the UAV 100 depicted in FIG. 1A, such a technique is not limited to this context. The described technique may similarly be applied to guide navigation and image capture by other types of vehicles (e.g., fixed-wing aircraft, automobiles, watercraft, etc.), hand-held image capture devices (e.g., mobile devices with integrated cameras), or to stationary image capture devices (e.g., building mounted security cameras). For example, FIG. 1B shows an example of a fixed-wing UAV 100*b*. Similar to the UAV 100 described with respect to FIG. 1A, the fixed-wing UAV 100*b* shown in FIG. 1B may include multiple image capture devices 114*b* arranged about a perimeter of the UAV 100*b* configured to capture images for use by a visual navigation system in guiding autonomous flight by the UAV 100*b*. The example fixed-wing UAV 100*b* may also include a subject image capture device 115*b* configured to capture images (e.g., of subject 102) that are to be displayed but not necessarily used for navigation. For simplicity, embodiments of the introduced technique are described herein with reference to the UAV 100 of FIG. 1A; however, a person having ordinary skill in the art will recognize that the introduced technique can be similarly applied using the fixed-wing UAV 100*b* of FIG. 1B.

Objective-Based Control of an Autonomous Vehicle Using an API

The complex processing by a navigation system 120 to affect the autonomous behavior of a UAV 100 can be abstracted into one or more behavioral objectives. A "behavioral objective" or "objective" in this context generally refers to any sort of defined goal or target configured to guide an autonomous response by the UAV 100. For example, objectives may be configured to approximate certain intentions of a human pilot. FIGS. 4-11 will describe some example "objectives" within the meaning of this term as used herein. It shall be appreciated that the example objectives described with respect to FIGS. 4-11 are provided for illustrative purposes and are not to be construed as limiting. A system in accordance with the present discloser may be based on fewer or more objectives than are described.

Figure 3:
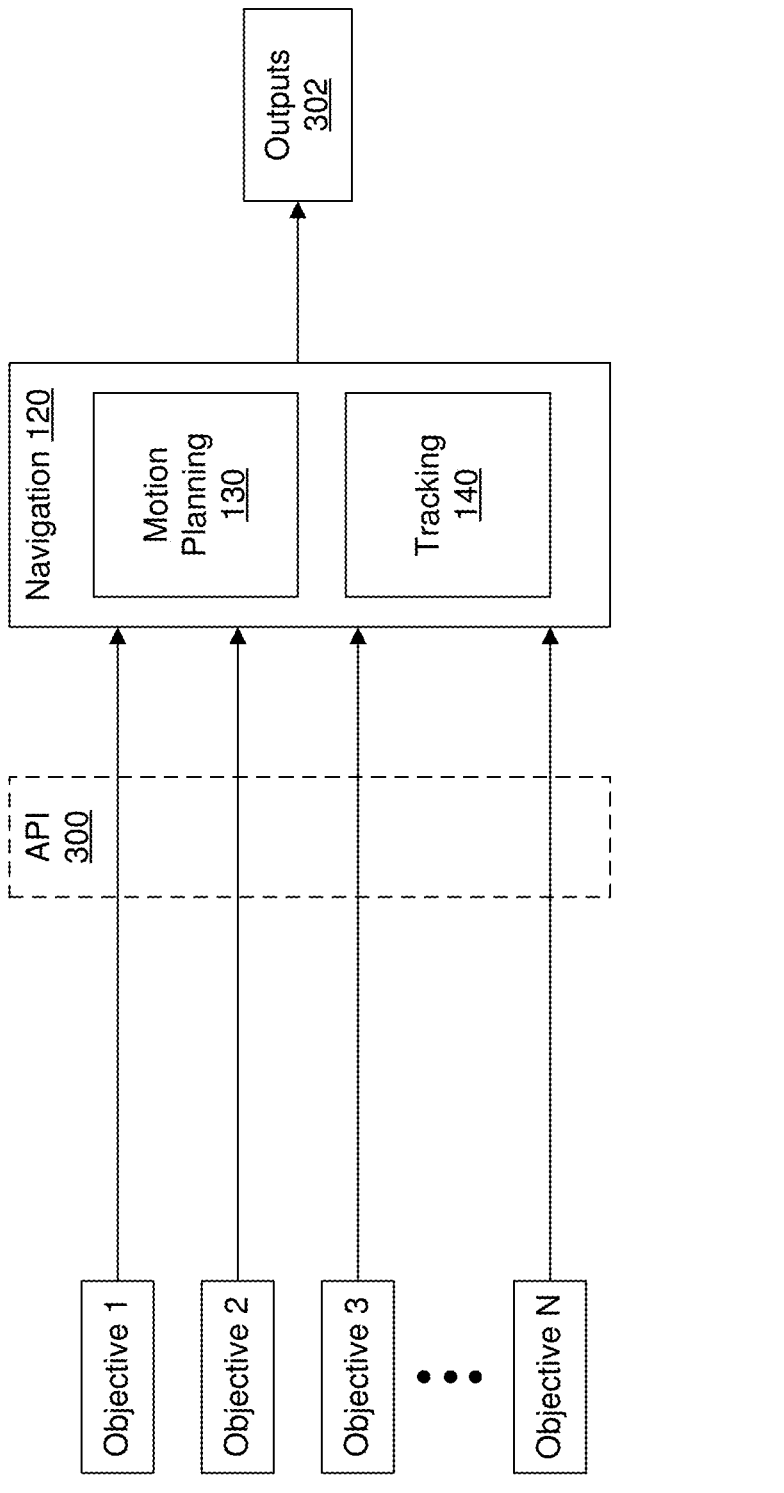
FIG. 3 shows a block diagram illustrating an example configuration for inputting objectives to the navigation system of FIG. 2 via an application programming interface (API).

The underlying processes performed by a navigation system 120 for causing a UAV 100 to autonomously maneuver through an environment and/or perform image capture can be exposed through an application programming interface (API). For example, FIG. 3 shows a diagram of navigation system 120 including a motion planning component 130 and tracking component 140, for example, as described with respect to FIG. 2. As previously discussed with respect to FIG. 2, the navigation system 120 may generate control outputs 302 such as a proposed trajectory, specific control commands, and or image capture outputs based on perception inputs received from sensors (e.g., image capture devices 114/115 and/or other sensors 112) as well as one or more control inputs 170. In the context of the diagram of FIG. 3, such control inputs may be in the form of calls to an API 300 defining parameters of one or more objectives 1 through N.

As will be described in more detail, the API 300 may be configured as a public facing API that may be utilized by a developer to create applications configured to enable certain user interactions with the UAV 100 without specific knowledge of the underlying processes of the navigation system 120 that enable autonomous behavior by the UAV 100. In some cases, the developer creating such applications may be a "second-party" or "third-party" developer, meaning that the developer may be an entity other than the original developer of the navigation system 120 (or one or more internal components of the navigation system 120).

World-Relative Objectives

In some embodiments, an objective may be expressed in terms relative to the physical environment in which the UAV 100 resides. Such objectives are referred to herein as "world-relative" objectives. An example of a world-relative navigation objective may include maneuvering the UAV to a specific location in the physical environment. Similarly, a "world-relative" image capture objective may include positioning the UAV 100 and an associated image capture device 115 so as to capture a specific location in the physical environment.

Figure 4:
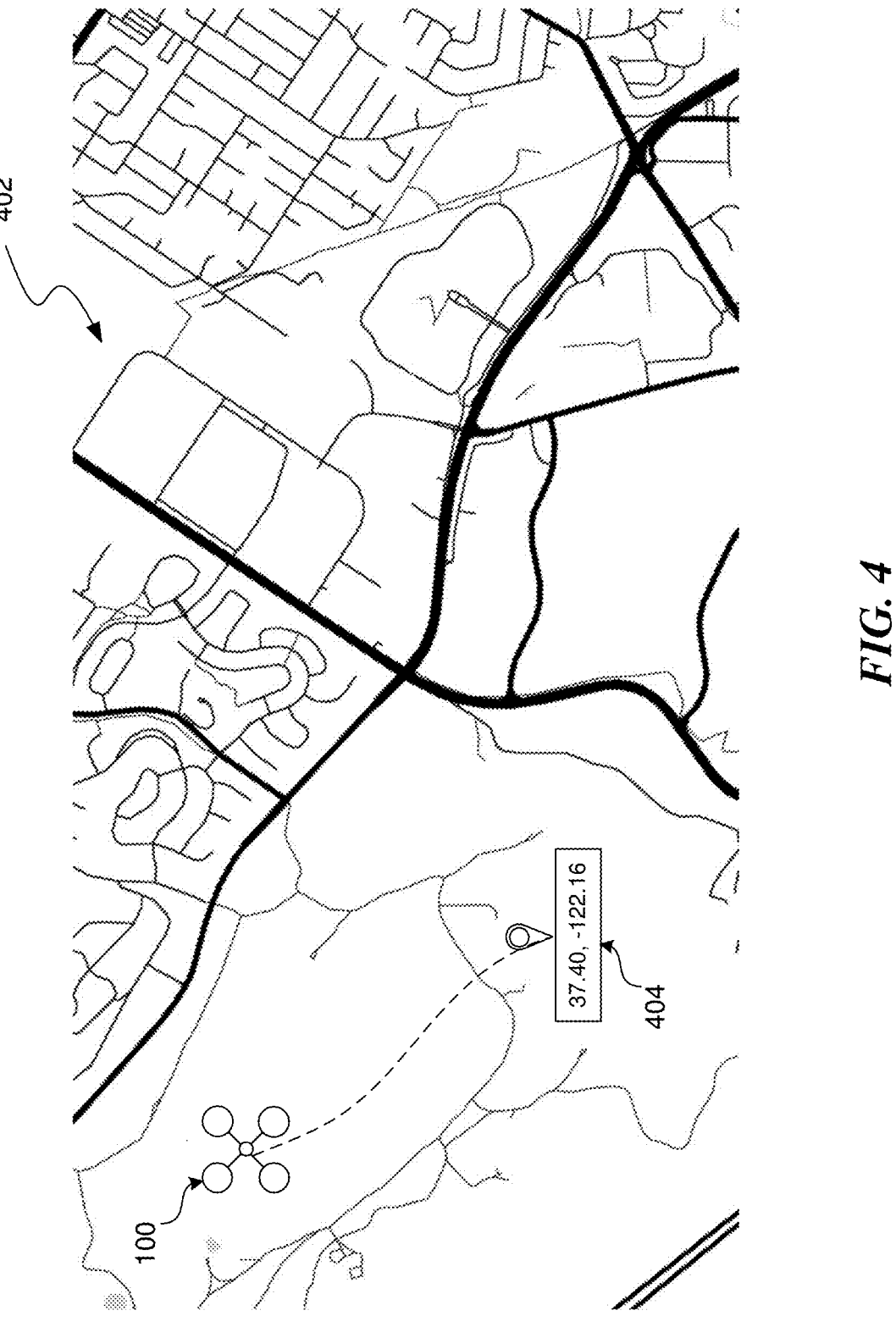
FIG. 4 shows a diagram illustrating an example world-relative objective.

FIG. 4 shows a view of a map 402 of a physical environment. A specific location in the physical environment is indicated at marker 404. In this example, the location may be defined based on a global positioning coordinate (e.g., latitude, longitude), however other types of location indicators may similarly be applied. For example, locations in the physical environment may similarly be defined based on a local coordinate system (e.g., a grid coordinate for a particular city), position/orientation coordinate relative to a takeoff point of the UAV 100 (i.e., a navigation coordinate), other types of location identifiers (e.g., a mailing address), a name of a point of interest (e.g., the Golden Gate Bridge) at a known location, and the like.

A target of a world-relative objective may be expressed based on any of the above-mentioned types of location indicators. For example, a world-relative objective in the form of a GPS coordinate (e.g., 37.40, −122.16) may be input into the navigation system 120 of UAV 100 (e.g., in the form of a call to API 300) to cause the UAV 100 to autonomously maneuver through the physical environment to the designated location and/or direct image capture at the designated location. Note that FIG. 4 shows an indirect path (as indicated by the dotted line) between a current position of the UAV 100 and the location designated by the world-relative objective. Such an indirect path may be based on a proposed trajectory generated by a motion planning component 130 of the navigation system 120 to autonomously maneuver the UAV 100 to the designated location 404 while satisfying other objectives such as avoiding obstacles, maintaining visual contact with a subject, etc.

World-relative objectives are described above as being defined based on locations in the physical environment, however they may similarly include other defining parameters such as relative motion (e.g., ground velocity or air velocity), altitude (expressed as a value above mean sea (MSL), above ground level (AGL), etc.), a separation distance to certain objects in the physical environment (e.g., lateral distance to a vertical surface such as a wall), etc. For example, a particular world-relative objective that incorporates multiple defined targets may be semantically expressed as "fly to grid coordinate 37.40, −122.16 while maintaining a velocity of 30 miles per hour and an altitude of at least 1000 AGL." Similarly, this objective may be expressed as three independent world-relative objectives. As will be described, world-relative objective(s) may be provided as inputs (e.g., in the form of calls to API 300) to the navigation system 120 of the UAV 100 to cause the UAV 100 to autonomously maneuver in a manner that attempts to meet the objective(s) while taking into account other objectives (e.g., avoiding collision with other objects).

Vehicle-Relative Objectives

In some embodiments, an objective may be expressed in terms relative to the vehicle itself (e.g., UAV 100). For example, a vehicle-relative objective may include a target to move forward, backward, left, right, up, down, and/or rotate about one or more axes (e.g., yaw, pitch, roll, etc.) at some defined speed or acceleration (angular speed or acceleration in the case of rotation objectives). Similarly, a vehicle-relative objective may include a target to adjust the position and/or orientation of an image capture device 115 relative to the body of the UAV 100, for example, through the use of a gimbal mechanism.

Figure 5:
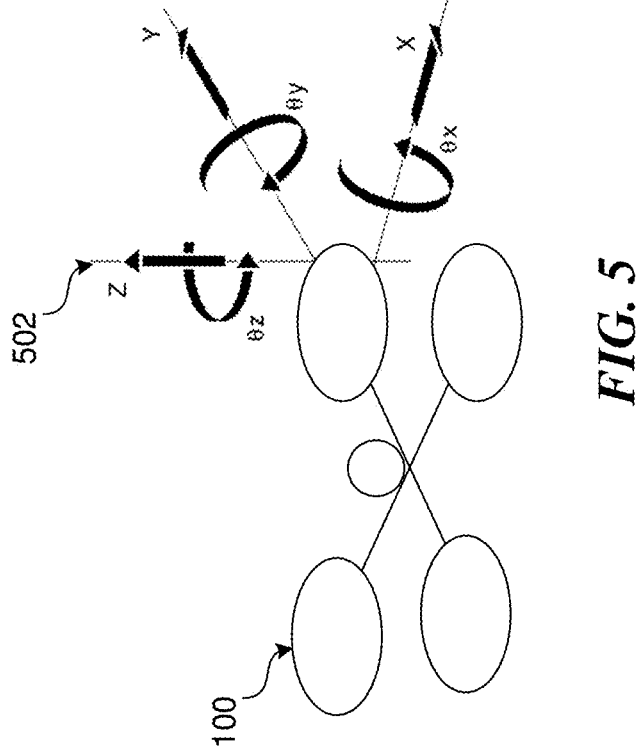
FIG. 5 shows a diagram illustrating an example vehicle-relative objective.

Vehicle-relative objectives may be defined based on a vehicle-relative coordinate system. For example, FIG. 5 depicts a representative view of an example UAV 100 and a multi-dimensional coordinate system 502 upon which lateral motion (e.g., along X, Y, and Z axes) and rotational motion (e.g., about the X, Y, and Z axes) can be defined. Similar coordinate system may be defined relative to the image capture device 115 for defining image capture objectives.

As an illustrative example, a vehicle-relative objective may be semantically expressed as "move forward (e.g., along the Y axis) at a constant ground speed of 3 miles per hour." As with the world-relative objectives described above, vehicle-relative objective(s) may be provided as inputs (e.g., in the form of calls to API 300) to the navigation system 120 of the UAV 100 to cause the UAV 100 to autonomously maneuver in a manner that attempts to meet the objective(s) while taking into account other objectives (e.g., avoiding collision with other objects).

Subject-Relative Objectives

In some embodiments, an objective may be expressed in terms relative to some other physical object (i.e., a subject) in the physical environment. The "subject" in this context may include any type of object such as a person, an animal, a vehicle, a building, a landscape feature, or any other static or dynamic physical objects present in the physical environment. For example, a subject-relative navigation objective may include a target to move to and/or maintain a particular position and/or orientation relative to a tracked subject in the physical environment. Similarly, a subject-relative image capture objective to capture maneuver so as to capture images of the tracked subject in the physical environment.

Figures 6A, 6B:
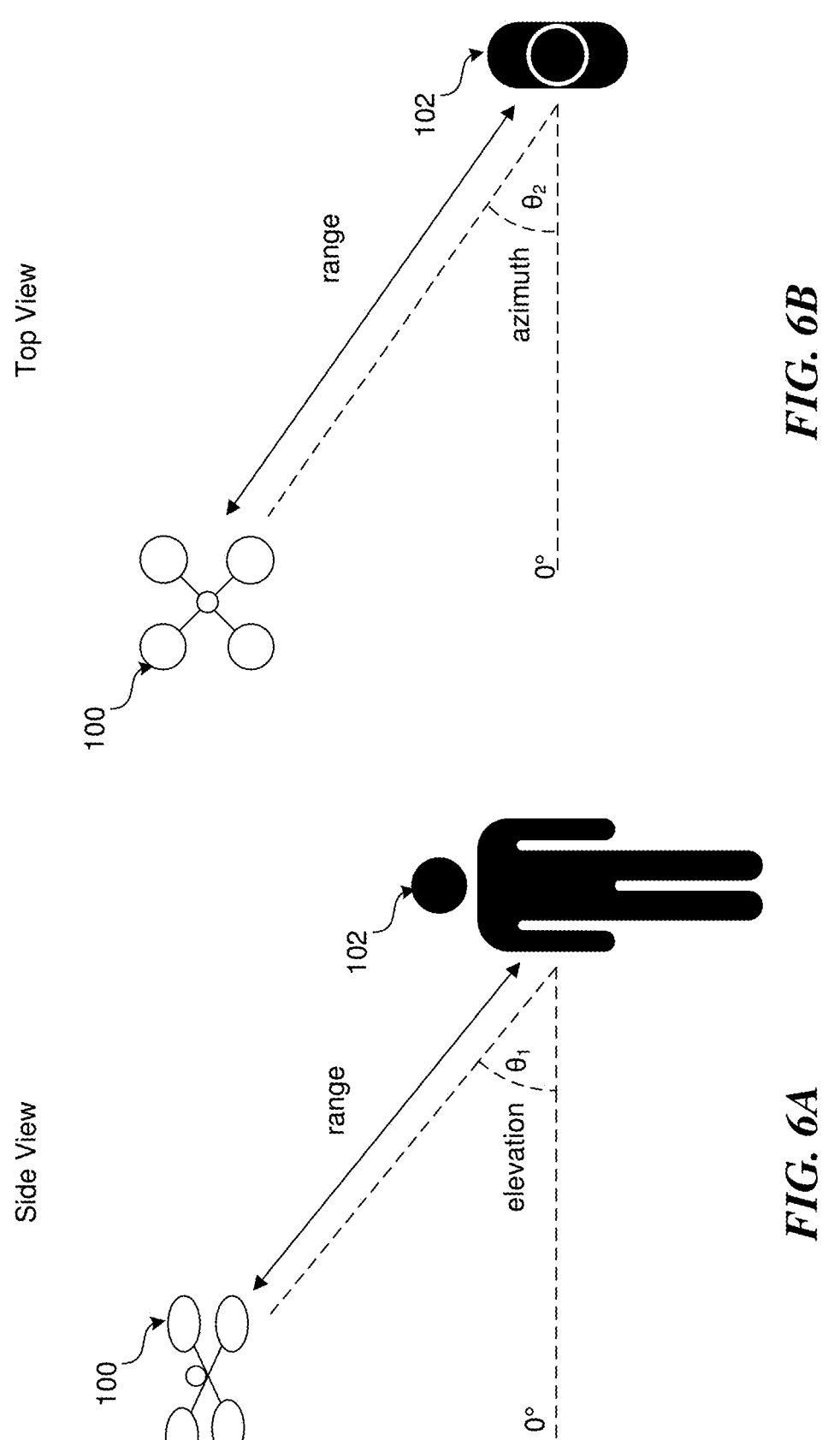
FIGS. 6A-6B show diagrams illustrating an example subject-relative objective.

Subject-relative objectives may be defined, for example, in position/orientation terms based on values for an azimuth, elevation, range, height, azimuth rate between the vehicle and the tracked subject. For example, FIGS. 6A-6B show side view and a top view (respectively) that illustrate how relative positioning between a UAV 100 and a tracked subject (in this case a human subject 102) can be defined in terms of an elevation angle $\theta_1$, an azimuth angle $\theta_2$, and a range value.

Figure 7:
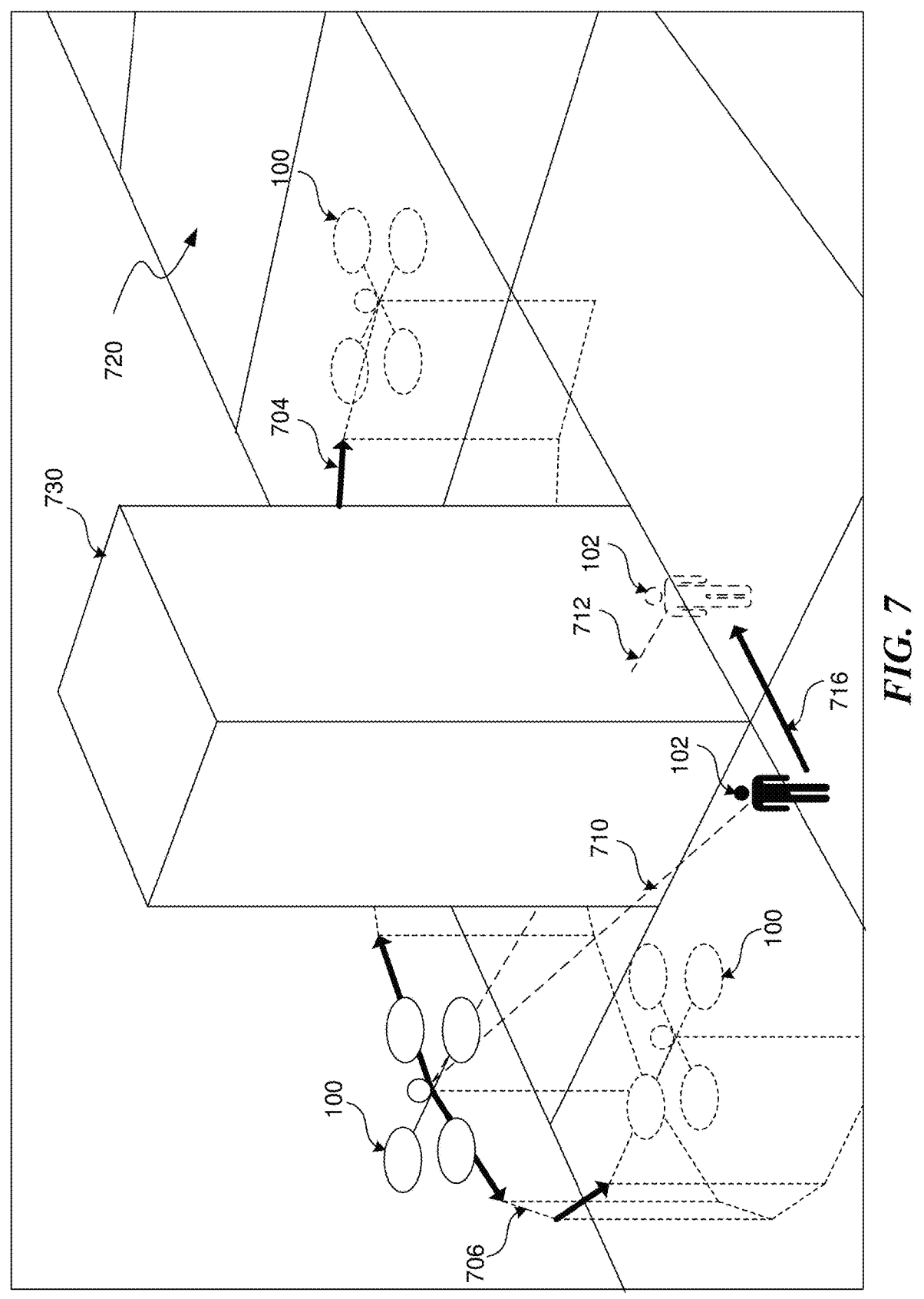
FIG. 7 shows a diagram illustrating an example subject-relative objective to maintain line-of-sight with a tracked subject.

Subject-relative objectives may also include targets that are defined based on a semantic understanding of physical environment that the UAV 100 and subject occupy. For example, a subject-relative objective may include a target to maintain a clear line of sight between the UV 100 and the tracked subject. FIG. 7 depicts an example scenario involving a UAV 100 in flight over a physical environment 720 while capturing images of a human subject 102. As shown in FIG. 7, at a current time, human subject 102 is located on an opposite side of object 730 from UAV 100; however, as indicated by dotted line 710, a view of human subject 102 from an image capture device onboard UAV 100 is not occluded by object 730. If the human subject 102 moves to a different position behind the object 730, the view of the human subject 102 from the image capture device onboard the UAV 100 may be occluded, as indicated by dotted line 712. Accordingly, to satisfy a subject-relative objective to maintain line of sight, a navigation system 120 may cause the UAV 100 to maneuver (e.g., along trajectory 706 or 704) to a different position such that the view of the human subject 102 is no longer occluded.

Certain techniques for tracking subjects in the physical environment are described later with respect to FIGS. 20-25; however, in some embodiments, a motion planning system 130 may employ a specific technique described below in order to satisfy a subject-relative objective to maintain line of sight.

Consider again the scenario depicted in FIG. 7. Based on a predicted trajectory of human subject 102 (as indicated by arrow 716), and measured or estimated positions of the UAV 100 and object 730, a navigation system 120 may determine that the view of the human subject 102 may become occluded by the object 730 (assuming UAV 100 remains stationary) as indicated by the obstructed line of sight line 712. Based on this predicted future state and a standing objective to maintain line of sight with subject 102, the navigation system 120 may generate outputs (e.g., a predicted trajectory and/or control commands) configured to cause the UAV 100 to maneuver to the UAV 100 to satisfy the subject-relative objective. Here, the generated output may be configured to cause UAV 100 to maneuver along a flight path 706 to keep the view of human subject 102 unobstructed. Note that in this example, simply avoiding a collision with object 730 may not be sufficient to satisfy the objective. For example, if the generated output causes the UAV 100 to maneuver along alternative flight path 704 instead of 706, its view of human subject 102 will become momentarily obstructed by object 730, thereby failing the objective.

The process applied by the motion planning system 130 to maneuver the UAV 100 along trajectory 706 instead of 704 in order to satisfy a line of sight objective may be based on a virtual line of sight in a computer-generated 3D model of the physical environment. As will be described the measured, estimated, and/or predicted motions of UAV 100 and one or more tracked subjects may be based on localization within a computer-generated 3D model representative of the physical environment. The navigation system 120 may then define a virtual line connecting virtual representations of the positions of the UAV 100 and subject 102 in the 3D model. Accordingly, a subject-relative objective to maintain line of sight can be interpreted with the navigation system 120 as an objective to maneuver the UAV 100 such that the virtual line of sight line does not intersect with a virtual representation of another physical object. This criterion may be specified with a certain level of tolerance (i.e., dead zone) to account for objects in motion. In other words, if UAV 100 and/or subject 102 are both in motion, it may be inevitable that at certain times the virtual line connecting their representations in the virtual map may intersect representations of other objects. However, if that intersection persists for more than a certain period of time (e.g., 1 second), the navigation system 120 may respond by generating an output configured to cause UAV 100 to maneuver to avoid the intersection.

In FIG. 7, the dotted line of sight 710 may represent the virtual line of sight connecting the representations of UAV 100 and subject 102 within a virtual environment (i.e., the computer-generated 3D model) representing physical environment 720. As human subject 102 begins to move within the physical environment, the virtual line 710 connecting the virtual representations moves as well. If the human subject 102 moves behind object 730, the virtual line within the 3D map will then intersect the corner of a virtual representation of physical object 730 as indicated by dotted line 712. When this intersection occurs in the virtual environment, the subject-relative objective to maintain visual contact is no longer satisfied in the physical environment. Note that this may represent a state several seconds in the future based on a predicted motion of the UAV 100 and/or subject 102. A current or predicted intersection of the virtual line of sight with a virtual representation of a physical object will therefore cause the navigation system 120 to generate an output to configured to cause the UAV 100 to maneuver to avoid the intersection. For example, the motion of the virtual line can be tracked, and it may be determined that in order to avoid the intersection, UAV 100 should maneuver along flight path 706 as opposed to flight path 704 to keep the view of subject 102 unobstructed.

In some situations, intersection points along a virtual line can be analyzed differently depending on their distance to the UAV 100. This may be based on an assumption that motion by a UAV 100 generally has a greater impact on resolving visual occlusions caused by objects that are closer to the UAV 100. This assumption may depend on the size and/or shape of the obstructing object; however, in general, relatively minor maneuvers by UAV 100 may be sufficient to maintain line of sight with a subject around an object that is close to UAV 100. Conversely, more drastic maneuvers by UAV 100 may be necessary to maintain line of sight around an object that is closer to subject 102. This makes sense when again considering the scenario described in FIG. 7. Although described as a single object 730, the virtual representation of object 1030 can also be described as multiple surfaces that intersect the virtual line at multiple points. For example, obstructed line of sight line 712 intersects a first surface of object 730 that faces UAV 100 at a first point and a second surface of object 730 that faces a future position of subject 102 at a second point. A minor maneuver along flight path 706 may be sufficient such that sight line 712 no longer intersects the first surface (i.e., the surface closest to UAV 100) at the first point. However, a more extended maneuver along flight path 706 may be necessary before sight line 712 no longer intersects the second surface (i.e., the surface closest to subject 102) at the second point, thereby establishing line of sight with subject 102.

In some embodiments, a subject-relative objective such maintaining line of sight may be built into the navigation system 120 as a core objective (e.g., similar to avoiding collisions), for example, to comply with a flight regulation. For example, a UAV 100 may be subject to a regulation that requires a human operator to maintain visual line of sight with the UAV 100. A simple control restraint on separation distance (i.e., range) between a subject (i.e., the human operator) and the UAV 100 may suffice to an extent but will not ensure that visual line of sight is maintained. Instead, the above described technique for maintaining line of sight can be utilized.

Subject-relative objectives may also apply to multiple simultaneously tracked subjects. In some cases, this may be accomplished by inputting multiple objectives (relative to each tracked subject) into the navigation system and allowing the navigation system to generate a proposed trajectory to satisfy as many of the input subject-relative objectives as possible along with any other objectives (e.g., avoid collisions). Alternatively, or in addition, a single objective relative to multiple tracked subjects may be input contemplated. For example, a subject-relative objective may be defined relative to an average position and/or orientation of multiple tracked subjects in a scene.

Image-Relative Objectives

In some embodiments, an objective may be expressed in terms relative to images captured by one or more image capture devices 114/115 onboard the UAV 100. For example, an image-relative objective may be defined to keep certain tracked objects within an FOV of an image capture device 114/115, keep certain tracked objects at a particular position in FOV of the image capture device 114/115, keep the horizon at a particular position/orientation relative to the image capture device 114/115 etc.

Figure 8:
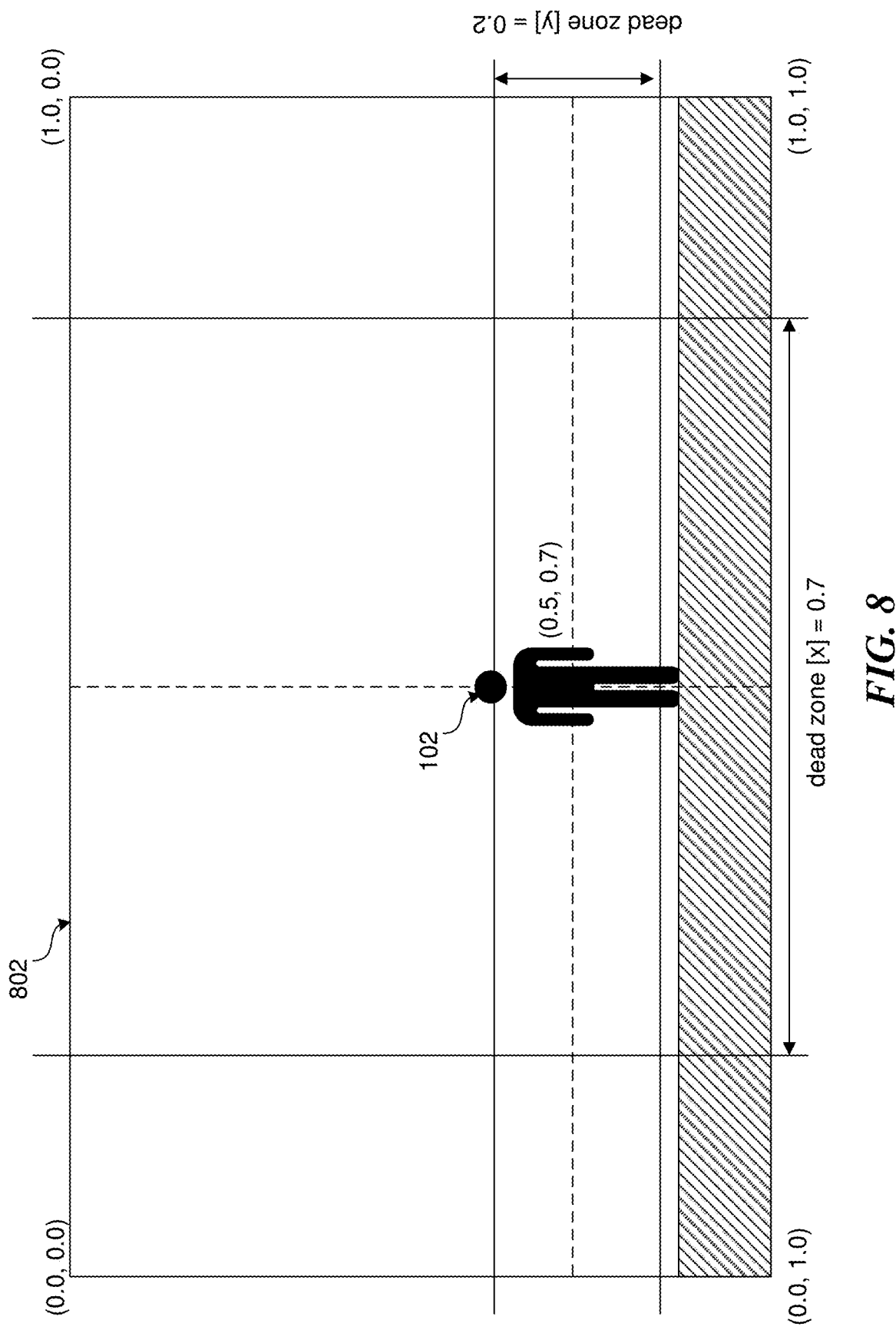
FIG. 8 shows a diagram illustrating an example image-relative objective.

FIG. 8 depicts an example image 802 captured (e.g., by an image capture device 114/115) of an object (e.g., a human subject 102). As suggested in FIG. 8, an image-relative objective may include a target, for example, to keep the depiction of the tracked human subject 102 at a particular coordinate in the image space of the captured image 802. In the example scenario depicted in FIG. 8, a target normalized image space coordinate for the subject 102 may be defined as (0.5, 0.7) with corresponding dead zones of 0.2 in the y direction and 0.7 in the x direction.

In order to satisfy certain image-relative objectives, a computing system associated with UAV 100 may process images received from the image capture devices 114/115 onboard the UAV 100 to perform an image space analysis of certain objects (e.g., a tracked subject or the horizon) detected in the captured images. Specific techniques by which images are processed to detect objects are described with respect to FIGS. 20-25.

Semantic-Based Objectives

In some embodiments, objectives may be based on semantic understanding of the physical environment. Examples of such objectives may include avoiding backlighting by the sun, maintaining scene saliency (e.g., focusing on "interesting" objects or image regions), avoiding dangerous or critical areas, tracking certain classes of objects (e.g., people vs. animals), tracking objects performing a certain activities (e.g., people running vs. standing still), landmark reasoning (e.g., avoiding obfuscation of a tracked object), overall scene understanding (e.g., capturing an image of one object approaching another object), and the like. It shall be appreciated that these are only a few example semantic-based objectives provided for illustrative purposes, and are not to be construed as limiting. The types of semantic-based objectives that may be implemented may only be limited by the extent to which a computing system associated with the UAV 100 is able to gain a semantic understanding of the physical environment and the multiple objects occupying the physical environment.

Figure 9:
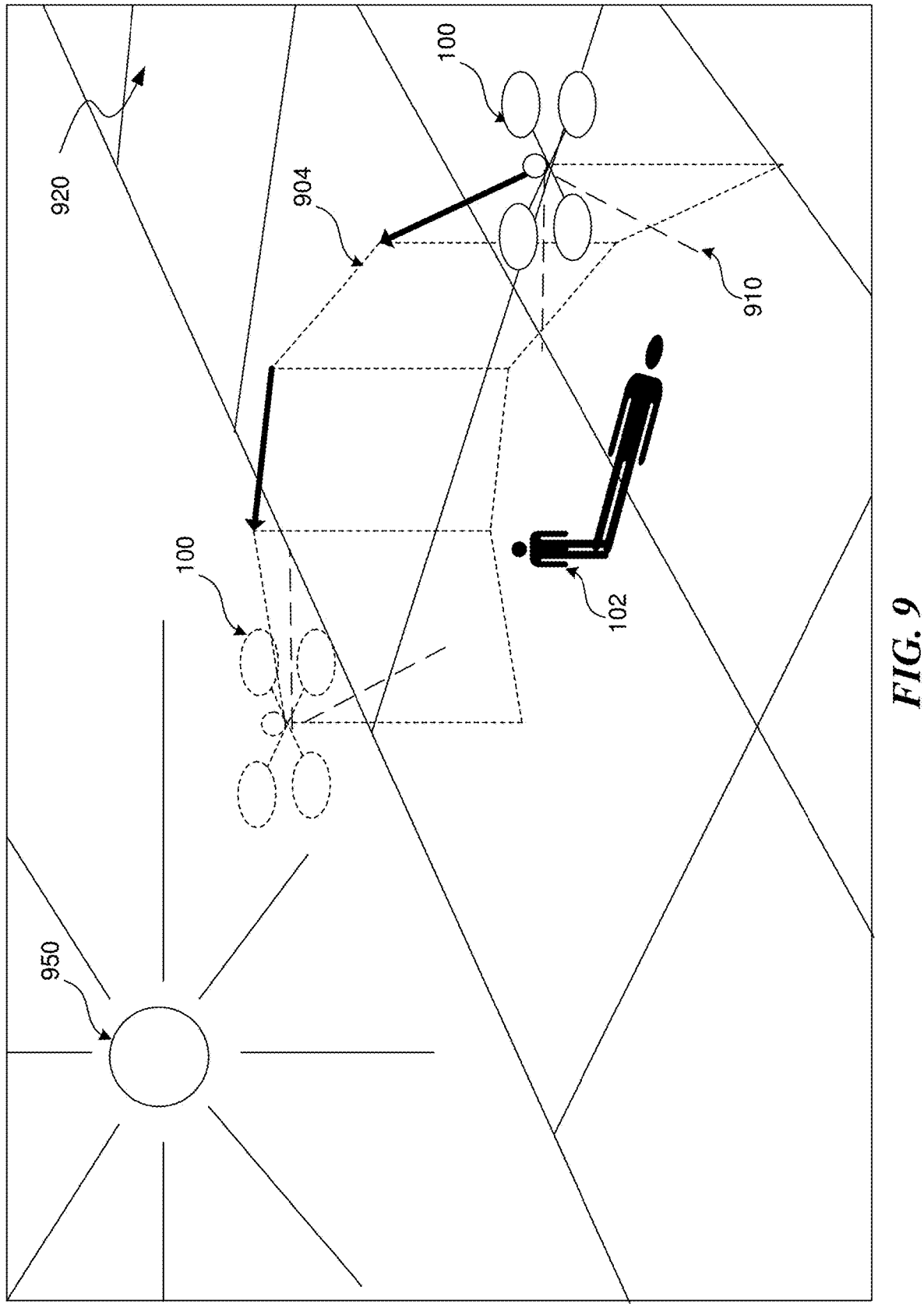
FIG. 9 shows a diagram illustrating an example objective to avoid backlighting.

FIG. 9 shows an example scenario that illustrates a semantic-based objective including a target that avoids backlighting by the sun when capturing images of a tracked object. As shown in FIG. 9, a UAV 100 is in autonomous flight over a physical environment 920 while tracking and capturing images of a particular object (in this case human subject 102). The human subject 102 is lit by a light source 950 (in this example the Sun) from one side. Here, UAV 100 is shown at a current location (as indicated by the solid line quadcopter) opposite the light source 950 relative to the human subject 102. At this current position, images captured of human subject 102 (for example within FOV 910) are likely to be devoid of much detail of human subject 102 due to the shadow cast by the light source 950. In the case of a powerful light source 950 such as the Sun, the captured images may be completely washed out due to over exposure, particularly if the image capture device associated with UAV 100 is oriented so as to be pointed substantially in the direction of the light source 950.

Subjectively, backlighting during image capture is generally understood to result in poor quality images. Accordingly, in some embodiments, a semantic-based objective may be configured to avoid backlighting. To satisfy such an objective, a navigation system 120 may generate an output (e.g., control commands or a proposed trajectory) configured to cause the UAV 100 to autonomously position itself substantially between certain light sources (e.g., the Sun) and a tracked subject 102 when capturing images of the tracked subject 102. Consider again the scenario depicted in FIG. 9. Since UAV 100 is located opposite a major light source 950 while capturing images of subject 102, in order to satisfy a specified objective, a navigation system 120 may generate control an output configured to cause UAV 100 to autonomously maneuver along flight path 904 until, at a future time, UAV 100 is located substantially between light source 950 and subject 102 (as indicated by the dotted line quadcopter). A method for generating such an output may include, in addition to estimating the motions of UAV 100 and subject 102, also estimating a position of a light source

950. This may be accomplished in a number of ways for example, by processing images captured by an image capture device 114/115 associated with UAV 100 and/or based on localization data of known light sources (e.g., the Sun). Given global positioning information for UAV 100 and the current date/time, a localization system can determine if UAV 100 is pointed towards the Sun while capturing images of a subject 102.

In some embodiments, a semantic-based objective may include a target to capture images of "interesting" objects in the physical environment. This may be generally referred to as scene or visual saliency. The attention of humans and certain other animals tends to be attracted to visually salient stimuli. Visually salient stimuli may be based, for example, on the closest object roughly centered in an FOV, an object in motion, an object performing a certain activity of interest, etc.

Figure 10:
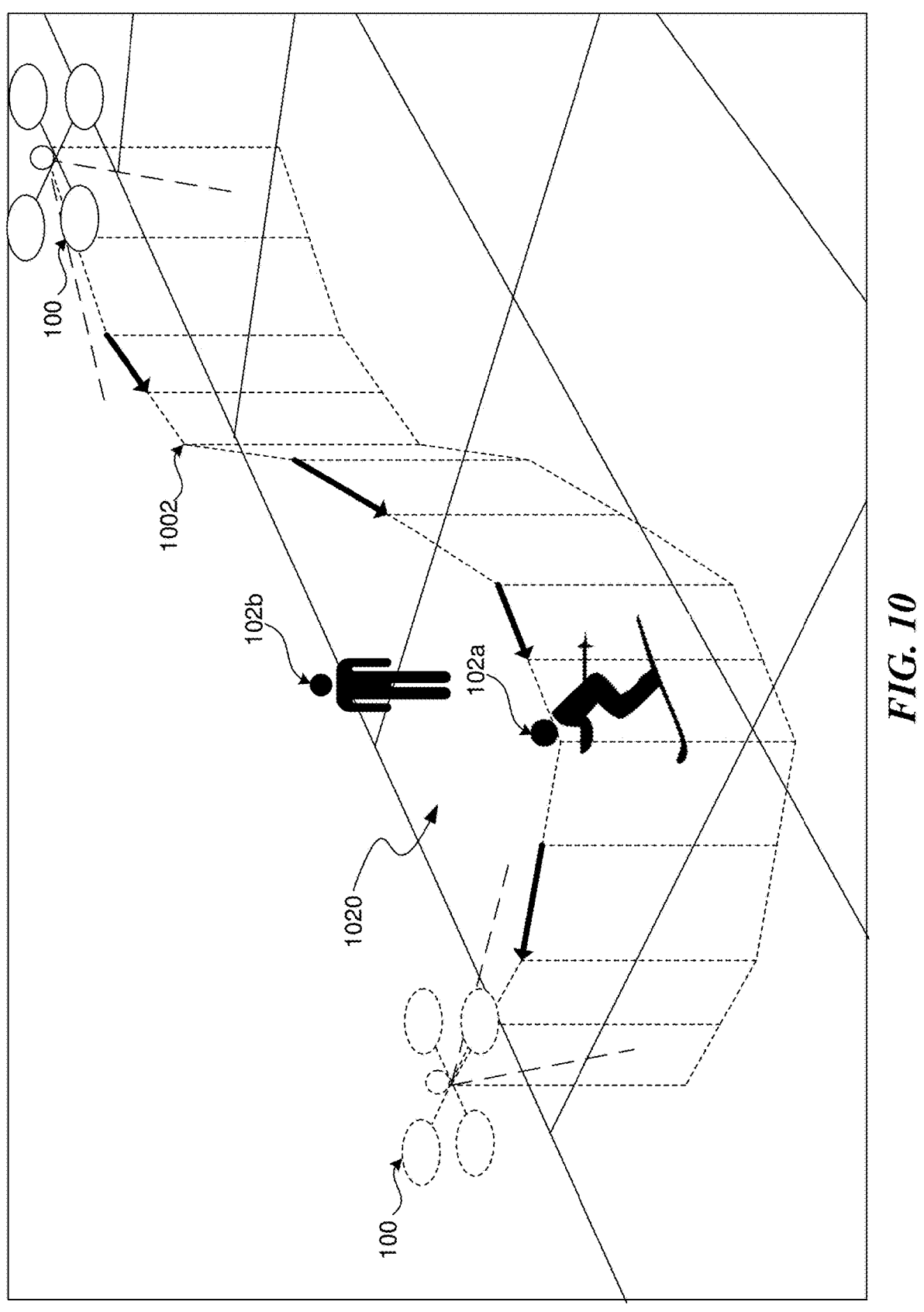
FIG. 10 shows a diagram illustrating an example objective to maintain scene saliency.

What is deemed "interesting" or visually salient may of course differ depending on the context in which the UAV 100 is operating. As an illustrative example, an objective may be configured to cause a UAV 100 track and capture images of a particular class of object (e.g., people) and/or of a particular type of activity. For example, FIG. 10 shows an example scenario involving a UAV 100 in autonomous flight through a physical environment 1020. In this example scenario, an objective may be configured to track and capture images of people that are skiing. Successfully satisfying such an objective may require detection of objects in the physical environment 1020 as well as a semantic understanding of the scene in order to distinguish a person 102b that is standing still or performing some other activity (e.g., walking) from a person 102a that is skiing. Additional information regarding the processing of images to gain a semantic understanding of a scene is described in more detail below with respect to FIGS. 20-25.

In order to satisfy the objective, a navigation system may generate an output (e.g., control commands or a proposed trajectory) configured to cause the UAV 100 to follow a person skiing 102a (when detected) and focus image capture on that person 102a. In some embodiments, the UAV 100 may simply follow the tracked object at a set distance. Alternatively, or in addition, the UAV 100 may execute maneuvers in order to add a dynamic quality to the captured images. For example, as shown in FIG. 10, the UAV 100 may autonomously maneuver along a path 1002 to capture the skier 102a at different angles as the skier 102a continues down the slope. In some cases, such maneuvers may be based on pre-scripted flying patterns that are triggered when a particular object (e.g., a skier 102a) is detected. Alternatively, or in addition, flight paths that provide "interesting" shots may be learned by the system over time by applying machine learning.

The scenario depicted in FIG. 10 is provide for illustrative purposes and is not to be construed as limiting. Another example semantic-based objective for visual salience may include a target tracking and capturing images of a key individual in a team sporting event. Consider for example, a football game involving two teams, each with multiple players. To capture images of the game, a semantic-based objective may be configured to cause a UAV 100 to track and capture images of an object of interest such as the football, a player in current possession of the football, a player with imminent possession of the football (e.g., a receiver about to catch the football), the end zone, a referee, the coach, etc. Over the course of the game, the object or set of objects of interest will likely change from one moment to the next. Again, the manner in which the UAV 100 responds to satisfy the objective may be based on pre-scripted patterns of motion and image capture or may be learned, for example, by analyzing professional television broadcasts of sporting events.

High-Level Behavioral Objectives

Certain objectives may be based around high-level behavior such as maintaining a certain dynamic smoothness in proposed trajectories, avoiding exceeding dynamic airframe constrains, avoiding obstacle collisions, prioritizing avoiding collisions with certain classes of objects (e.g., people), avoiding running out of storage space for image capture, avoiding running out of power, etc.

Figure 11:
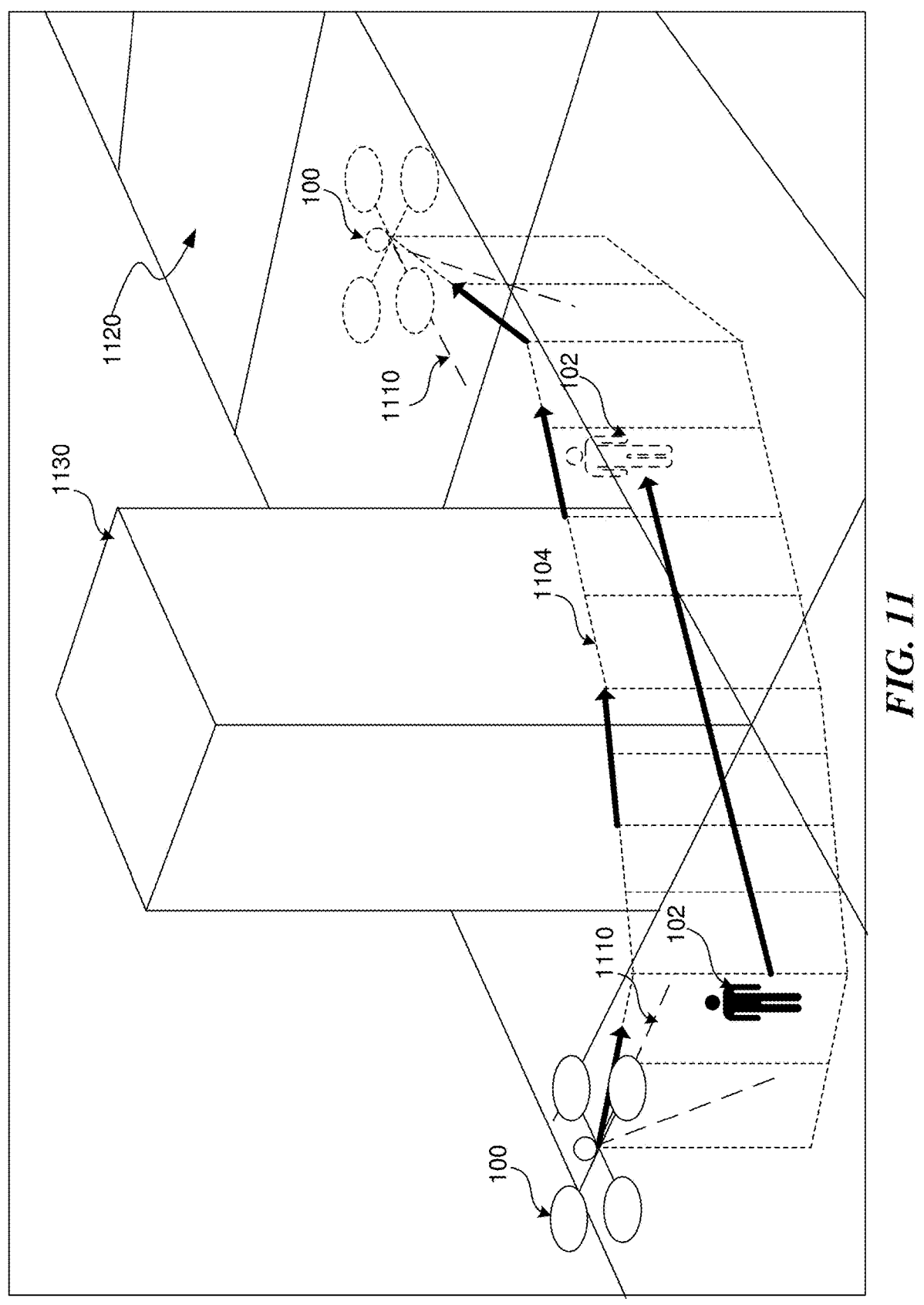
FIG. 11 shows a diagram illustrating an example objective to avoid collisions with other objects.

As an illustrative example, FIG. 11 depicts an example scenario involving a UAV 100 with a high level behavioral objective to avoid collisions with other objects. In the scenario depicted in FIG. 11, a UAV 100 is in flight through a physical environment 1120 while capturing images of a human subject 102. As shown in FIG. 11, UAV 100 may be in autonomous flight along a current planned flight path 1104 to maneuver to avoid a collision with another object 1130 in the physical environment while keeping human subject 102 in view (as indicated by FOV lines 1110. The example illustrated in FIG. 11 is idealized and shows a relatively large stationary object 1130 (for example a building or other structure), but the same concept may apply to avoid smaller mobile objects such as a bird in flight. As shown in FIG. 11, based on the estimated motions of UAV 100 and subject 102, a navigation system 120 may generate an output (e.g., control commands or a proposed trajectory) to maneuver UAV 100 along flight path 1104 to avoid object 1130 while keeping human subject 102 in view (as indicated by FOV lines 1110). Notably, this scenario illustrates a combination of multiple objectives, specifically maintaining line of sight with a tracked subject (as previously discussed) while avoiding collision. As will be discussed further, the multiple objectives may be weighted differently such that a navigation system 120 favors satisfying one objective (e.g., avoiding collision) over another (e.g., maintaining line of sight with a tracked subject) if both cannot be satisfied concurrently.

Another example high-level behavioral objective may include autonomously landing the UAV 100 when a power source (e.g., batteries) powering a propulsion system (e.g., the rotors) is at or below a threshold level of power (e.g., charge). For example, in some embodiments, if the batteries on the UAV 100 get below a certain threshold level (e.g., 5% charge), the UAV 100 may automatically land on the ground regardless of any other active objectives so as to avoid a loss of control and possible crash.

Another example high-level objective may include smoothing proposed trajectories. In many situations, particularly when performing image capture, abrupt changes in the direction of flight of the UAV 100 may not be preferred. Accordingly, in some embodiments, a navigations system may incorporate a high-level objective to maintain a certain smoothness in any generated proposed trajectory.

As suggested by the aforementioned examples, some of these high level behavioral objectives may be based around ensuring safe autonomous operation of the UAV 100. In some cases, such objectives may be built into a motion planning process of a navigation system 120 so as to always be actively considered when generating a proposed trajectory. In other words, regardless of any objectives received through calls to the API 300, the motion planning system 130 of the navigations system may always take into account certain built-in objectives such as obstacle avoidance, dynamic airframe constraints.

Objective-Based Motion Planning Using an API

In some embodiments, a navigation system 120 (e.g., specifically a motion planning component 130) is configured to incorporate multiple objectives at any given time to generate an output such as a proposed trajectory that can be used to guide the autonomous behavior of the UAV 100. The motion planning component 130 can take into consideration the dynamic constraints of the aircraft when generating outputs such as proposed trajectories. For example, given a similar set of objectives, a proposed trajectory for a quad-copter UAV such as UAV 100 may be different than a proposed trajectory for a fixed-wing UAV such as the UAV 100*b* due to the different flight capabilities of the two craft.

The trajectory generation process can include gradient-based optimization, gradient-free optimization, sampling, end-to-end learning, or any combination thereof. The output of this trajectory generation process can be a proposed trajectory over some time horizon (e.g., 10 seconds) that is configured to be interpreted and utilized by a flight controller 160 to generate control commands that cause the UAV 100 to maneuver according to the planned trajectory. A motion planning system 130 may continually perform the trajectory generation process as new perception inputs (e.g., images or other sensor data) and objective inputs are received. Accordingly, the proposed trajectory may be continually updated over some time horizon thereby enabling the UAV 100 to dynamically and autonomously respond to changing conditions.

Figure 12:
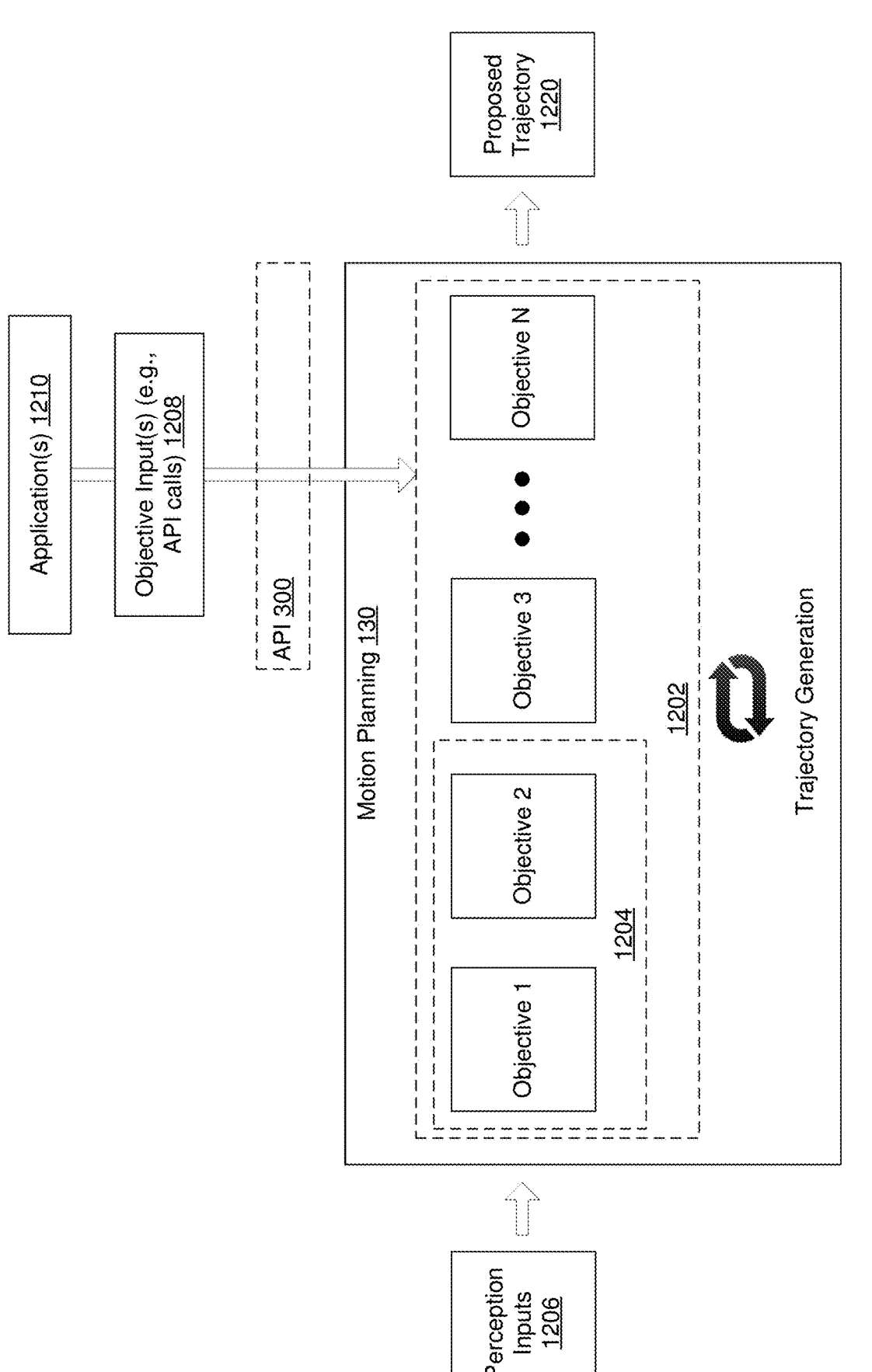
FIG. 12 shows a block diagram illustrating an example multi-objective motion planning based on objective inputs received via an API.

FIG. 12 shows a block diagram that illustrates an example system for objective-based motion planning using an API. As shown in FIG. 12, a motion planning system 130 (e.g., as discussed with respect to FIG. 2) may generate and continually update a proposed trajectory 1220 based on trajectory generation process involving one or more objectives (e.g., as previously described) and or more perception inputs 1206. The perception inputs 1206 may include images received from one or more image capture devices 114/115, results of processing such images (e.g., disparity images or depth values), and or sensor data from one or more other sensors 112 onboard the UAV 100 or associated with other computing devices (e.g., mobile device 104) in communication with the UAV 100. The one or more objectives 1202 utilized in the motion planning process may include built-in objectives governing high-level behavior (e.g., avoiding collision with other objects) as well as objectives based on inputs 1208.

The objective inputs 1208 may be in the form of calls to an API 300 by one or more applications 1210 associated with the UAV 100. An "application" in this context may include any set of instructions for performing a process to control or otherwise alter the behavior of the UAV 100 through an API 300. A developer (e.g., a third-party developer) can configure an application 1210 to send a command to the UAV 100 while in flight over a network API to alter one or more of the objectives 1202 utilized by the motion planning system 130 to alter the behavior of the UAV 100. As previously noted, the UAV 100 may be configured to maintain safe flight regardless of commands sent by an application. In other words, an application 1210 may not have access via the API 300 to alter certain core built-in objectives 1204 such as obstacle avoidance. The API 300 can therefore be used to implement applications such as a customize vehicle control, for example, through the use of a user computing device such as a mobile device 104. Such applications 1210 may be stored in a memory associated with the UAV 100 and/or stored in a memory of another computing device (e.g., mobile device 104) that is in communication (e.g., wireless communication) with the UAV 100.

Each of the objectives 1202 may be encoded as equations for incorporation in one or more motion planning equations utilized by the motion planning system 130 when generating a proposed trajectory to satisfy the one or more objectives. Parameterization for the one or more objectives 1202 may be exposed to external entities such as external applications 1210 via the public facing API 300. In other words, an application 1210 may set values for certain objectives to affect the autonomous flight of the UAV 100 through the use of calls 1208 to the API 300.

Figure 13:
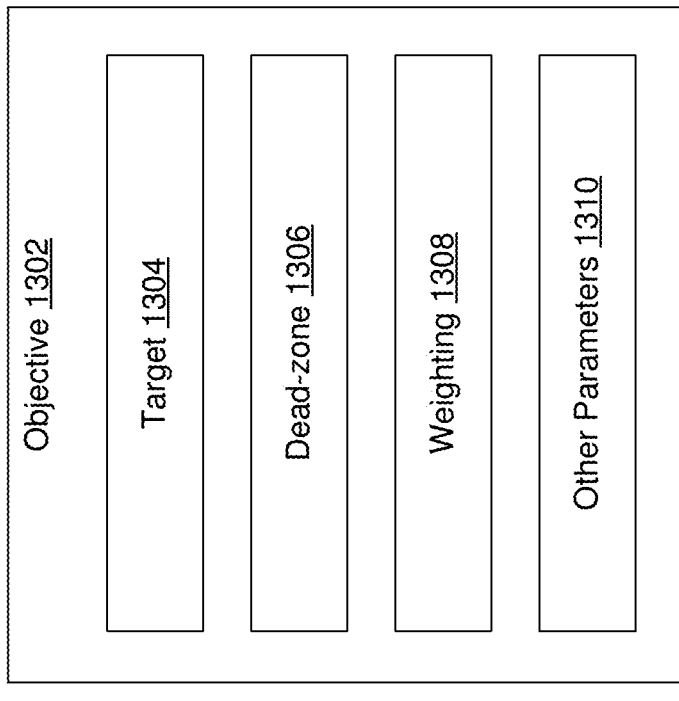
FIG. 13 shows a block diagram illustrating certain parameters of an objective.

Each given objective of the set of one or more objectives 1202 utilize in the motion planning process may include one or more defined parameterizations that are exposed through the API. For example, FIG. 13 shows an example objective 1302 that includes a target 1304, a dead-zone 1306, a weighting factor 1308, and other parameters 1310.

The target 1304 defines the goal of the particular objective that the motion planning system 130 will attempt to satisfy when proposing a trajectory 1220. For example, the target 1304 of a given objective may be to maintain line of sight with one or more detected objects in the physical environment as described with respect to FIG. 7. The target 1304 may similarly be associated with any of the other example objectives described with respect to FIGS. 4-11.

The dead-zone defines a region around the target 1304 in which the motion planning system 130 may not take action to correct. This dead-zone 1306 may be thought of as a tolerance level for satisfying a given target 1304. For example, FIG. 8 shows an example dead-zone definition in the context of an image-relative objective. As shown in FIG. 8, the target of the example image-relative objective may be to maintain image capture of a tracked object 102 such that the tracked object appears at a coordinate of (0.5, 0.7) in the image space of the captured image 802. To avoid continuous adjustments based on slight deviations from this target, a dead-zone is defined to allow for some tolerance. For example, as shown in FIG. 8, a dead-zone of 0.2 is defined in the y-direction and a dead-zone of 0.7 is defined in the x-direction. In other words, as long as the tracked object 102 appears within an area of the image bounded by the target and respective dead-zones, the objective is considered satisfied.

The weighting factor 1306 (also referred to as an "aggressiveness" factor) defines a relative level of impact the particular objective 1302 will have on the overall trajectory generation process performed by the motion planning system 130. Recall that a particular objective 1302 may be one of several objectives 1202 that may include competing targets. In an ideal scenario, the motion planning system 130 will generate a proposed trajectory 1220 that perfectly satisfies all of the relevant objectives at any given moment. For example, the motion planning system 130 may generate a proposed trajectory that maneuvers the UAV 100 to a particular GPS coordinate while following a tracked object, capturing images of the tracked object, maintaining line of sight with the tracked object, and avoiding collisions with other objects. In practice, such an ideal scenario may be rare. Accordingly, the motion planning system 130 may need to favor one objective over another when the satisfaction of both is impossible or impractical (for any number of reasons). The weighting factors for each of the objectives 1202 define how they will be considered by the motion planning system 130.

In an example embodiment, a weighting factor is numerical value on a scale of 0.0 to 1.0. A value of 0.0 for a particular objective may indicate that the motion planning system 130 can completely ignore the objective (if necessary), while a value of 1.0 may indicate that the motion planning system 130 will make a maximum effort to satisfy the objective while maintaining safe flight. A value of 0.0 may similarly be associated with an inactive objective and may be set to zero, for example, in response to toggling by an application 1210 of the objective from an active state to an inactive state. Low weighting factor values (e.g., 0.0-0.4) may be set for certain objectives that are based around subjective or aesthetic targets such as maintaining visual saliency in the captured images. Conversely, higher weighting factor values (e.g., 0.5-1.0) may be set for more critical objectives such as avoiding a collision with another object.

In some embodiments, the weighting factor values 1308 may remain static as a proposed trajectory is continually updated while the UAV 100 is in flight. Alternatively, or in addition, weighting factors for certain objectives may dynamically change based on changing conditions, while the UAV 100 is in flight. For example, an objective to avoid an area associated with depth value calculations in captured images (e.g., due to low light conditions) may have a variable weighting factor that increases or decreases based on other perceived threats to the safe operation of the UAV 100. In some embodiments, an objective may be associated with multiple weighting factor values that change depending on how the objective is to be applied. For example, a collision avoidance objective may utilize a different weighting factor depending on the class of a detected object that is to be avoided. As an illustrative example, the system may be configured to more heavily favor avoiding a collision with a person or animal as opposed to avoiding a collision with a building or tree.

In some embodiments, a notification is returned to an API caller (e.g., an application 1210) in the event that an objective is requested (e.g., via a call 1208 to an API 300), but not satisfied (e.g., due to competing objectives, vehicle constraints, or other reasons). The API 300 may provide an endpoint for providing this notification so that the caller (e.g., an application 1210) can take appropriate action such as notifying a user, adjusting the requested objective, etc.

Skills Built on the API

As previously discussed, applications (e.g., applications 1210) can be built on a public facing API 300 to augment the behavior of a UAV 100 and/or an experience of a user interacting with the UAV 100. In some embodiments, particularly in the context of a UAV 100 with image capture capabilities, applications can be developed around sets of instructions and assets that enable high-level autonomous behavior by the UAV 100. These instructions and/or assets may govern various aspects of the behavior of the UAV 100, the capture and processing of images by the UAV 100, and user interactions with the UAV 100. As previously mentioned, these sets of instructions and/or assets are referred to as "skills."

Figure 14:
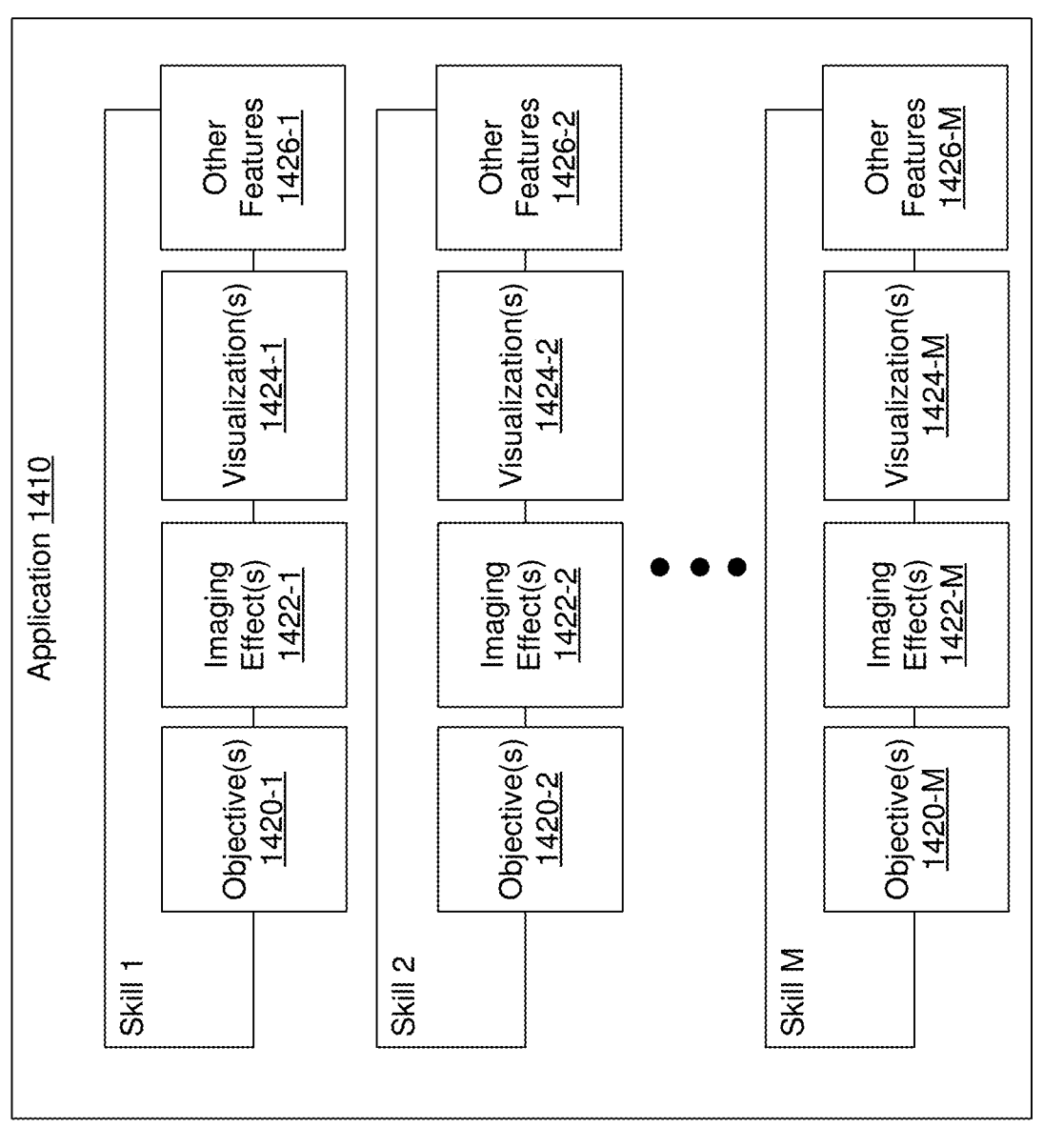
FIG. 14 shows a block diagram illustrating components of example skills in an example application built on an API.

As shown in FIG. 14, an application 1410 may include one or more skills 1 through M. Further, each skill may include instructions related to certain navigation and/or image capture objectives 1420-1 through M, imaging effects 1422-1, visualizations 1424-1 through M, and other features 1426-1 through M.

For example, with respect to skill 1, objective(s) 1420-1 may include instructions for modifying the objectives utilized by a motion planning system 130 of the UAV 100, for example, by generating calls to an API 300 to set and/or modify certain parameters of one or more objectives. These instructions may govern the motion of the UAV 100 as well as other behavioral aspects such as object tracking, adjusting the orientation of an image capture device 115, etc.

Imaging effects 1422-1 may include instructions and/or assets for processing images captured by an image capture device 114/115 to change the appearance of captured images. Imaging effects may include any manipulations made to the captured images such scaling, geometric transformations (2D and/or 3D), transparency operations, splicing and/or cropping, sharpening, color correction, contrast adjustment, filters, etc. For example, a developer may configure a skill to present options to a user to select various pre-defined imaging effects to apply in real time as the UAV is in flight and capturing images and/or as part of a post-production process. Alternatively, or in addition, a developer may configure a skill to automatically apply certain imaging effects (in real time or post-production) based on contextual cues in the captured images. For example, a skill may be configured to apply a particular imaging effect (e.g., a predefined filter) to captured images in response to detecting a tracking a particular class of object or activity in the captured images.

Visualizations 1422-1 may include instructions and/or assets for providing visual output to a user. For example, visualizations 1422-1 may include augmented reality (AR) object descriptions that can be rendered in real-time or near-real-time (e.g., within milliseconds) to generate AR overlays that are displayed relative to tracked objects or other elements in the physical environment. An example of an augmented reality interface that may be implemented in conjunction with a UAV 100 is described with respect to FIG. 16.

In some embodiments, the UAV 100 may include onboard memory for storing one or more skills as well as a sandboxed execution environment executing the skills. For example, the sandboxed execution environment may be configured such that executing skills impact the behavior of the UAV 100 through calls to the API 300, but otherwise do not impact operation of the core navigation system 130. In this way, active skills can be safely changed while the UAV 100 is in flight without negatively impacting the safe flight of the UAV 100. In some embodiments, skills may execute at an external device such as a mobile device 104 and/or at an external data processing service such as a cloud-based computing environment utilizing multiple machines. In such cases, execution of the skills may generate outputs (e.g., control commands) that are then transmitted to the UAV 100 (e.g., via a wireless communication link) to control certain behavior of the UAV 100.

Skills can be configured to handle certain inputs from external sources to govern any of the aforementioned behaviors of a UAV 100. For example, a skill can be configured to receive inputs from a mobile device 104 (e.g., based on inputs by a user), from another UAV, from a cloud-computing services, or from any other external sources. Such inputs may cause the skill to govern behavior by the UAV 100 such as maneuvers or additional objectives that reside in a null-space of a set of objectives specified by the skill and/or alterations of a set of active objectives associated with a skill, in their set-point, dead-zone, or weighting factor settings.

In some embodiments, skills can be configured to include adjustable settings that can be set (e.g., based on input from a user via an application) while the UAV 100 is in flight. For example, a skill based around tracking and capturing images of objects in the physical environment can be configured to respond to a user input identifying a particular object to track. Such a user input may be received via an interface similar to the AR interface described with respect to FIG. 16.

Simulation Environment for Developing Skills

In some embodiments, users (e.g., developers and/or end-users) may be allowed to develop their own skills, for example, by using an application at a mobile device 104. Without requiring a deep understanding of the complex processes involved in the autonomous behavior of the UAV 100, users may develop customized skills that combine various behavioral objectives with imaging effects, visualizations, etc., as previously discussed. These components may be presented via an application as tools that can be selected and configured by a user to create customized skills.

A simulation environment may be implemented to aid users in the development of customized skills. The simulation environment may be an online environment that offers a realistic physics based representation of the UAV 100 along with its various relevant systems (e.g., image capture devices, sensors, navigation system, etc.). The simulation environment can be configured to accurately simulate a behavioral response, by a UAV 100, to customized skills. Using the simulation environment, users can create and/or modify any code or asset in a skill to create customized skill. Users can then execute their customized skills using the simulation environment and view a simulated response of the UAV 100 to the skill in the context of a physical environment with other objects present. For example, a user may wish to simulate a response by a UAV 100 to a customized skill based around tracking and capturing images of objects in motion. The simulation environment may simulate such objects in motion that are then detected by the simulated perception systems (e.g., image capture devices, etc.) onboard the simulated UAV 100. Users can edit, save, and/or upload the skills that they create, for example, to for use in a real UAV 100 and/or to share with other users.

Application Store for Sharing Skills

In some embodiments, skills created by users can be uploaded to an online storefront (e.g., an "app store") for sharing or sale. Other users can then browse listings of skills that others have created and download selected skills for simulation in a simulation environment and/or use with a real UAV 100. Users can comment on skills while sharing them through the online storefront. Further, when uploading skills to the online storefront, users can also upload images (e.g., video) captured when executing the skills using a device such as a UAV 100. In this way, other users can observe what to expect when using an uploaded skill.

In some embodiments, the public online storefront may be regulated to maintain certain standards around the skills created by users. For example, the public online storefront may include an automated framework that tests uploaded skills (e.g., using a simulation environment) to ensure that the uploaded skills at least do not interfere with the safe operation of a UAV 100. The automated framework may also screen uploaded skills for other criteria such as compliance with applicable regulations, privacy concerns, etc.

Skills as a Learning and Verification Tool for Improving Autonomous Behavior

The results of simulation and implementation of skills created by multiple users (developers and/or end-users) may serve as a valuable dataset. The data may be used to improve the autonomous behavior of a UAV 100 and by extension user experiences, for example, through conducting studies and/or training machine learning processes. In some embodiments, a simulation environment (similar to as previously described) can be implemented as a verification tools to run large numbers of simulations of skills created by other users. Data collected from the running of these simulations can be used, for example, to study and verify vehicle software integrity, perception changes, and/or improvements for future software updates.

An example machine learning application includes learning when users select certain skills in response to contextual factors such as information in captured images, position of tracked objects, semantic cues in the surrounding physical environment, or any other perceived feedback. Information learned through observing user selections of skills can be used to guide the automatic selection of skills while a UAV 100 is in flight based on any of the aforementioned factors. Another example machine learning application includes creating a skill that causes a specific type of motion or response and using data collected about the conditions in which users activate such skills to inform learned policies and/or modify certain parameters associated with the skill. For example, a skill configured to cause a UAV 100 to "squeeze through a gap" can be used to learn, based on perception inputs, which objects in the physical world are safe to fly near. Such a specific skill may also be used to determine whether built-in obstacle avoidance behavior is configured too aggressively or too conservatively.

Visual Outputs Based on Skills

Figure 15:
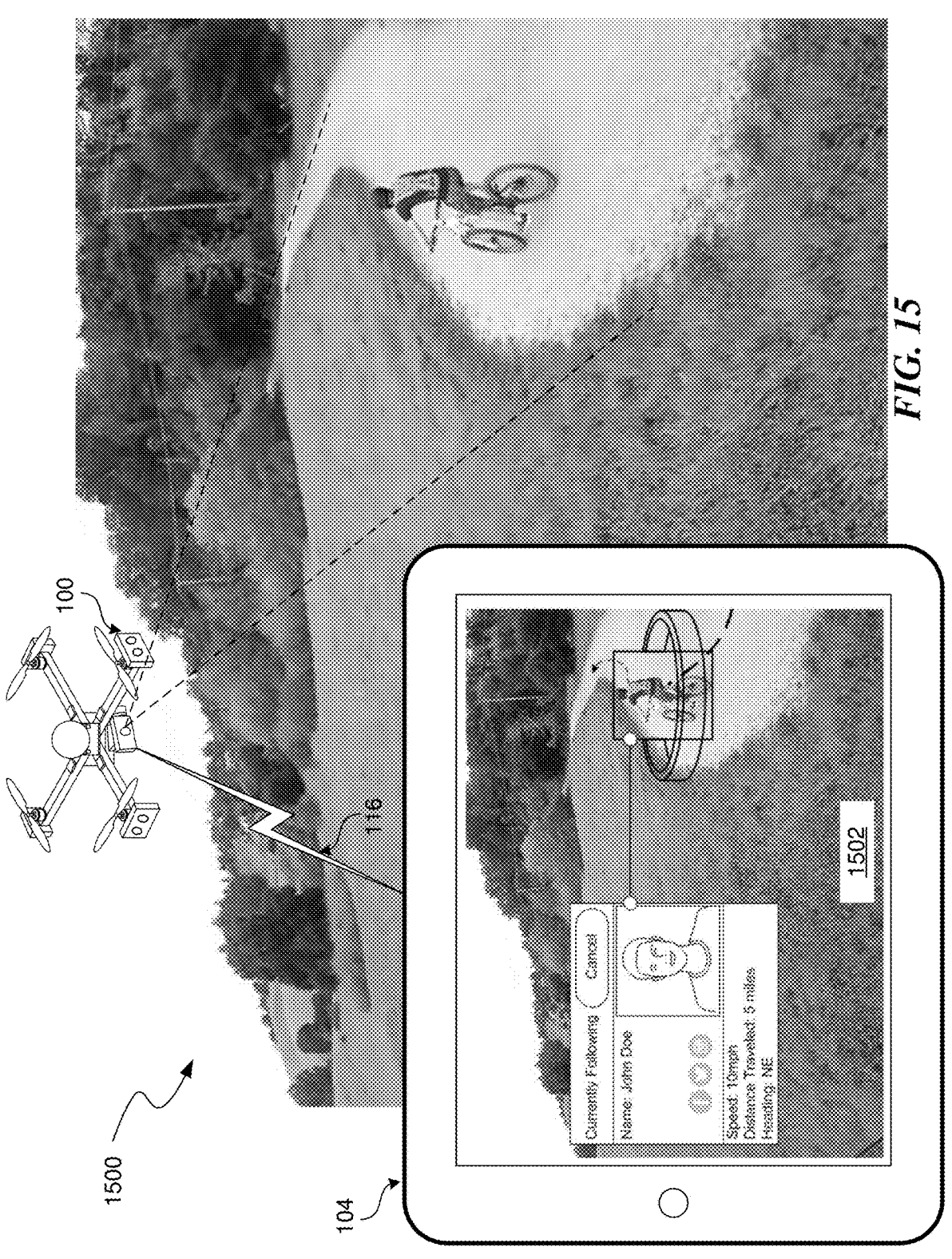
FIG. 15 shows an example of a visual output displayed via a mobile device computing device.

In some embodiments, skills can be configured to cause display of a visual output to user, for example, based on images captured from a UAV 100. FIG. 15 shows an example of a visual output 1502 displayed via a mobile device 104 in the form of a tablet display device. As indicated in FIG. 15, the mobile device 104 may be communicatively coupled with a UAV 100 in flight through a physical environment 1500 via a wireless communication link 116. The UAV 100 autonomously navigates the physical environment based on one or more navigation objectives, for example, associated with an active skill, as previously discussed. The skill may further include instructions and/or assets configured to cause display of a visual output 1502 via the mobile device 104. The visual output 1502 may include a live video feed from an image capture device 114/115 onboard the UAV 100, recorded video from an image capture device 114/115 onboard the UAV 100, a rendering of a computer-generated model of the physical environment 1500 (e.g., based on data from the image capture device 114/115 and/or other sensors 112 onboard the UAV 100), and the like. As previously discussed, in some embodiments, a skill may include instructions and/or assets for processing captured images to apply imaging effects and/or other visualizations. For example, display output 1502 depicts a composite of a live video feed of the physical environment 1500 from the UAV 100 with added graphical elements (e.g., imaging effects, graphical overlays, interactive graphical interface features, etc.).

In some embodiments, a visual output based on a skill can include generated and displayed "augmentations." Devices configured for augmented reality (AR devices) can deliver to a user a direct or indirect view of a physical environment which includes objects that are augmented (or supplemented) by computer-generated sensory outputs such as sound, video, graphics, or any other data that may augment (or supplement) a user's perception of the physical environment. For example, data gathered or generated by a tracking system 140 regarding a tracked object in the physical environment can be displayed to a user in the form of graphical overlays via an AR device. Such augmentations may be displayed via the AR device while the UAV 100 is in flight through the physical environment and actively tracking the object and/or as an augmentation to video recorded by the UAV 100 after the flight has completed. Examples of AR devices that may be utilized to implement such functionality include smartphones, tablet computers, laptops, head mounted display devices (e.g., Microsoft HoloLens™, Google Glass™), virtual retinal display devices, heads up display (HUD) devices in vehicles, etc. For example, the previously mentioned mobile device 104 may be configured as an AR device. Note that for illustrative simplicity the term "AR device" is used herein to describe any type of device capable of presenting augmentations (visible, audible, tactile, etc.) to a user. The term "AR device" shall be understood to also include devices not commonly referred to as AR devices such as virtual reality (VR) headset devices (e.g., Oculus Rift™).

Figure 16:
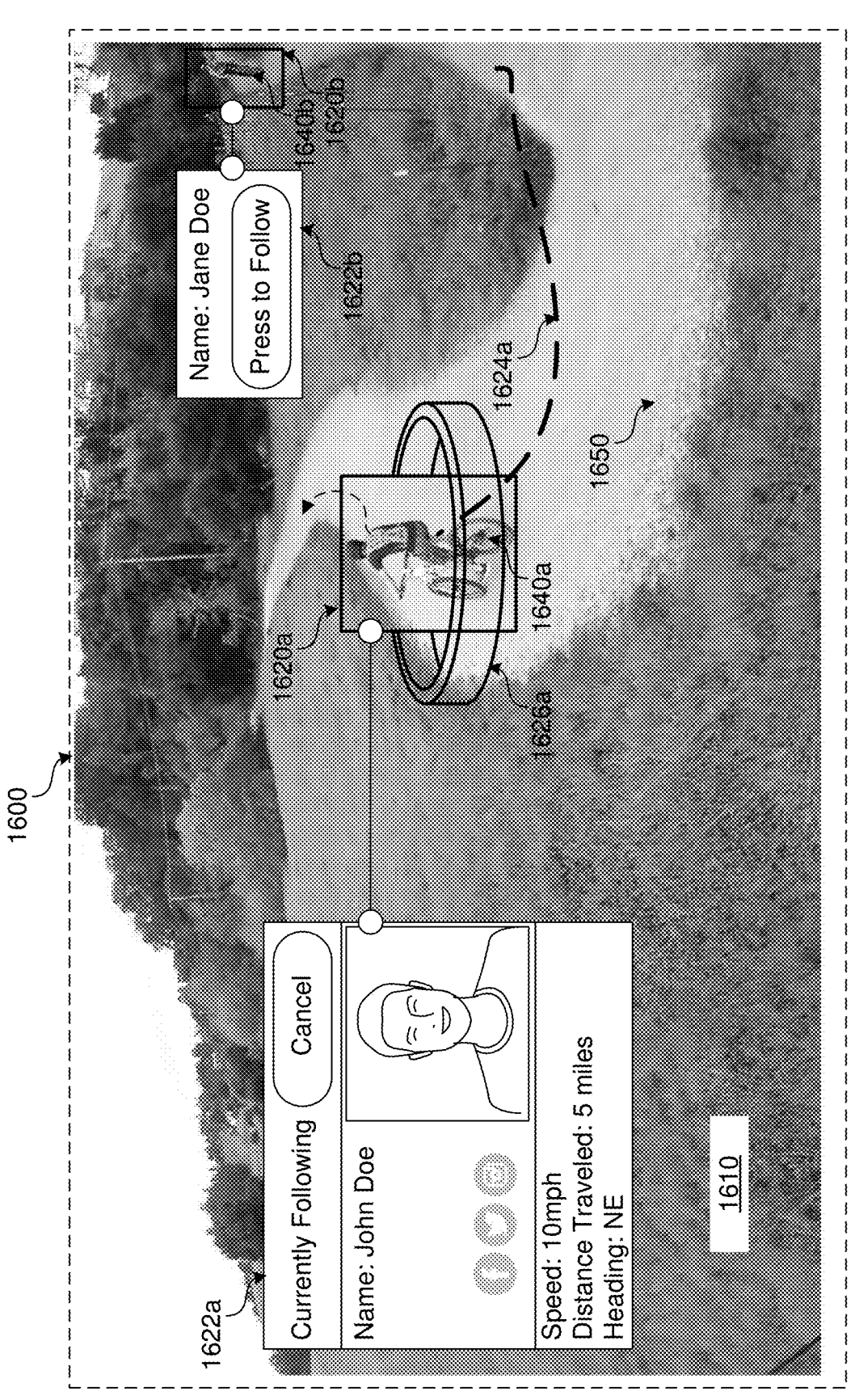
FIG. 16 shows an example of an augmented reality (AR) visual output.

FIG. 16 shows an example view 1600 of a physical environment 1610 as presented at a display of an AR device. For example, the view 1600 may correspond with display 1502 presented via a mobile tablet device 104 as shown in FIG. 15. The view 1600 of the physical environment 1610 shown in FIG. 16 may be generated based on images captured by one or more image capture devices 114/115 of a UAV 100 and be displayed to a user via the AR device in real-time or near-real-time as the UAV 100 is flying through the physical environment 1610 capturing the images. As shown in FIG. 16, one or more augmentations may be presented to the user in the form of augmenting graphical overlays 1620a, 1622a, 1624a, 1626a, and 1620b associated with objects (e.g., bikers 1640a and 1640b) in the physical environment 1610. For example, in an embodiment, the aforementioned augmenting graphical overlays may be generated and composited with video captured by UAV 100 as the UAV 100 tracks biker 1640a. The composite including the captured video and the augmenting graphical overlays may be displayed to the user via a display of the AR device (e.g., a smartphone). In other embodiments, the AR device may include a transparent display (e.g., a head mounted display) through which the user can view the surrounding physical environment 1610. The transparent display may comprise a waveguide element made of a light-transmissive material through which projected images of one or more of the aforementioned augmenting graphical overlays are propagated and directed at the eyes of the user such that the projected images appear to the user to overlay the user's view of the physical environment 1610 and correspond with particular objects or points in the physical environment.

In some embodiments augmentations may include labels with information associated with objects detected in the physical environment 1610. For example, FIG. 16 illustrates a scenario in which UAV 100 has detected and is tracking a first biker 1640a and a second biker 1640b. In response, one or more augmenting graphical overlays associated with the tracked objects may be displayed via the AR device at points corresponding to the locations of the bikers 1640a-b as they appear in the captured image.

In some embodiments, augmentations may indicate specific object instances that are tracked by UAV 100. In the illustrative example provided in FIG. 16, such augmentations are presented as augmenting graphical overlays 1620a-b in the form of boxes that surround the specific object instances 1640a-b (respectively). This is just an example provided for illustrative purposes. Indications of object instances may be presented using other types of augmentations (visual or otherwise).

In some embodiments, augmentations may include identifying information associated with detected objects. For example, augmenting graphical overlays 1622a-b include names of the tracked bikers 1640a-b (respectively). Further, augmenting graphical overlay 1622a includes a picture of biker 1640a. In some embodiments, information such as the picture of the biker 1640a may be automatically pulled from an external source such as a social media platform (e.g., Facebook™ Twitter™, Instagram™, etc.). Although not shown in FIG. 16, augmentations may also include avatars associated with identified people. Avatars may include 3D graphical reconstructions of the tracked person (e.g., based on captured images and other sensor data), generative "bit-moji" from instance segmentations, or any other type of generated graphics representative of tracked objects.

In some embodiments, augmentation may include information regarding an activity or state of the tracked object. For example, augmenting graphical overlay 1622a includes information regarding the speed, distance traveled, and current heading of biker 1640a. Other information regarding the activity of a tracked object may similarly be displayed.

In some embodiments, augmentations may include visual effects that track or interact with tracked objects. For example, FIG. 16 shows an augmenting graphical overlay 1624a in the form of a projection of a 3D trajectory (e.g., current, past, and/or future) associated with biker 1640a. In some embodiments, trajectories of multiple tracked objects may be presented as augmentations. Although not shown in FIG. 16, augmentations may also include other visual effects such as halos, fireballs, dropped shadows, ghosting, multi-frame snapshots, etc.

Semantic knowledge of objects in the physical environment may also enable new AR user interaction paradigms. In other words, certain augmentations may be interactive and allow a user to control certain aspects of the flight of the UAV 100 and/or image capture by the UAV 100. Illustrative examples of interactive augmentations may include an interactive follow button that appears above moving objects. For example, in the scenario depicted in FIG. 16, a UAV is tracking the motion of both bikers 1640a and 1640b, but is actively following (i.e., at a substantially constant separation distance) the first biker 1640a. This is indicated in the augmenting graphical overlay 1622a that states "currently following." Note that a corresponding overlay 1622b associated with the second biker 1640b includes an interactive element (e.g., a "push to follow" button), that when pressed by a user, would cause the UAV 100 to stop following biker 1640a and begin following biker 1640b. Similarly, overlay 1622a includes an interactive element (e.g., a "cancel" button), that when pressed by a user, would cause the UAV 100 to stop following biker 1640a. In such a situation, the UAV 100 may revert to some default autonomous navigation objective, for example, following the path the bikers are traveling on but not any one biker in particular.

Other similar interactive augmentations may also be implemented. For example, although not shown in FIG. 16, users may inspect certain objects, for example, by interacting with the visual depictions of the objects as presented by the AR device. For example, if the AR device includes a touch screen display, a user may cause the UAV 100 to follow the object simply by touching a region of the screen corresponding to the displayed object. This may also be applied to static objects that are not in motion. For example, by interacting with a region of the screen of an AR device corresponding to the displayed path 1650, an AR interface may display information regarding the path (e.g., source, destination, length, material, map overlay, etc.) or may cause the UAV to travel along the path at a particular altitude.

The size and geometry of detected objects may be taken into consideration when presenting augmentations. For example, in some embodiments, an interactive control element may be displayed as a ring about a detected object in an AR display. For example, FIG. 16 shows a control element 1626*a* shown as a ring that appears to encircle the first biker 1640. The control element 1626*a* may respond to user interactions to control an angle at which UAV 100 captures images of the biker 1640*a*. For example, in a touch screen display context, a user may swipe their finger over the control element 1626*a* to cause the UAV 100 to revolve about the biker 1640*a* (e.g., at a substantially constant range) even as the biker 1640*a* is in motion. Other similar interactive elements may be implemented to allow the user to zoom image captured in or out, pan from side to side, etc.

Localization

Figure 17:
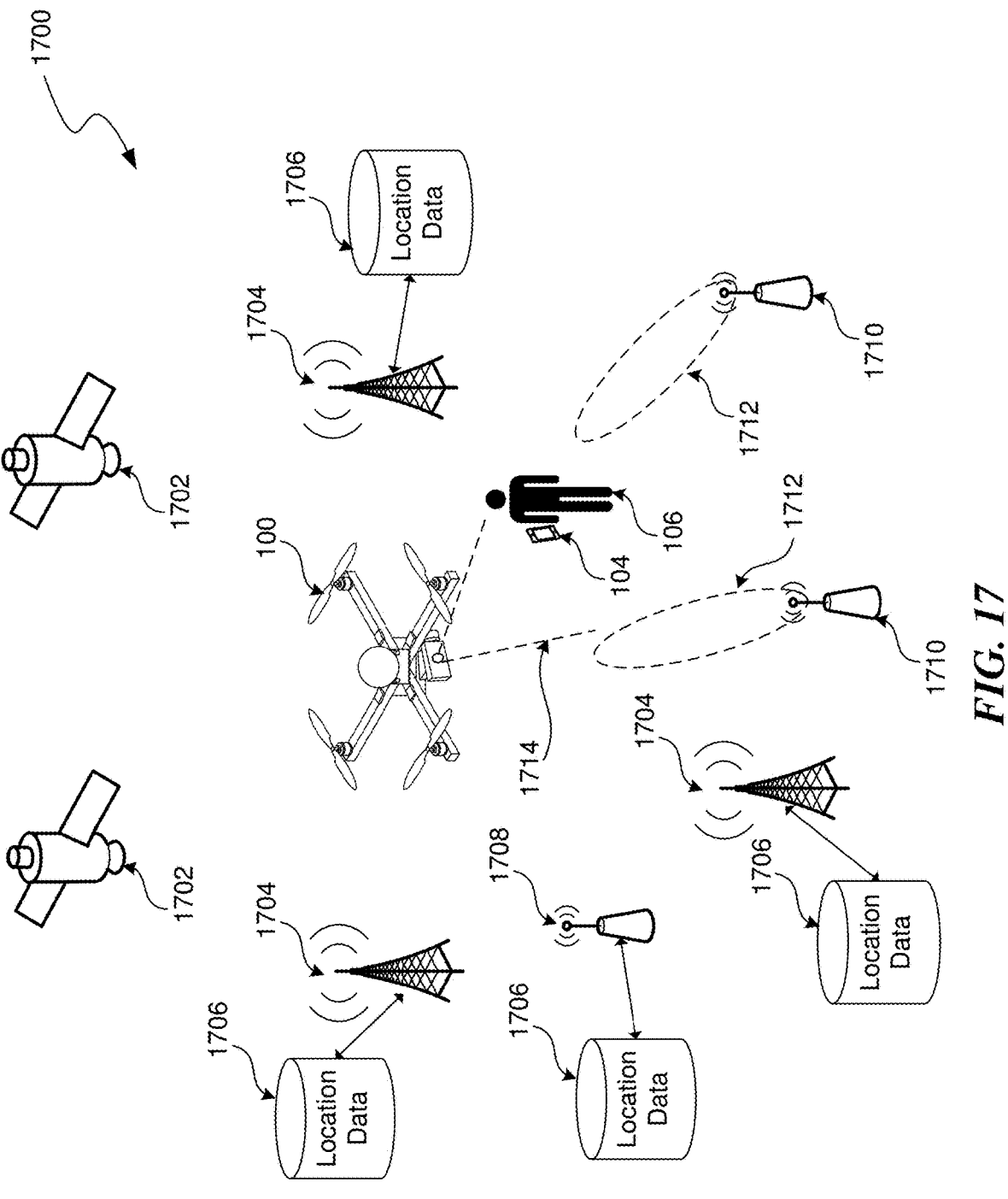
FIG. 17 shows a diagram of an example localization system with which at least some operations described in this disclosure can be implemented.

A navigation system 120 of a UAV 100 may employ any number of other systems and techniques for localization. FIG. 17 shows an illustration of an example localization system 1000 that may be utilized to guide autonomous navigation of a vehicle such as UAV 100. In some embodiments, the positions and/or orientations of the UAV 100 and various other physical objects in the physical environment can be estimated using any one or more of the subsystems illustrated in FIG. 17. By tracking changes in the positions and/or orientations over time (continuously or at regular or irregular time intervals (i.e., continually)), the motions (e.g., velocity, acceleration, etc.) of UAV 100 and other objects may also be estimated. Accordingly, any systems described herein for determining position and/or orientation may similarly be employed for estimating motion.

As shown in FIG. 17, the example localization system 1700 may include the UAV 100, a global positioning system (GPS) comprising multiple GPS satellites 1702, a cellular system comprising multiple cellular antennae 1704 (with access to sources of localization data 1706), a Wi-Fi system comprising multiple Wi-Fi access points 1708 (with access to sources of localization data 1706), and/or a mobile device 104 operated by a user 106.

Satellite-based positioning systems such as GPS can provide effective global position estimates (within a few meters) of any device equipped with a receiver. For example, as shown in FIG. 17, signals received at a UAV 100 from satellites of a GPS system 1702 can be utilized to estimate a global position of the UAV 100. Similarly, positions relative to other devices (e.g., a mobile device 104) can be determined by communicating (e.g., over a wireless communication link 116) and comparing the global positions of the other devices.

Localization techniques can also be applied in the context of various communications systems that are configured to transmit communications signals wirelessly. For example, various localization techniques can be applied to estimate a position of UAV 100 based on signals transmitted between the UAV 100 and any of cellular antennae 1704 of a cellular system or Wi-Fi access points 1708, 1710 of a Wi-Fi system. Known positioning techniques that can be implemented include, for example, time of arrival (ToA), time difference of arrival (TDoA), round trip time (RTT), angle of Arrival (AoA), and received signal strength (RSS). Moreover, hybrid positioning systems implementing multiple techniques such as TDoA and AoA, ToA and RSS, or TDoA and RSS can be used to improve the accuracy.

Some Wi-Fi standards, such as 802.11ac, allow for RF signal beamforming (i.e., directional signal transmission using phased-shifted antenna arrays) from transmitting Wi-Fi routers. Beamforming may be accomplished through the transmission of RF signals at different phases from spatially distributed antennas (a "phased antenna array") such that constructive interference may occur at certain angles while destructive interference may occur at others, thereby resulting in a targeted directional RF signal field. Such a targeted field is illustrated conceptually in FIG. 17 by dotted lines 1712 emanating from Wi-Fi routers 1710.

An inertial measurement unit (IMU) may be used to estimate position and/or orientation of device. An IMU is a device that measures a vehicle's angular velocity and linear acceleration. These measurements can be fused with other sources of information (e.g., those discussed above) to accurately infer velocity, orientation, and sensor calibrations. As described herein, a UAV 100 may include one or more IMUs. Using a method commonly referred to as "dead reckoning," an IMU (or associated systems) may estimate a current position based on previously measured positions using measured accelerations and the time elapsed from the previously measured positions. While effective to an extent, the accuracy achieved through dead reckoning based on measurements from an IMU quickly degrades due to the cumulative effect of errors in each predicted current position. Errors are further compounded by the fact that each predicted position is based on a calculated integral of the measured velocity. To counter such effects, an embodiment utilizing localization using an IMU may include localization data from other sources (e.g., the GPS, Wi-Fi, and cellular systems described above) to continually update the last known position and/or orientation of the object. Further, a nonlinear estimation algorithm (one embodiment being an "extended Kalman filter") may be applied to a series of measured positions and/or orientations to produce a real-time prediction of the current position and/or orientation based on assumed uncertainties in the observed data. Kalman filters are commonly applied in the area of aircraft navigation, guidance, and controls.

Computer vision may be used to estimate the position and/or orientation of a capturing camera (and by extension a device to which the camera is coupled) as well as other objects in the physical environment. The term, "computer vision" in this context may generally refer to any method of acquiring, processing, analyzing and "understanding" captured images. Computer vision may be used to estimate position and/or orientation using a number of different methods. For example, in some embodiments, raw image data received from one or more image capture devices (onboard or remote from the UAV 100) may be received and processed to correct for certain variables (e.g., differences in camera orientation and/or intrinsic parameters (e.g., lens variations)). As previously discussed with respect to FIG. 1, the UAV 100 may include two or more image capture devices 114/115. By comparing the captured image from two or more vantage points (e.g., at different time steps from an image capture device in motion), a system employing computer vision may calculate estimates for the position and/or orientation of a vehicle on which the image capture device is mounted (e.g., UAV 100) and/or of captured objects in the physical environment (e.g., a tree, building, etc.).

Figure 18:
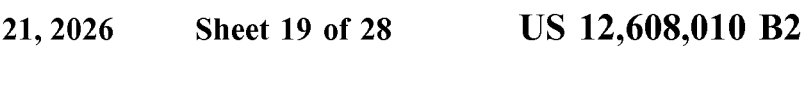
FIG. 18 shows a diagram illustrating the concept of visual odometry based on captured images.

Computer vision can be applied to estimate position and/or orientation using a process referred to as "visual odometry." FIG. 18 illustrates the working concept behind visual odometry at a high level. A plurality of images are captured in sequence as an image capture device moves through space. Due to the movement of the image capture device, the images captured of the surrounding physical environment change from frame to frame. In FIG. 18, this is illustrated by initial image capture FOV 1852 and a subsequent image capture FOV 1854 captured as the image capture device has moved from a first position to a second position over a period of time. In both images, the image capture device may capture real world physical objects, for example, the house 1880 and/or the person 1802. Computer vision techniques are applied to the sequence of images to detect and match features of physical objects captured in the FOV of the image capture device. For example, a system employing computer vision may search for correspondences in the pixels of digital images that have overlapping FOV. The correspondences may be identified using a number of different methods such as correlation-based and feature-based methods. As shown in, in FIG. 18, features such as the head of a human subject 1802 or the corner of the chimney on the house 1880 can be identified, matched, and thereby tracked. By incorporating sensor data from an IMU (or accelerometer(s) or gyro scope(s)) associated with the image capture device to the tracked features of the image capture, estimations may be made for the position and/or orientation of the image capture relative to the objects 1880, 1802 captured in the images. Further, these estimates can be used to calibrate various other systems, for example, through estimating differences in camera orientation and/or intrinsic parameters (e.g., lens variations) or IMU biases and/or orientation. Visual odometry may be applied at both the UAV 100 and any other computing device such as a mobile device 104 to estimate the position and/or orientation of the UAV 100 and/or other objects. Further, by communicating the estimates between the systems (e.g., via a wireless communication link 116) estimates may be calculated for the respective positions and/or orientations relative to each other. Position and/or orientation estimates based in part on sensor data from an on board IMU may introduce error propagation issues. As previously stated, optimization techniques may be applied to such estimates to counter uncertainties. In some embodiments, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Such estimation algorithms can be similarly applied to produce smooth motion estimations.

In some embodiments, data received from sensors onboard UAV 100 can be processed to generate a 3D map of the surrounding physical environment while estimating the relative positions and/or orientations of the UAV 100 and/or other objects within the physical environment. This process is sometimes referred to as simultaneous localization and mapping (SLAM). In such embodiments, using computer vision processing, a system in accordance with the present teaching can search for dense correspondence between images with overlapping FOV (e.g., images taken during sequential time steps and/or stereoscopic images taken at the same time step). The system can then use the dense correspondences to estimate a depth or distance to each pixel represented in each image. These depth estimates can then be used to continually update a generated 3D model of the physical environment taking into account motion estimates for the image capture device (i.e., UAV 100) through the physical environment.

In some embodiments, a 3D model of the surrounding physical environment may be generated as a 3D occupancy map that includes multiple voxels with each voxel corresponding to a 3D volume of space in the physical environment that is at least partially occupied by a physical object.

Figure 19:
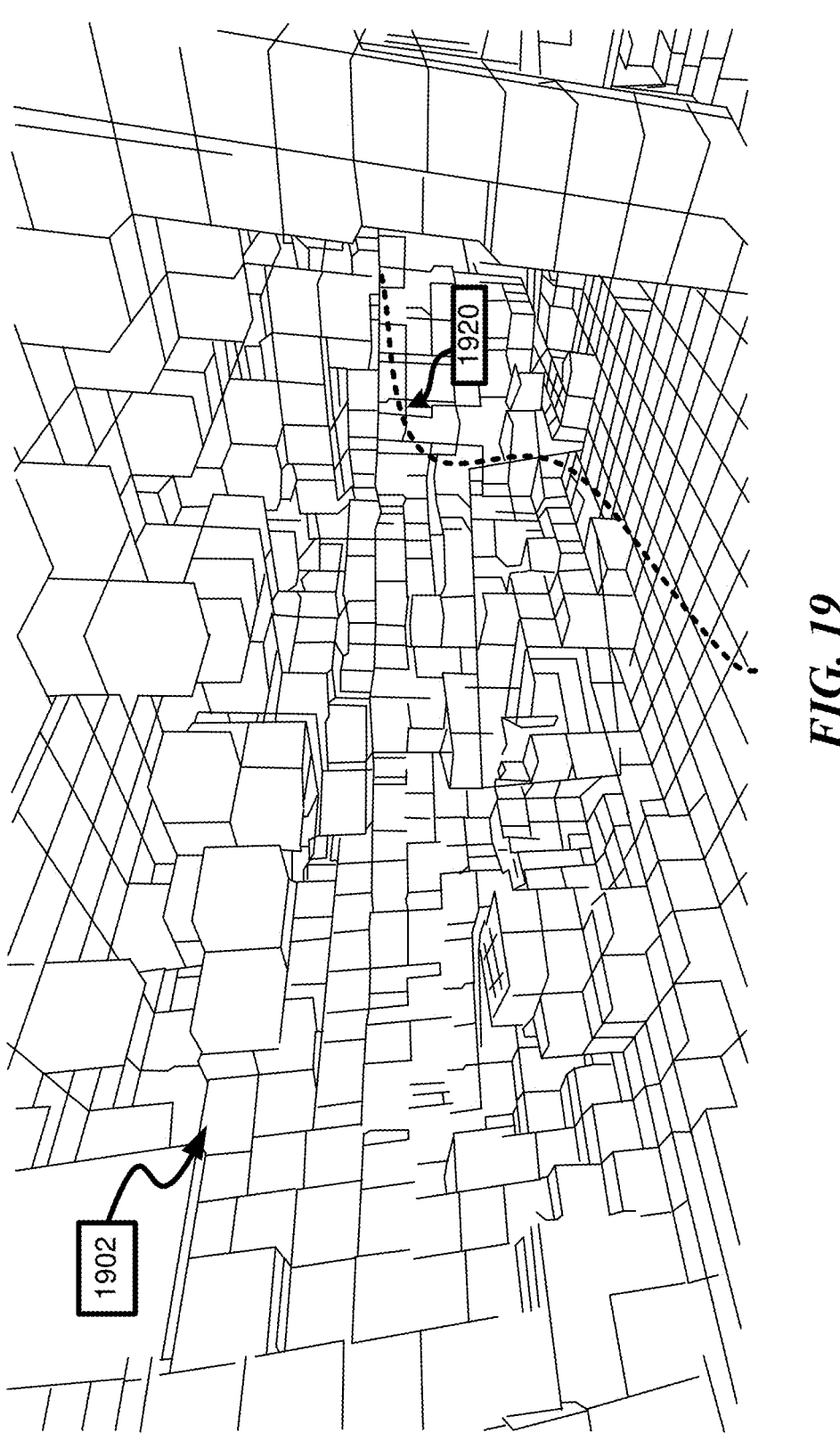
FIG. 19 shows an example view of a three-dimensional (3D) occupancy map of a physical environment.

For example, FIG. 19 shows an example view of a 3D occupancy map 1902 of a physical environment including multiple cubical voxels. Each of the voxels in the 3D occupancy map 1902 correspond to a space in the physical environment that is at least partially occupied by a physical object. A navigation system 120 of a UAV 100 can be configured to navigate the physical environment by planning a 3D trajectory 1920 through the 3D occupancy map 1902 that avoids the voxels. In some embodiments, this 3D trajectory 1920 planned using the 3D occupancy map 1902 can be updated by applying an image space motion planning process. In such an embodiment, the planned 3D trajectory 1920 of the UAV 100 is projected into an image space of captured images for analysis relative to certain identified high cost regions (e.g., regions having invalid depth estimates).

Computer vision may also be applied using sensing technologies other than cameras, such as light detection and ranging (LIDAR) technology. For example, a UAV 100 equipped with LIDAR may emit one or more laser beams in a scan up to 360 degrees around the UAV 100. Light received by the UAV 100 as the laser beams reflect off physical objects in the surrounding physical world may be analyzed to construct a real time 3D computer model of the surrounding physical world. Depth sensing through the use of LIDAR may in some embodiments augment depth sensing through pixel correspondence as described earlier. Further, images captured by cameras (e.g., as described earlier) may be combined with the laser constructed 3D models to form textured 3D models that may be further analyzed in real time or near real time for physical object recognition (e.g., by using computer vision algorithms).

The computer vision-aided localization techniques described above may calculate the position and/or orientation of objects in the physical world in addition to the position and/or orientation of the UAV 100. The estimated positions and/or orientations of these objects may then be fed into a motion planning system 130 of the navigation system 120 to plan paths that avoid obstacles while satisfying certain objectives (e.g., as previously described). In addition, in some embodiments, a navigation system 120 may incorporate data from proximity sensors (e.g., electromagnetic, acoustic, and/or optics based) to estimate obstacle positions with more accuracy. Further refinement may be possible with the use of stereoscopic computer vision with multiple cameras, as described earlier.

The localization system 1000 of FIG. 17 (including all of the associated subsystems as previously described) is only one example of a system configured to estimate positions and/or orientations of a UAV 100 and other objects in the physical environment. A localization system 1700 may include more or fewer components than shown, may combine two or more components, or may have a different configuration or arrangement of the components. Some of the various components shown in FIG. 17 may be implemented in hardware, software or a combination of both hardware and software, including one or more signal processing and/or application specific integrated circuits.

Object Tracking

A UAV 100 can be configured to track one or more objects, for example, to enable intelligent autonomous flight. The term "objects" in this context can include any type of physical object occurring in the physical world. Objects can include dynamic objects such as a people, animals, and other vehicles. Objects can also include static objects such as landscape features, buildings, and furniture. Further, certain descriptions herein may refer to a "subject" (e.g., human subject 102). The terms "subject" as used in this disclosure may simply refer to an object being tracked using any of the disclosed techniques. The terms "object" and "subject" may therefore be used interchangeably.

With reference to FIG. 2, A tracking system 140 associated with a UAV 100 can be configured to track one or more physical objects based on images of the objects captured by image capture devices (e.g., image capture devices 114 and/or 115) onboard the UAV 100. While a tracking system 140 can be configured to operate based only on input from image capture devices, the tracking system 140 can also be configured to incorporate other types of information to aid in the tracking. For example, various other techniques for measuring, estimating, and/or predicting the relative positions and/or orientations of the UAV 100 and/or other objects are described with respect to FIGS. 17-29.

Figure 20:
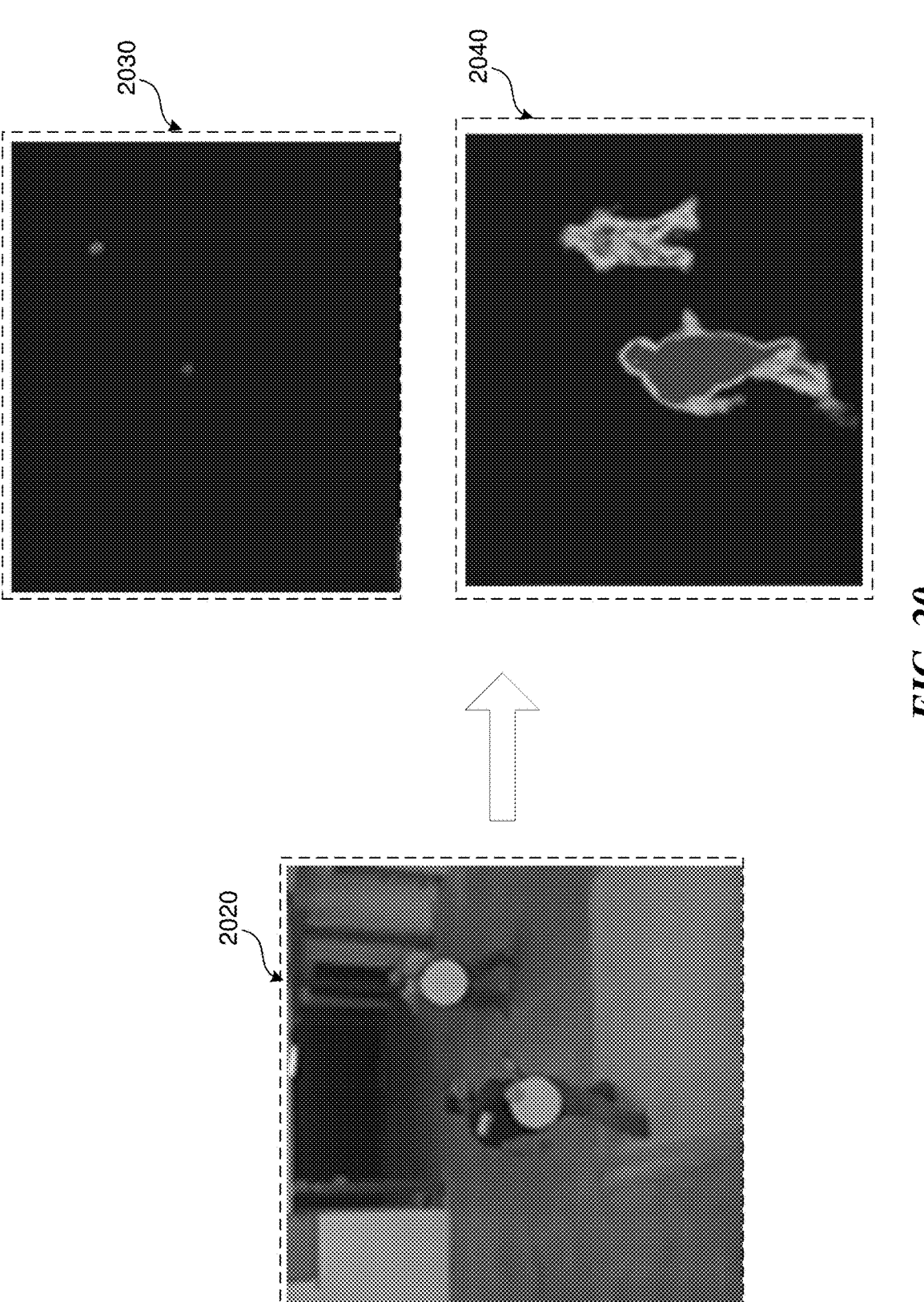
FIG. 20 shows an example image captured by a UAV in flight through a physical environment with associated visualizations of data regarding tracked objects based on processing of the captured image.

In some embodiments, a tracking system 140 can be configured to fuse information pertaining to two primary categories: semantics and 3D geometry. As images are received, the tracking system 140 may extract semantic information regarding certain objects captured in the images based on an analysis of the pixels in the images. Semantic information regarding a captured object can include information such as an object's category (i.e., class), location, shape, size, scale, pixel segmentation, orientation, interclass appearance, activity, and pose. In an example embodiment, the tracking system 140 may identify general locations and categories of objects based on captured images and then determine or infer additional more detailed information about individual instances of objects based on further processing. Such a process may be performed as a sequence of discrete operations, a series of parallel operations, or as a single operation. For example, FIG. 20 shows an example image 2020 captured by a UAV in flight through a physical environment. As shown in FIG. 20, the example image 2020 includes captures of two physical objects, specifically, two people present in the physical environment. The example image 2020 may represent a single frame in a series of frames of video captured by the UAV. A tracking system 140 may first identify general locations of the captured objects in the image 2020. For example, pixel map 2030 shows two dots corresponding to the general locations of the captured objects in the image. These general locations may be represented as image coordinates. The tracking system 140 may further process the captured image 2020 to determine information about the individual instances of the captured objects. For example, pixel map 2040 shows a result of additional processing of image 2020 identifying pixels corresponding to the individual object instances (i.e., people in this case). Semantic cues can be used to locate and identify objects in captured images as well as associate identified objects occurring in multiple images. For example, as previously mentioned, the captured image 2020 depicted in FIG. 20 may represent a single frame in a sequence of frames of a captured video. Using semantic cues, a tracking system 140 may associate regions of pixels captured in multiple images as corresponding to the same physical object occurring in the physical environment.

In some embodiments, a tracking system 140 can be configured to utilize 3D geometry of identified objects to associate semantic information regarding the objects based on images captured from multiple views in the physical environment. Images captured from multiple views may include images captured by multiple image capture devices having different positions and/or orientations at a single time instant. For example, each of the image capture devices 114 shown mounted to a UAV 100 in FIG. 1A may include cameras at slightly offset positions (to achieve stereoscopic capture). Further, even if not individually configured for stereoscopic image capture, the multiple image capture devices 114 may be arranged at different positions relative to the UAV 100, for example, as shown in FIG. 1A. Images captured from multiple views may also include images captured by an image captured device at multiple time instants as the image capture device moves through the physical environment. For example, any of the image capture devices 114 and/or 115 mounted to UAV 100 will individually capture images from multiple views as the UAV 100 moves through the physical environment.

Figure 21:
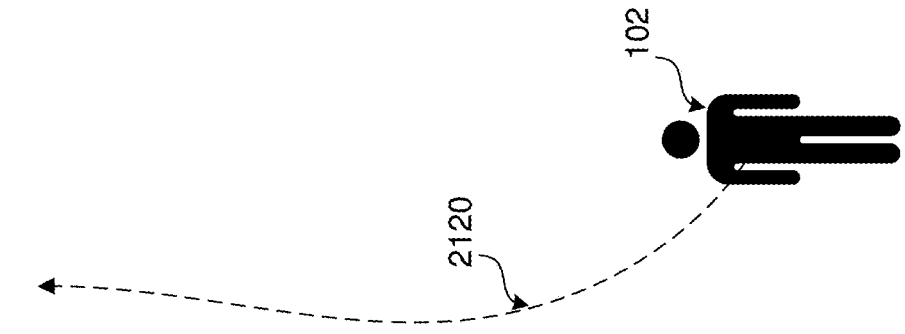
FIG. 21 shows a diagram illustrating an example process for estimating a trajectory of an object based on multiple images captured by a UAV.
Figure 21:
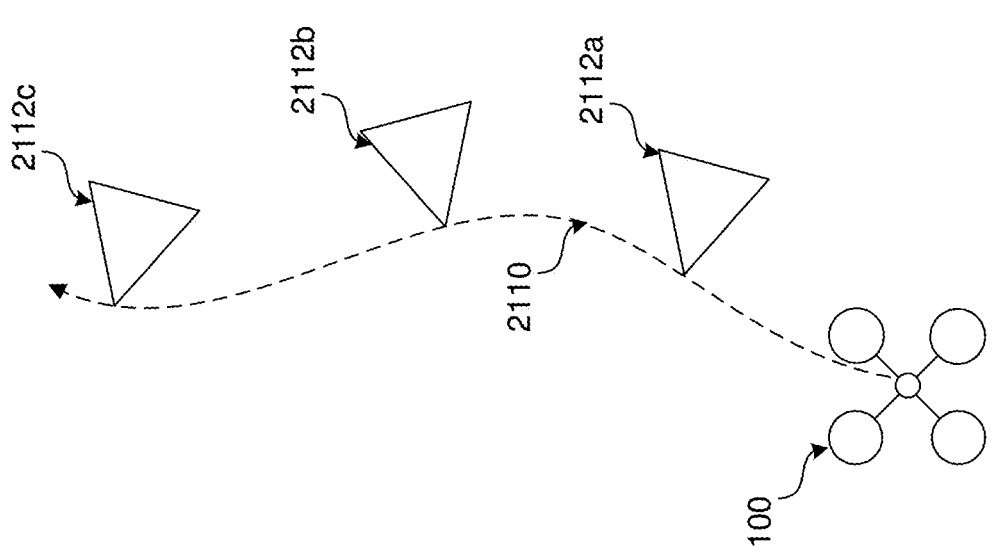

Using an online visual-inertial state estimation system, a tracking system 140 can determine or estimate a trajectory of the UAV 100 as it moves through the physical environment. Thus, the tracking system 140 can associate semantic information in captured images, such as locations of detected objects, with information about the 3D trajectory of the objects, using the known or estimated 3D trajectory of the UAV 100. For example, FIG. 21 shows a trajectory 2110 of a UAV 100 moving through a physical environment. As the UAV 100 moves along trajectory 2110, the one or more image capture devices (e.g., devices 114 and/or 115) capture images of the physical environment at multiple views 2112a-c. Included in the images at multiple views 2112a-c are captures of an object such as a human subject 102. By processing the captured images at multiple views 2112a-c, a trajectory 2120 of the object can also be resolved.

Object detections in captured images create rays from a center position of a capturing camera to the object along which the object lies, with some uncertainty. The tracking system 140 can compute depth measurements for these detections, creating a plane parallel to a focal plane of a camera along which the object lies, with some uncertainty. These depth measurements can be computed by a stereo vision algorithm operating on pixels corresponding with the object between two or more camera images at different views. The depth computation can look specifically at pixels that are labeled to be part of an object of interest (e.g., a subject 102). The combination of these rays and planes over time can be fused into an accurate prediction of the 3D position and velocity trajectory of the object over time.

While a tracking system 140 can be configured to rely exclusively on visual data from image capture devices onboard a UAV 100, data from other sensors (e.g., sensors on the object, on the UAV 100, or in the environment) can be incorporated into this framework when available. Additional sensors may include GPS, IMU, barometer, magnetometer, and cameras at other devices such as a mobile device 104. For example, a GPS signal from a mobile device 104 held by a person can provide rough position measurements of the person that are fused with the visual information from image capture devices onboard the UAV 100. An IMU sensor at the UAV 100 and/or a mobile device 104 can provide acceleration and angular velocity information, a barometer can provide relative altitude, and a magnetometer can provide heading information. Images captured by cameras at a mobile device 104 held by a person can be fused with images from cameras onboard the UAV 100 to estimate relative pose between the UAV 100 and the person by identifying common features captured in the images. Various other techniques for measuring, estimating, and/or predicting the relative positions and/or orientations of the UAV 100 and/or other objects are described with respect to FIGS. 17-25.

Figure 22:
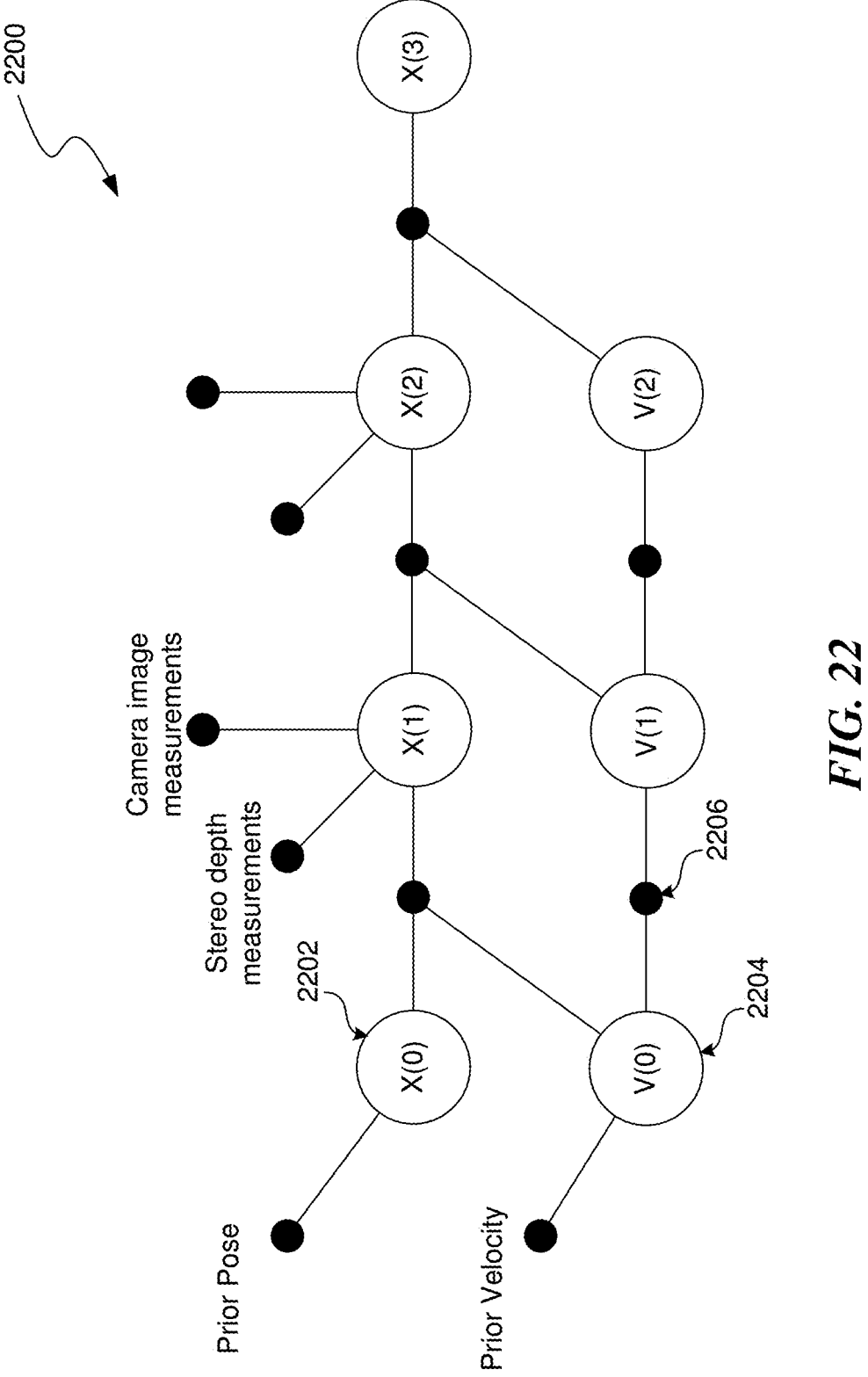
FIG. 22 shows a diagrammatic representation of an example spatiotemporal factor graph.

In some embodiments, data from various sensors are input into a spatiotemporal factor graph to probabilistically minimize total measurement error. FIG. 22 shows a diagrammatic representation of an example spatiotemporal factor graph 2200 that can be used to estimate a 3D trajectory of an object (e.g., including pose and velocity over time). In the example spatiotemporal factor graph 2200 depicted in FIG. 22, variable values such as the pose and velocity (represented as nodes (2202 and 2204 respectively)) connected by one or more motion model processes (represented as nodes 2206 along connecting edges). For example, an estimate or prediction for the pose of the UAV 100 and/or other object at time step 1 (i.e., variable X(1)) may be calculated by inputting estimated pose and velocity at a prior time step (i.e., variables X(0) and V(0)) as well as various perception inputs such as stereo depth measurements and camera image measurements via one or more motion models. A spatiotemporal factor model can be combined with an outlier rejection mechanism wherein measurements deviating too far from an estimated distribution are thrown out.

In order to estimate a 3D trajectory from measurements at multiple time instants, one or more motion models (or process models) are used to connect the estimated variables between each time step in the factor graph. Such motion models can include any one of constant velocity, zero velocity, decaying velocity, and decaying acceleration. Applied motion models may be based on a classification of a type of object being tracked and/or learned using machine learning techniques. For example, a cyclist is likely to make wide turns at speed, but is not expected to move sideways. Conversely, a small animal such as a dog may exhibit a more unpredictable motion pattern.

Figure 23:
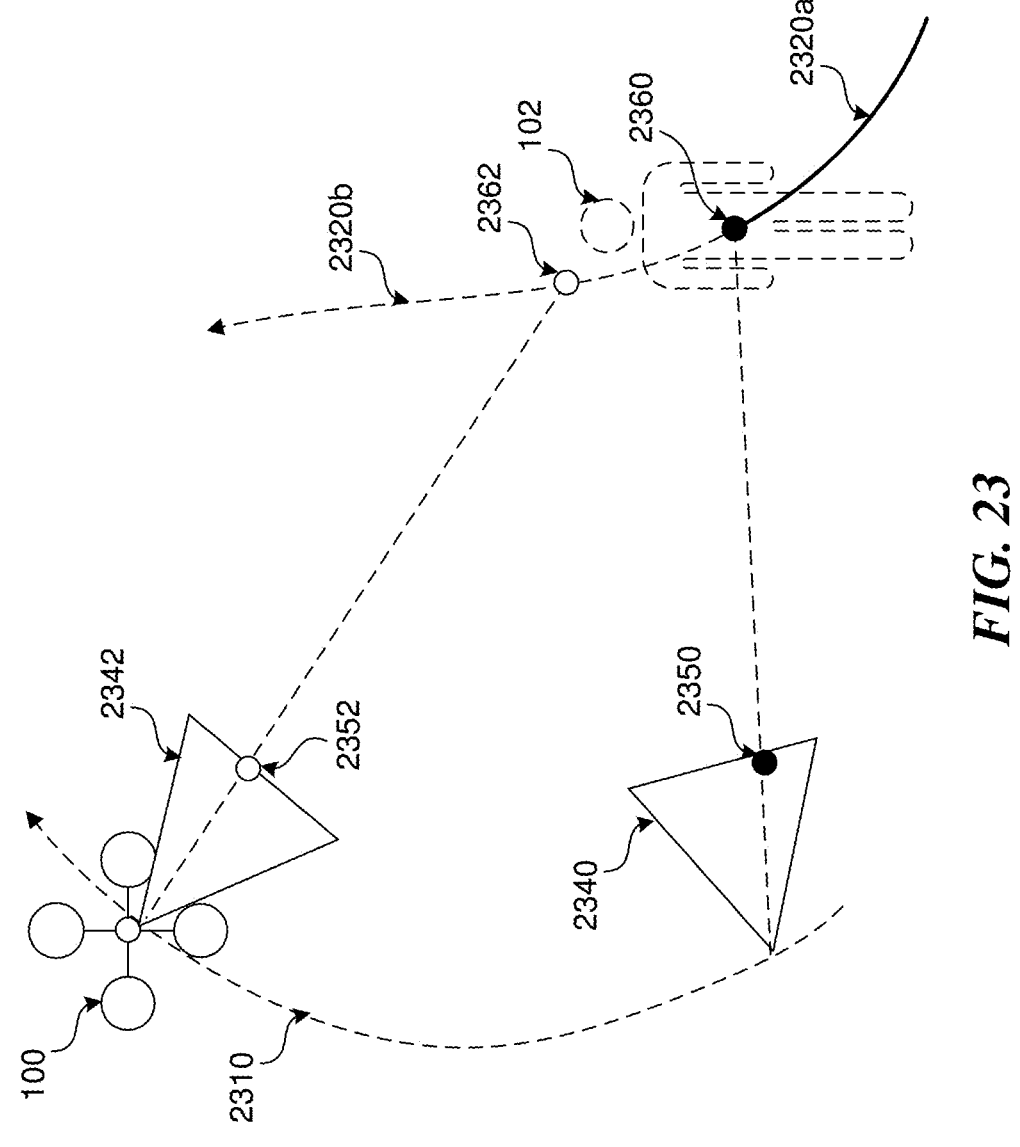
FIG. 23 shows a diagram that illustrates an example process of generating an intelligent initial estimate for where a tracked object will appear in a subsequently captured image.

In some embodiments, a tracking system 140 can generate an intelligent initial estimate for where a tracked object will appear in a subsequently captured image based on a predicted 3D trajectory of the object. FIG. 23 shows a diagram that illustrates this concept. As shown in FIG. 23, a UAV 100 is moving along a trajectory 2310 while capturing images of the surrounding physical environment, including of a human subject 102. As the UAV 100 moves along the trajectory 2310, multiple images (e.g., frames of video) are captured from one or more mounted image capture devices 114/115. FIG. 23 shows a first FOV of an image capture device at a first pose 2340 and a second FOV of the image capture device at a second pose 2342. In this example, the first pose 2340 may represent a previous pose of the image capture device at a time instant t(0) while the second pose 2342 may represent a current pose of the image capture device at a time instant t(1). At time instant t(0), the image capture device captures an image of the human subject 102 at a first 3D position 2360 in the physical environment. This first position 2360 may be the last known position of the human subject 102. Given the first pose 2340 of the image capture device, the human subject 102 while at the first 3D position 2360 appears at a first image position 2350 in the captured image. An initial estimate for a second (or current) image position 2352 can therefore be made based on projecting a last known 3D trajectory 2320a of the human subject 102 forward in time using one or more motion models associated with the object. For example, predicted trajectory 2320b shown in FIG. 23 represents this projection of the 3D trajectory 2320a forward in time. A second 3D position 2362 (at time t(1)) of the human subject 102 along this predicted trajectory 2320b can then be calculated based on an amount of time elapsed from t(0) to t(1). This second 3D position 2362 can then be projected into the image plane of the image capture device at the second pose 2342 to estimate the second image position 2352 that will correspond to the human subject 102. Generating such an initial estimate for the position of a tracked object in a newly captured image narrows down the search space for tracking and enables a more robust tracking system, particularly in the case of a UAV 100 and/or tracked object that exhibits rapid changes in position and/or orientation.

In some embodiments, the tracking system 140 can take advantage of two or more types of image capture devices onboard the UAV 100. For example, as previously described with respect to FIG. 1A, the UAV 100 may include image capture device 114 configured for visual navigation as well as an image captured device 115 for capturing images that are to be viewed. The image capture devices 114 may be configured for low-latency, low-resolution, and high FOV, while the image capture device 115 may be configured for high resolution. An array of image capture devices 114 about a perimeter of the UAV 100 can provide low-latency information about objects up to 360 degrees around the UAV 100 and can be used to compute depth using stereo vision algorithms. Conversely, the other image capture device 115 can provide more detailed images (e.g., high resolution, color, etc.) in a limited FOV.

Combining information from both types of image capture devices 114 and 115 can be beneficial for object tracking purposes in a number of ways. First, the high-resolution color information from an image capture device 115 can be fused with depth information from the image capture devices 114 to create a 3D representation of a tracked object. Second, the low-latency of the image capture devices 114 can enable more accurate detection of objects and estimation of object trajectories. Such estimates can be further improved and/or corrected based on images received from a high-latency, high resolution image capture device 115. The image data from the image capture devices 114 can either be fused with the image data from the image capture device 115, or can be used purely as an initial estimate.

By using the image capture devices 114, a tracking system 140 can achieve tracking of objects up to 360 degrees around the UAV 100. The tracking system 140 can fuse measurements from any of the image capture devices 114 or 115 when estimating a relative position and/or orientation of a tracked object as the positions and orientations of the image capture devices 114 and 115 change over time. The tracking system 140 can also orient the image capture device 115 to get more accurate tracking of specific objects of interest, fluidly incorporating information from both image capture modalities. Using knowledge of where all objects in the scene are, the UAV 100 can exhibit more intelligent autonomous flight.

As previously discussed, the high-resolution image capture device 115 may be mounted to an adjustable mechanism such as a gimbal that allows for one or more degrees of freedom of motion relative to the body of the UAV 100. Such a configuration is useful in stabilizing image capture as well as tracking objects of particular interest. An active gimbal mechanism configured to adjust an orientation of a higher-resolution image capture device 115 relative to the UAV 100 so as to track a position of an object in the physical environment may allow for visual tracking at greater distances than may be possible through use of the lower-resolution image capture devices 114 alone. Implementation of an active gimbal mechanism may involve estimating the orientation of one or more components of the gimbal mechanism at any given time. Such estimations may be based on any of hardware sensors coupled to the gimbal mechanism (e.g., accelerometers, rotary encoders, etc.), visual information from the image capture devices 114/115, or a fusion based on any combination thereof.

Figure 24:
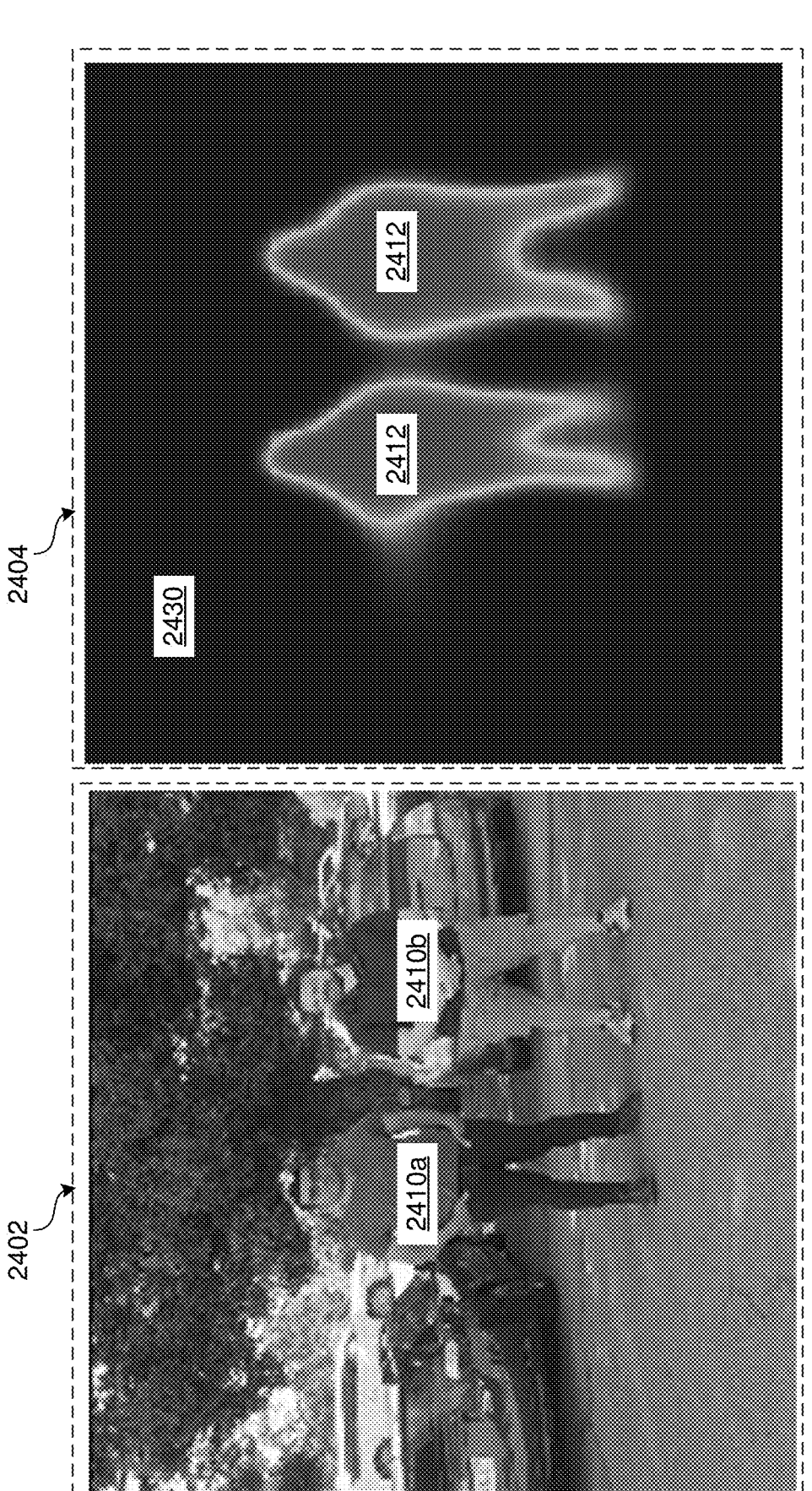
FIG. 24 shows a visualization representative of a dense per-pixel segmentation of a captured image.

A tracking system 140 may include an object detection system for detecting and tracking various objects. Given one or more classes of objects (e.g., humans, buildings, cars, animals, etc.), the object detection system may identify instances of the various classes of objects occurring in captured images of the physical environment. Outputs by the object detection system can be parameterized in a few different ways. In some embodiments, the object detection system processes received images and outputs a dense per-pixel segmentation, where each pixel is associated with a value corresponding to either an object class label (e.g., human, building, car, animal, etc.) and/or a likelihood of belonging to that object class. For example, FIG. 24 shows a visualization 2404 of a dense per-pixel segmentation of a captured image 2402 where pixels corresponding to detected objects 2410*a-b* classified as humans are set apart from all other pixels in the image 2402. Another parameterization may include resolving the image location of a detected object to a particular image coordinate (e.g., as shown at map 2030 in FIG. 20), for example, based on centroid of the representation of the object in a received image.

In some embodiments, the object detection system can utilize a deep convolutional neural network for object detection. For example, the input may be a digital image (e.g., image 2402), and the output may be a tensor with the same spatial dimension. Each slice of the output tensor may represent a dense segmentation prediction, where each pixel's value is proportional to the likelihood of that pixel belonging to the class of object corresponding to the slice. For example, the visualization 2404 shown in FIG. 24 may represent a particular slice of the aforementioned tensor where each pixel's value is proportional to the likelihood that the pixel corresponds with a human. In addition, the same deep convolutional neural network can also predicts the centroid locations for each detected instance, as described in the following section.

A tracking system 140 may also include an instance segmentation system for distinguishing between individual instances of objects detected by the object detection system. In some embodiments, the process of distinguishing individual instances of detected objects may include processing digital images captured by the UAV 100 to identify pixels belonging to one of a plurality of instances of a class of physical objects present in the physical environment and captured in the digital images. As previously described with respect to FIG. 24, a dense per-pixel segmentation algorithm can classify certain pixels in an image as corresponding to one or more classes of objects. This segmentation process output may allow a tracking system 140 to distinguish the objects represented in an image and the rest of the image (i.e., a background). For example, the visualization 2404 distinguishes pixels that correspond to humans (e.g., included in region 2412) from pixels that do not correspond to humans (e.g., included in region 2430). However, this segmentation process does not necessarily distinguish between individual instances of the detected objects. A human viewing the visualization 2404 may conclude that the pixels corresponding to humans in the detected image actually correspond to two separate humans; however, without further analysis, a tracking system may 140 be unable to make this distinction.

Figure 25:
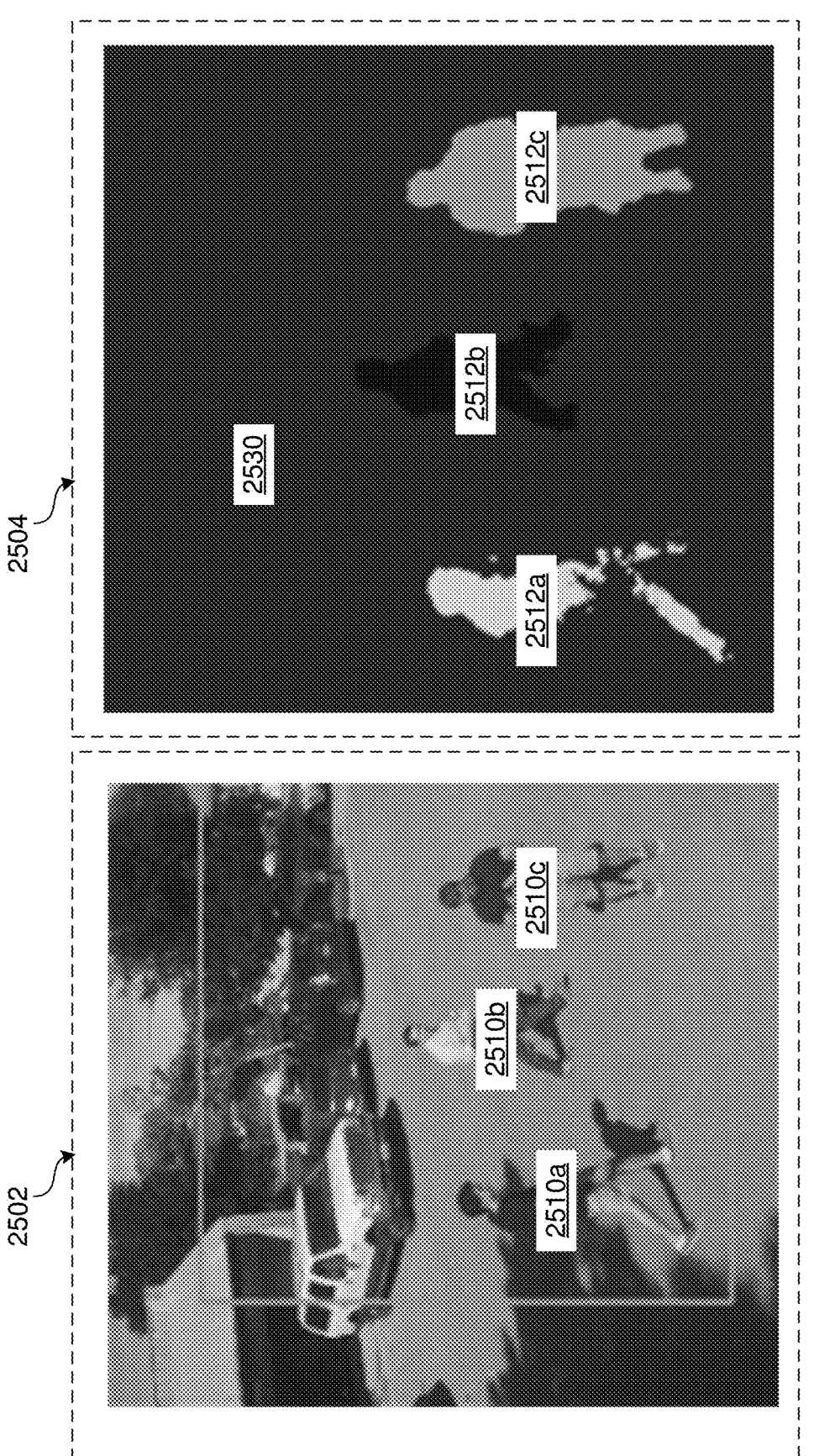
FIG. 25 shows a visualization representative of an instance segmentation of a captured image.

Effective object tracking may involve distinguishing pixels that correspond to distinct instances of detected objects. This process is known as "instance segmentation." FIG. 25 shows an example visualization 2504 of an instance segmentation output based on a captured image 2502. Similar to the dense per-pixel segmentation process described with respect to FIG. 24, the output represented by visualization 2504 distinguishes pixels (e.g., included in regions 2512*a-c*) that correspond to detected objects 2510*a-c* of a particular class of objects (in this case humans) from pixels that do not correspond to such objects (e.g., included in region 2530). Notably, the instance segmentation process goes a step further to distinguish pixels corresponding to individual instances of the detected objects from each other. For example, pixels in region 2512*a* correspond to a detected instance of a human 2510*a*, pixels in region 2512*b* correspond to a detected instance of a human 2510*b*, and pixels in region 2512*c* correspond to a detected instance of a human 2510*c*.

Distinguishing between instances of detected objects may be based on an analysis of pixels corresponding to detected objects. For example, a grouping method may be applied by the tracking system 140 to associate pixels corresponding to a particular class of object to a particular instance of that class by selecting pixels that are substantially similar to certain other pixels corresponding to that instance, pixels that are spatially clustered, pixel clusters that fit an appearance-based model for the object class, etc. Again, this process may involve applying a deep convolutional neural network to distinguish individual instances of detected objects.

Instance segmentation may associate pixels corresponding to particular instances of objects; however, such associations may not be temporally consistent. Consider again, the example described with respect to FIG. 25. As illustrated in FIG. 25, a tracking system 140 has identified three instances of a certain class of objects (i.e., humans) by applying an instance segmentation process to a captured image 2502 of the physical environment. This example captured image 2502 may represent only one frame in a sequence of frames of captured video. When a second frame is received, the tracking system 140 may not be able to recognize newly identified object instances as corresponding to the same three people 2510*a-c* as captured in image 2502.

To address this issue, the tracking system 140 can include an identity recognition system. An identity recognition system may process received inputs (e.g., captured images) to learn the appearances of instances of certain objects (e.g., of particular people). Specifically, the identity recognition system may apply a machine-learning appearance-based model to digital images captured by one or more image capture devices 114/115 associated with a UAV 100. Instance segmentations identified based on processing of captured images can then be compared against such appearance-based models to resolve unique identities for one or more of the detected objects.

Identity recognition can be useful for various different tasks related to object tracking. As previously alluded to, recognizing the unique identities of detected objects allows for temporal consistency. Further, identity recognition can enable the tracking of multiple different objects (as will be described in more detail). Identity recognition may also facilitate object persistence that enables re-acquisition of previously tracked objects that fell out of view due to limited FOV of the image capture devices, motion of the object, and/or occlusion by another object. Identity recognition can also be applied to perform certain identity-specific behaviors or actions, such as recording video when a particular person is in view.

In some embodiments, an identity recognition process may employ a deep convolutional neural network to learn one or more effective appearance-based models for certain objects. In some embodiments, the neural network can be trained to learn a distance metric that returns a low distance value for image crops belonging to the same instance of an object (e.g., a person), and a high distance value otherwise.

In some embodiments, an identity recognition process may also include learning appearances of individual instances of objects such as people. When tracking humans, a tracking system 140 may be configured to associate identities of the humans, either through user-input data or external data sources such as images associated with individuals available on social media. Such data can be combined with detailed facial recognition processes based on images received from any of the one or more image capture devices 114/115 onboard the UAV 100. In some embodiments, an identity recognition process may focus on one or more key individuals. For example, a tracking system 140 associated with a UAV 100 may specifically focus on learning the identity of a designated owner of the UAV 100 and retain and/or improve its knowledge between flights for tracking, navigation, and/or other purposes such as access control.

In some embodiments, a tracking system 140 may be configured to focus tracking on a specific object detected in captured images. In such a single-object tracking approach, an identified object (e.g., a person) is designated for tracking while all other objects (e.g., other people, trees, buildings, landscape features, etc.) are treated as distractors and ignored. While useful in some contexts, a single-object tracking approach may have some disadvantages. For example, an overlap in trajectory, from the point of view of an image capture device, of a tracked object and a distractor object may lead to an inadvertent switch in the object being tracked such that the tracking system 140 begins tracking the distractor instead. Similarly, spatially close false positives by an object detector can also lead to inadvertent switches in tracking.

A multi-object tracking approach addresses these shortcomings, and introduces a few additional benefits. In some embodiments, a unique track is associated with each object detected in the images captured by the one or more image capture devices 114/115. In some cases, it may not be practical, from a computing standpoint, to associate a unique track with every single object that is captured in the images. For example, a given image may include hundreds of objects, including minor features such as rocks or leaves of trees. Instead, unique tracks may be associate with certain classes of objects that may be of interest from a tracing standpoint. For example, the tracking system 140 may be configured to associate a unique track with every object detected that belongs to a class that is generally mobile (e.g., people, animals, vehicles, etc.).

Each unique track may include an estimate for the spatial location and movement of the object being tracked (e.g., using the spatiotemporal factor graph described earlier) as well as its appearance (e.g., using the identity recognition feature). Instead of pooling together all other distractors (i.e., as may be performed in a single object tracking approach), the tracking system 140 can learn to distinguish between the multiple individual tracked objects. By doing so, the tracking system 140 may render inadvertent identity switches less likely. Similarly, false positives by the object detector can be more robustly rejected as they will tend to not be consistent with any of the unique tracks.

An aspect to consider when performing multi-object tracking includes the association problem. In other words, given a set of object detections based on captured images (including parameterization by 3D location and regions in the image corresponding to segmentation), an issue arises regarding how to associate each of the set of object detections with corresponding tracks. To address the association problem, the tracking system 140 can be configured to associate one of a plurality of detected objects with one of a plurality of estimated object tracks based on a relationship between a detected object and an estimate object track. Specifically, this process may involve computing a "cost" value for one or more pairs of object detections and estimate object tracks. The computed cost values can take into account, for example, the spatial distance between a current location (e.g., in 3D space and/or image space) of a given object detection and a current estimate of a given track (e.g., in 3D space and/or in image space), an uncertainty of the current estimate of the given track, a difference between a given detected object's appearance and a given track's appearance estimate, and/or any other factors that may tend to suggest an association between a given detected object and given track. In some embodiments, multiple cost values are computed based on various different factors and fused into a single scalar value that can then be treated as a measure of how well a given detected object matches a given track. The aforementioned cost formulation can then be used to determine an optimal association between a detected object and a corresponding track by treating the cost formulation as an instance of a minimum cost perfect bipartite matching problem, which can be solved using, for example, the Hungarian algorithm.

In some embodiments, effective object tracking by a tracking system 140 may be improved by incorporating information regarding a state of an object. For example, a detected object such as a human may be associated with any one or more defined states. A state in this context may include an activity by the object such as sitting, standing, walking, running, or jumping. In some embodiments, one or more perception inputs (e.g., visual inputs from image capture devices 114/115) may be used to estimate one or more parameters associated with detected objects. The estimated parameters may include an activity type, motion capabilities, trajectory heading, contextual location (e.g., indoors vs. outdoors), interaction with other detected objects (e.g., two people walking together, a dog on a leash held by a person, a trailer pulled by a car, etc.), and any other semantic attributes.

Generally, object state estimation may be applied to estimate one or more parameters associated with a state of a detected object based on perception inputs (e.g., images of the detected object captured by one or more image capture devices 114/115 onboard a UAV 100 or sensor data from any other sensors onboard the UAV 100). The estimated parameters may then be applied to assist in predicting the motion of the detected object and thereby assist in tracking the detected object. For example, future trajectory estimates may differ for a detected human depending on whether the detected human is walking, running, jumping, riding a bicycle, riding in a car, etc. In some embodiments, deep convolutional neural networks may be applied to generate the parameter estimates based on multiple data sources (e.g., the perception inputs) to assist in generating future trajectory estimates and thereby assist in tracking.

As previously alluded to, a tracking system 140 may be configured to estimate (i.e., predict) a future trajectory of a detected object based on past trajectory measurements and/or estimates, current perception inputs, motion models, and any other information (e.g., object state estimates). Predicting a future trajectory of a detected object is particularly useful for autonomous navigation by the UAV 100. Effective autonomous navigation by the UAV 100 may depend on anticipation of future conditions just as much as current conditions in the physical environment. Through a motion planning process, a navigation system of the UAV 100 may generate control commands configured to cause the UAV 100 to maneuver, for example, to avoid a collision, maintain separation with a tracked object in motion, and/or satisfy any other navigation objectives.

Predicting a future trajectory of a detected object is generally a relatively difficult problem to solve. The problem can be simplified for objects that are in motion according to a known and predictable motion model. For example, an object in free fall is expected to continue along a previous trajectory while accelerating at rate based on a known gravitational constant and other known factors (e.g., wind resistance). In such cases, the problem of generating a prediction of a future trajectory can be simplified to merely propagating past and current motion according to a known or predictable motion model associated with the object. Objects may of course deviate from a predicted trajectory generated based on such assumptions for a number of reasons (e.g., due to collision with another object). However, the predicted trajectories may still be useful for motion planning and/or tracking purposes.

Dynamic objects such as people and animals, present a more difficult challenge when predicting future trajectories because the motion of such objects is generally based on the environment and their own free will. To address such challenges, a tracking system 140 may be configured to take accurate measurements of the current position and motion of an object and use differentiated velocities and/or accelerations to predict a trajectory a short time (e.g., seconds) into the future and continually update such prediction as new measurements are taken. Further, the tracking system 140 may also use semantic information gathered from an analysis of captured images as cues to aid in generating predicted trajectories. For example, a tracking system 140 may determine that a detected object is a person on a bicycle traveling along a road. With this semantic information, the tracking system 140 may form an assumption that the tracked object is likely to continue along a trajectory that roughly coincides with a path of the road. As another related example, the tracking system 140 may determine that the person has begun turning the handlebars of the bicycle to the left. With this semantic information, the tracking system 140 may form an assumption that the tracked object will likely turn to the left before receiving any positional measurements that expose this motion. Another example, particularly relevant to autonomous objects such as people or animals is to assume that that the object will tend to avoid collisions with other objects. For example, the tracking system 140 may determine a tracked object is a person heading on a trajectory that will lead to a collision with another object such as a light pole. With this semantic information, the tracking system 140 may form an assumption that the tracked object is likely to alter its current trajectory at some point before the collision occurs. A person having ordinary skill will recognize that these are only examples of how semantic information may be utilized as a cue to guide prediction of future trajectories for certain objects.

In addition to performing an object detection process in one or more captured images per time frame, the tracking system 140 may also be configured to perform a frame-to-frame tracking process, for example, to detect motion of a particular set or region of pixels in images at subsequent time frames (e.g., video frames). Such a process may involve applying a mean-shift algorithm, a correlation filter, and/or a deep network. In some embodiments, frame-to-frame tracking may be applied by a system that is separate from an object detection system wherein results from the frame-to-frame tracking are fused into a spatiotemporal factor graph. Alternatively, or in addition, an object detection system may perform frame-to-frame tracking if, for example, the system has sufficient available computing resources (e.g., memory). For example, an object detection system may apply frame-to-frame tracking through recurrence in a deep network and/or by passing in multiple images at a time. A frame-to-frame tracking process and object detection process can also be configured to complement each other, with one resetting the other when a failure occurs.

As previously discussed, the tracking system 140 may be configured to process images (e.g., the raw pixel data) received from one or more image capture devices 114/115 onboard a UAV 100. Alternatively, or in addition, the tracking system 140 may also be configured to operate by processing disparity images. A "disparity image" may generally be understood as an image representative of a disparity between two or more corresponding images. For example, a stereo pair of images (e.g., left image and right image) captured by a stereoscopic image capture device will exhibit an inherent offset due to the slight difference in position of the two or more cameras associated with the stereoscopic image capture device. Despite the offset, at least some of the objects appearing in one image should also appear in the other image; however, the image locations of pixels corresponding to such objects will differ. By matching pixels in one image with corresponding pixels in the other and calculating the distance between these corresponding pixels, a disparity image can be generated with pixel values that are based on the distance calculations. Such a disparity image will tend to highlight regions of an image that correspond to objects in the physical environment since the pixels corresponding to the object will have similar disparities due to the object's 3D location in space. Accordingly, a disparity image, that may have been generated by processing two or more images according to a separate stereo algorithm, may provide useful cues to guide the tracking system 140 in detecting objects in the physical environment. In many situations, particularly where harsh lighting is present, a disparity image may actually provide stronger cues about the location of objects than an image captured from the image capture devices 114/115. As mentioned, disparity images may be computed with a separate stereo algorithm. Alternatively, or in addition, disparity images may be output as part of the same deep network applied by the tracking system 140. Disparity images may be used for object detection separately from the images received from the image capture devices 114/115, or they may be combined into a single network for joint inference.

In general, a tracking system 140 (e.g., including an object detection system and/or an associated instance segmentation system) may be primary concerned with determining which pixels in a given image correspond to each object instance. However, these systems may not consider portions of a given object that are not actually captured in a given image. For example, pixels that would otherwise correspond with an occluded portion of an object (e.g., a person partially occluded by a tree) may not be labeled as corresponding to the object. This can be disadvantageous for object detection, instance segmentation, and/or identity recognition because the size and shape of the object may appear in the captured image to be distorted due to the occlusion. To address this issue, the tracking system 140 may be configured to imply a segmentation of an object instance in a captured image even if that object instance is occluded by other object instances. The object tracking system 140 may additionally be configured to determine which of the pixels associated with an object instance correspond with an occluded portion of that object instance. This process is generally referred to as "amodal segmentation" in that the segmentation process takes into consideration the whole of a physical object even if parts of the physical object are not necessarily perceived, for example, received images captured by the image capture devices 114/115. Amodal segmentation may be particularly advantageous when performing identity recognition and in a tracking system 140 configured for multi-object tracking.

Loss of visual contact is to be expected when tracking an object in motion through a physical environment. A tracking system 140 based primarily on visual inputs (e.g., images captured by image capture devices 114/115) may lose a track on an object when visual contact is lost (e.g., due to occlusion by another object or by the object leaving a FOV of an image capture device 114/115). In such cases, the tracking system 140 may become uncertain of the object's location and thereby declare the object lost. Human pilots generally do not have this issue, particularly in the case of momentary occlusions, due to the notion of object permanence. Object permanence assumes that, given certain physical constraints of matter, an object cannot suddenly disappear or instantly teleport to another location. Based on this assumption, if it is clear that all escape paths would have been clearly visible, then an object is likely to remain in an occluded volume. This situation is most clear when there is single occluding object (e.g., boulder) on flat ground with free space all around. If a tracked object in motion suddenly disappears in the captured image at a location of another object (e.g., the bolder), then it can be assumed that the object remains at a position occluded by the other object and that the tracked object will emerge along one of one or more possible escape paths. In some embodiments, the tracking system 140 may be configured to implement an algorithm that bounds the growth of uncertainty in the tracked object's location given this concept. In other words, when visual contact with a tracked object is lost at a particular position, the tracking system 140 can bound the uncertainty in the object's position to the last observed position and one or more possible escape paths given a last observed trajectory. A possible implementation of this concept may include generating, by the tracking system 140, an occupancy map that is carved out by stereo and the segmentations with a particle filter on possible escape paths.

Unmanned Aerial Vehicle—Example System

A UAV 100, according to the present teachings, may be implemented as any type of UAV. A UAV, sometimes referred to as a drone, is generally defined as any aircraft capable of controlled flight without a human pilot onboard. UAVs may be controlled autonomously by onboard computer processors or via remote control by a remotely located human pilot. Similar to an airplane, UAVs may utilize fixed aerodynamic surfaces along with a propulsion system (e.g., propeller, jet, etc.) to achieve lift. Alternatively, similar to helicopters, UAVs may directly use a propulsion system (e.g., propeller, jet, etc.) to counter gravitational forces and achieve lift. Propulsion-driven lift (as in the case of helicopters) offers significant advantages in certain implementations, for example, as a mobile filming platform, because it allows for controlled motion along all axes.

Multi-rotor helicopters, in particular quadcopters, have emerged as a popular UAV configuration. A quadcopter (also known as a quadrotor helicopter or quadrotor) is a multi-rotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, a first set of rotors may counter the angular torque caused by the rotation of the other set, thereby stabilizing flight. Flight control is achieved through variation in the angular velocity of each of the four fixed-pitch rotors. By varying the angular velocity of each of the rotors, a quadcopter may perform precise adjustments in its position (e.g., adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis is zero. Provided the four rotors spin at sufficient angular velocity to provide a vertical thrust equal to the force of gravity, the quadcopter can maintain a hover. An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors but in a balanced fashion such that lift is increased on one side of the craft and decreased on the other side of the craft. An adjustment in altitude from hover may be induced by applying a balanced variation in all four rotors, thereby increasing or decreasing the vertical thrust. Positional adjustments left, right, forward, and backward may be induced through combined pitch/roll maneuvers with balanced applied vertical thrust. For example, to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will therefore accelerate the craft forward on a horizontal plane.

Figure 26:
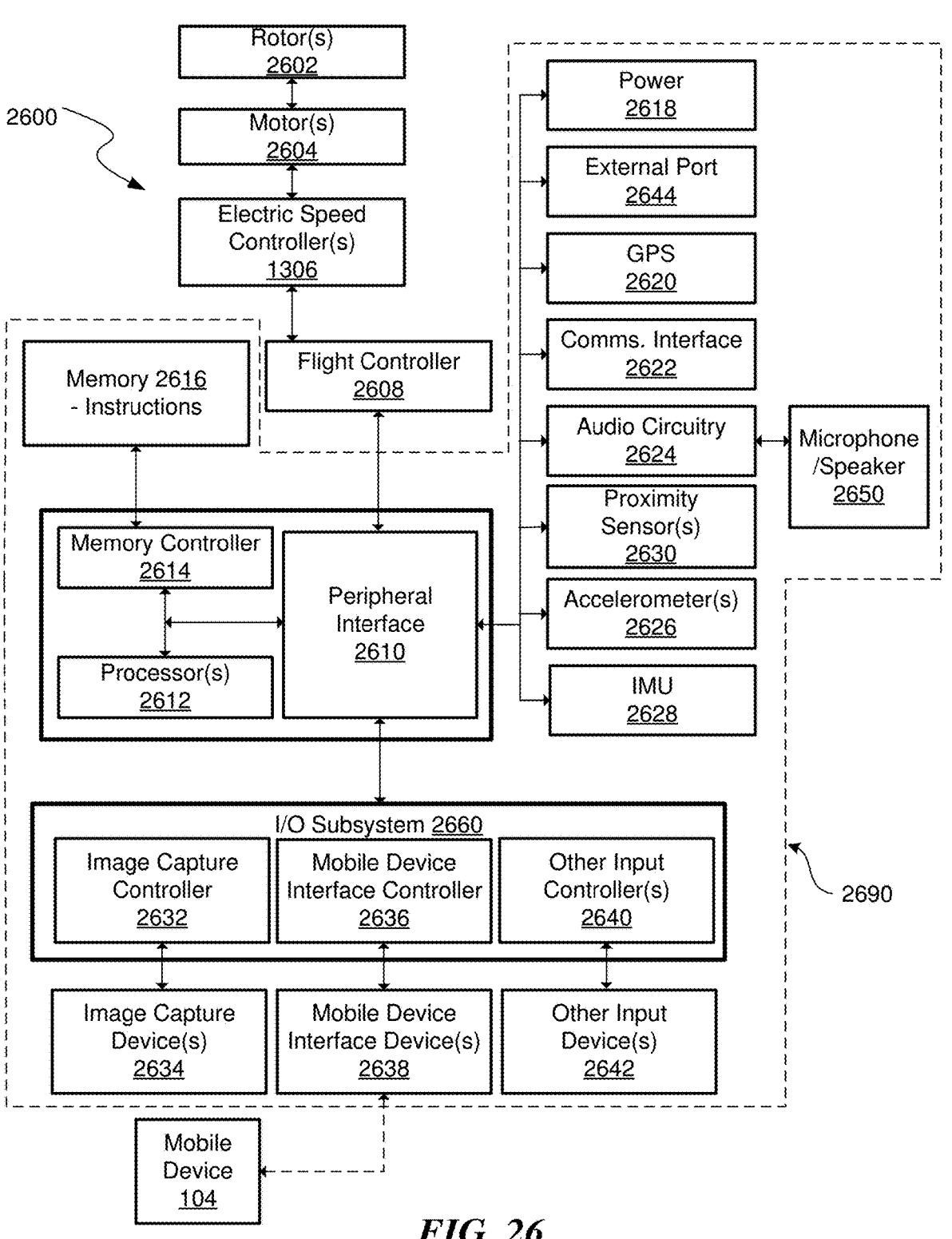
FIG. 26 shows a block diagram of an example UAV system including various functional system components with which at least some operations described in this disclosure can be implemented.

FIG. 26 shows a diagram of an example UAV system 2600 including various functional system components that may be part of a UAV 100, according to some embodiments. UAV system 2600 may include one or more means for propulsion (e.g., rotors 2602 and motor(s) 2604), one or more electronic speed controllers 2606, a flight controller 2608, a peripheral interface 2610, processor(s) 2612, a memory controller 2614, a memory 2616 (which may include one or more computer readable storage media), a power module 2618, a GPS module 2620, a communications interface 2622, audio circuitry 2624, an accelerometer 2626 (including subcomponents such as gyroscopes), an IMU 2628, a proximity sensor 2630, an optical sensor controller 2632 and associated optical sensor(s) 2634, a mobile device interface controller 2636 with associated interface device(s) 2638, and any other input controllers 2640 and input device(s) 2642, for example, display controllers with associated display device(s). These components may communicate over one or more communication buses or signal lines as represented by the arrows in FIG. 26.

UAV system 2600 is only one example of a system that may be part of a UAV 100. A UAV 100 may include more or fewer components than shown in system 2600, may combine two or more components as functional units, or may have a different configuration or arrangement of the components. Some of the various components of system 2600 shown in FIG. 26 may be implemented in hardware, software or a combination of both hardware and software, including one or more signal processing and/or application specific integrated circuits. Also, UAV 100 may include an off-the-shelf UAV (e.g., a currently available remote-controlled quadcopter) coupled with a modular add-on device (for example, one including components within outline 2690) to perform the innovative functions described in this disclosure.

As described earlier, the means for propulsion 2602-2604 may comprise fixed-pitch rotors. The means for propulsion may also include variable-pitch rotors (for example, using a gimbal mechanism), a variable-pitch jet engine, or any other mode of propulsion having the effect of providing force. The means for propulsion 2602-2604 may include a means for varying the applied thrust, for example, via an electronic speed controller 2606 varying the speed of each fixed-pitch rotor.

Flight controller 2608 may include a combination of hardware and/or software configured to receive input data (e.g., sensor data from image capture devices 2634, and or generated trajectories form an autonomous navigation system 120), interpret the data and output control commands to the propulsion systems 2602-2606 and/or aerodynamic surfaces (e.g., fixed wing control surfaces) of the UAV 100. Alternatively, or in addition, a flight controller 2608 may be configured to receive control commands generated by another component or device (e.g., processors 2612 and/or a separate computing device), interpret those control commands and generate control signals to the propulsion systems 2602-2606 and/or aerodynamic surfaces (e.g., fixed wing control surfaces) of the UAV 100. In some embodiments, the previously mentioned navigation system 120 of the UAV 100 may comprise the flight controller 2608 and/or any one or more of the other components of system 2600. Alternatively, the flight controller 2608 shown in FIG. 26 may exist as a component separate from the navigation system 120, for example, similar to the flight controller 160 shown in FIG. 2.

Memory 2616 may include high-speed random access memory and may also include non-volatile memory, such as one or more magnetic disk storage devices, flash memory devices, or other non-volatile solid-state memory devices. Access to memory 2616 by other components of system 2600, such as the processors 2612 and the peripherals interface 2610, may be controlled by the memory controller 2614.

The peripherals interface 2610 may couple the input and output peripherals of system 2600 to the processor(s) 2612 and memory 2616. The one or more processors 2612 run or execute various software programs and/or sets of instructions stored in memory 2616 to perform various functions for the UAV 100 and to process data. In some embodiments, processors 2612 may include general central processing units (CPUs), specialized processing units such as graphical processing units (GPUs) particularly suited to parallel processing applications, or any combination thereof. In some embodiments, the peripherals interface 2610, the processor(s) 2612, and the memory controller 2614 may be implemented on a single integrated chip. In some other embodiments, they may be implemented on separate chips.

The network communications interface 2622 may facilitate transmission and reception of communications signals often in the form of electromagnetic signals. The transmission and reception of electromagnetic communications signals may be carried out over physical media such as copper wire cabling or fiber optic cabling, or may be carried out wirelessly, for example, via a radiofrequency (RF) transceiver. In some embodiments, the network communications interface may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including, but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet. Communication may be facilitated over wired transmission media (e.g., via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including, but not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11n and/or IEEE 802.11ac), voice over Internet Protocol (VoIP), Wi-MAX, or any other suitable communication protocols.

The audio circuitry 2624, including the speaker and microphone 2650, may provide an audio interface between the surrounding environment and the UAV 100. The audio circuitry 2624 may receive audio data from the peripherals interface 2610, convert the audio data to an electrical signal, and transmit the electrical signal to the speaker 2650. The speaker 2650 may convert the electrical signal to human-audible sound waves. The audio circuitry 2624 may also receive electrical signals converted by the microphone 2650 from sound waves. The audio circuitry 2624 may convert the electrical signal to audio data and transmit the audio data to the peripherals interface 2610 for processing. Audio data may be retrieved from and/or transmitted to memory 2616 and/or the network communications interface 2622 by the peripherals interface 2610.

The I/O subsystem 2660 may couple input/output peripherals of UAV 100, such as an optical sensor system 2634, the mobile device interface 2638, and other input/control devices 2642, to the peripherals interface 2610. The I/O subsystem 2660 may include an optical sensor controller 2632, a mobile device interface controller 2636, and other input controller(s) 2640 for other input or control devices. The one or more input controllers 2640 receive/send electrical signals from/to other input or control devices 2642.

The other input/control devices 2642 may include physical buttons (e.g., push buttons, rocker buttons, etc.), dials, touch screen displays, slider switches, joysticks, click wheels, and so forth. A touch screen display may be used to implement virtual or soft buttons and one or more soft keyboards. A touch-sensitive touch screen display may provide an input interface and an output interface between the UAV 100 and a user. A display controller may receive and/or send electrical signals from/to the touch screen. The touch screen may display visual output to a user. The visual output may include graphics, text, icons, video, and any combination thereof (collectively termed "graphics"). In some embodiments, some or all of the visual output may correspond to user-interface objects, further details of which are described below.

A touch sensitive display system may have a touch-sensitive surface, sensor or set of sensors that accepts input from the user based on haptic and/or tactile contact. The touch sensitive display system and the display controller (along with any associated modules and/or sets of instructions in memory 2616) may detect contact (and any movement or breaking of the contact) on the touch screen and convert the detected contact into interaction with user-interface objects (e.g., one or more soft keys or images) that are displayed on the touch screen. In an exemplary embodiment, a point of contact between a touch screen and the user corresponds to a finger of the user.

The touch screen may use liquid crystal display (LCD) technology, or light emitting polymer display (LPD) technology, although other display technologies may be used in other embodiments. The touch screen and the display controller may detect contact and any movement or breaking thereof using any of a plurality of touch sensing technologies now known or later developed, including, but not limited to, capacitive, resistive, infrared, and surface acoustic wave technologies, as well as other proximity sensor arrays or other elements for determining one or more points of contact with a touch screen.

The mobile device interface device 2638 along with mobile device interface controller 2636 may facilitate the transmission of data between a UAV 100 and other computing devices such as a mobile device 104. According to some embodiments, communications interface 2622 may facilitate the transmission of data between UAV 100 and a mobile device 104 (for example, where data is transferred over a Wi-Fi network).

UAV system 2600 also includes a power system 2618 for powering the various components. The power system 2618 may include a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in computerized device.

UAV system 2600 may also include one or more image capture devices 2634. Image capture devices 2634 may be the same as the image capture device 114/115 of UAV 100 described with respect to FIG. 1A. FIG. 26 shows an image capture device 2634 coupled to an image capture controller 2632 in I/O subsystem 2660. The image capture device 2634 may include one or more optical sensors. For example, image capture device 2634 may include a charge-coupled device (CCD) or complementary metal-oxide semiconductor (CMOS) phototransistors. The optical sensors of image capture devices 2634 receive light from the environment, projected through one or more lens (the combination of an optical sensor and lens can be referred to as a "camera") and converts the light to data representing an image. In conjunction with an imaging module located in memory 2616, the image capture device 2634 may capture images (including still images and/or video). In some embodiments, an image capture device 2634 may include a single fixed camera. In other embodiments, an image capture device 2640 may include a single adjustable camera (adjustable using a gimbal mechanism with one or more axes of motion). In some embodiments, an image capture device 2634 may include a camera with a wide-angle lens providing a wider FOV. In some embodiments, an image capture device 2634 may include an array of multiple cameras providing up to a full 360 degree view in all directions. In some embodiments, an image capture device 2634 may include two or more cameras (of any type as described herein) placed next to each other in order to provide stereoscopic vision. In some embodiments, an image capture device 2634 may include multiple cameras of any combination as described above. In some embodiments, the cameras of an image capture device 2634 may be arranged such that at least two cameras are provided with overlapping FOV at multiple angles around the UAV 100, thereby allowing for stereoscopic (i.e., 3D) image/video capture and depth recovery (e.g., through computer vision algorithms) at multiple angles around UAV 100. For example, UAV 100 may include four sets of two cameras each positioned so as to provide a stereoscopic view at multiple angles around the UAV 100. In some embodiments, a UAV 100 may include some cameras dedicated for image capture of a subject and other cameras dedicated for image capture for visual navigation (e.g., through visual inertial odometry).

UAV system 2600 may also include one or more proximity sensors 2630. FIG. 26 shows a proximity sensor 2630 coupled to the peripherals interface 2610. Alternately, the proximity sensor 2630 may be coupled to an input controller 2640 in the I/O subsystem 2660. Proximity sensors 2630 may generally include remote sensing technology for proximity detection, range measurement, target identification, etc. For example, proximity sensors 2630 may include radar, sonar, and LIDAR.

UAV system 2600 may also include one or more accelerometers 2626. FIG. 26 shows an accelerometer 2626 coupled to the peripherals interface 2610. Alternately, the accelerometer 2626 may be coupled to an input controller 2640 in the I/O subsystem 2660.

UAV system 2600 may include one or more IMU 2628. An IMU 2628 may measure and report the UAV's velocity, acceleration, orientation, and gravitational forces using a combination of gyroscopes and accelerometers (e.g., accelerometer 2626).

UAV system 2600 may include a global positioning system (GPS) receiver 2620. FIG. 26 shows an GPS receiver 2620 coupled to the peripherals interface 2610. Alternately, the GPS receiver 2620 may be coupled to an input controller 2640 in the I/O subsystem 2660. The GPS receiver 2620 may receive signals from GPS satellites in orbit around the earth, calculate a distance to each of the GPS satellites (through the use of GPS software), and thereby pinpoint a current global position of UAV 100.

In some embodiments, the software components stored in memory 2616 may include an operating system, a communication module (or set of instructions), a flight control module (or set of instructions), a localization module (or set of instructions), a computer vision module, a graphics module (or set of instructions), and other applications (or sets of instructions). For clarity, one or more modules and/or applications may not be shown in FIG. 26.

An operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

A communications module may facilitate communication with other devices over one or more external ports 2644 and may also include various software components for handling data transmission via the network communications interface 2622. The external port 2644 (e.g., Universal Serial Bus (USB), FIREWIRE, etc.) may be adapted for coupling directly to other devices or indirectly over a network (e.g., the Internet, wireless LAN, etc.).

A graphics module may include various software components for processing, rendering and displaying graphics data. As used herein, the term "graphics" may include any object that can be displayed to a user, including, without limitation, text, still images, videos, animations, icons (such as user-interface objects including soft keys), and the like. The graphics module in conjunction with a graphics processing unit (GPU) 2612 may process in real time or near real time, graphics data captured by optical sensor(s) 2634 and/or proximity sensors 2630.

A computer vision module, which may be a component of a graphics module, provides analysis and recognition of graphics data. For example, while UAV 100 is in flight, the computer vision module along with a graphics module (if separate), GPU 2612, and image capture devices(s) 2634 and/or proximity sensors 2630 may recognize and track the captured image of an object located on the ground. The computer vision module may further communicate with a localization/navigation module and flight control module to update a position and/or orientation of the UAV 100 and to provide course corrections to fly along a planned trajectory through a physical environment.

A localization/navigation module may determine the location and/or orientation of UAV 100 and provide this information for use in various modules and applications (e.g., to a flight control module in order to generate commands for use by the flight controller 2608).

Image capture devices(s) 2634, in conjunction with an image capture device controller 2632 and a graphics module, may be used to capture images (including still images and video) and store them into memory 2616.

Each of the above identified modules and applications correspond to a set of instructions for performing one or more functions described above. These modules (i.e., sets of instructions) need not be implemented as separate software programs, procedures or modules, and, thus, various subsets of these modules may be combined or otherwise re-arranged in various embodiments. In some embodiments, memory 2616 may store a subset of the modules and data structures identified above. Furthermore, memory 2616 may store additional modules and data structures not described above.

Example Computer Processing System

Figure 27:
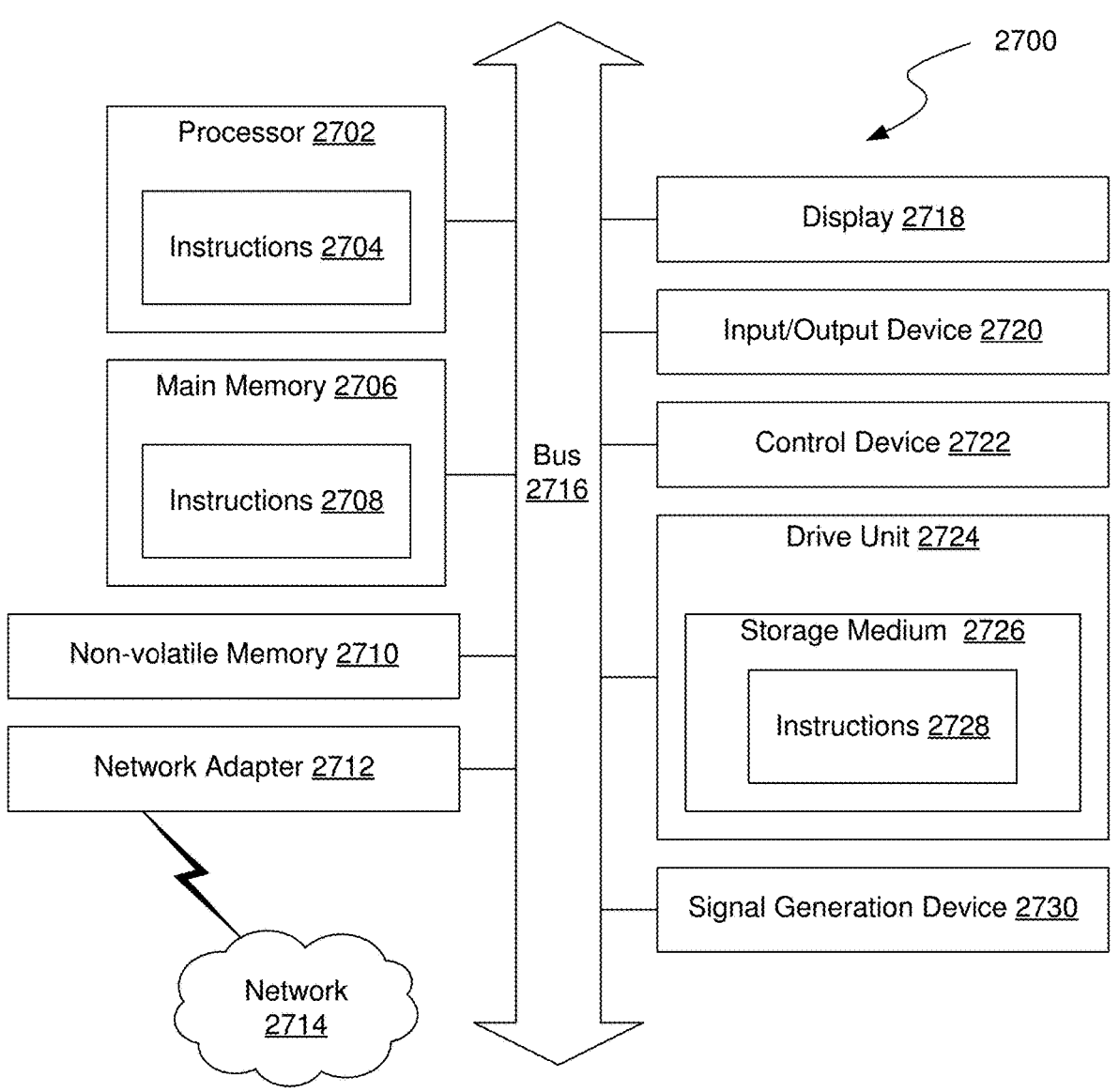
FIG. 27 shows a block diagram of an example of a processing system in which at least some operations described in this disclosure can be implemented.

FIG. 27 is a block diagram illustrating an example of a processing system 2700 in which at least some operations described in this disclosure can be implemented. The example processing system 2700 may be part of any of the aforementioned devices including, but not limited to UAV 100 and mobile device 104. The processing system 2700 may include one or more central processing units ("processors") 2702, main memory 2706, non-volatile memory 2710, network adapter 2712 (e.g., network interfaces), display 2718, input/output devices 2720, control device 2722 (e.g., keyboard and pointing devices), drive unit 2724 including a storage medium 2726, and signal generation device 2730 that are communicatively connected to a bus 2716. The bus 2716 is illustrated as an abstraction that represents any one or more separate physical buses, point to point connections, or both connected by appropriate bridges, adapters, or controllers. The bus 2716, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also called "Firewire"). A bus may also be responsible for relaying data packets (e.g., via full or half duplex wires) between components of the network appliance, such as the switching fabric, network port(s), tool port(s), etc.

In various embodiments, the processing system 2700 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 2706, non-volatile memory 2710, and storage medium 2726 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 2728. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 2704, 2708, 2728) set at various times in various memory and storage devices in a computer, and that, when read and executed by one or more processing units or processors 2702, cause the processing system 2700 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 2710, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 2712 enables the processing system 2700 to mediate data in a network 2714 with an entity that is external to the processing system 2700, such as a network appliance, through any known and/or convenient communications protocol supported by the processing system 2700 and the external entity. The network adapter 2712 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 2712 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for autonomous control of an unmanned aerial vehicle (UAV) through a physical environment using behavioral objectives defined via a navigation application programming interface (API), the method comprising:

receiving, by a computer system, sensor data from a sensor onboard the UAV;

receiving, at the API, information indicative of a behavioral objective;

exposing, via a public-facing navigation API of the UAV, parameterizations of the behavioral objective to a third-party application;

receiving, at the API from the third-party application, a call that sets or modifies one or more parameters of the behavioral objective, the parameters including at least one of: a target, a dead-zone region about the target, or a weighting factor;

inputting, by the computer system, the sensor data and the one or more parameters into a multi-objective trajectory generation process to generate a proposed trajectory that most closely satisfies the behavioral objective in view of another behavioral objective or constraint;

enforcing, by the computing system, one or more built-in safety objectives including obstacle avoidance and airframe dynamic limits as immutable constraints that are not alterable via the API; and generating, by the computer system, control commands configured to cause the UAV to autonomously maneuver through the physical environment based on the proposed trajectory.

2. The method of claim 1, wherein the behavioral objective is defined relative to a semantic understanding of the physical environment and requires maintaining saliency of a specified object class or activity in captured images, including avoiding backlighting of a tracked subject.

3. The method of claim 1, wherein the multi-objective trajectory generation is performed continually as updated sensor data and/or updated parameters of the behavioral objective are received, and wherein API-provided parameter updates are validated against one or more immutable safety objectives, any parameter update that would violate a safety objective is rejected, and each rejected update is recorded in an audit log.

4. The method of claim 1, wherein the dead-zone region defines a tolerance region around the target within which the multi-objective trajectory generation refrains from adjusting the proposed trajectory.

5. The method of claim 1, wherein the multi-objective trajectory generation is performed continually as updated sensor data and/or updated parameters are received.

6. The method of claim 1, wherein the weighting factor defines a relative influence of the behavioral objective with respect to another behavioral objective or constraint.

7. The method of claim 1, further comprising logging the parameters received from the third-party application and a hash of the generated trajectory to an audit record.

8. The method of claim 1, wherein the built-in safety objectives include collision-avoidance and conformance with vehicle dynamic limitations.

9. The method of claim 1, wherein the multi-objective trajectory generation selects among candidate trajectories by minimizing a weighted cost function of the behavioral objective and the built-in safety objectives.

10. An unmanned aerial vehicle (UAV) configured for autonomous flight through a physical environment, the UAV comprising:

an image capture device; and a navigation system including an application programming interface (API), the navigation system configured to:

expose information indicative of a behavioral objective;

receive information indicative of a behavioral objective;

parameterize the behavioral objective by receiving, from a third-party application, a call that sets or modifies one or more parameters of the behavioral objective, the parameters including at least one of: a target, a dead-zone region about the target, or a weighting factor;

input sensor data and the one or more parameters into a multi-objective trajectory generation process to generate a proposed trajectory that most closely satisfies the behavioral objective in view of another behavioral objective or constraint;

enforce one or more built-in safety objectives including obstacle avoidance and airframe dynamic limits as immutable constraints that are not alterable via the API; and generate control commands configured to cause the UAV to autonomously maneuver through the physical environment based on the proposed trajectory.

11. The UAV of claim 10, wherein the dead-zone region defines a tolerance region around the target within which the multi-objective trajectory generation refrains from adjusting the proposed trajectory.

12. The UAV of claim 10, wherein the weighting factor defines a relative influence of the behavioral objective with respect to another behavioral objective or constraint.

13. The UAV of claim 10, wherein the built-in safety objectives include collision-avoidance and conformance with vehicle dynamic limitations.

14. The UAV of claim 10, further configured to continually perform multi-objective trajectory generation as updated sensor data and/or updated parameters are received.

15. The UAV of claim 10, wherein the API receives and the UAV persists a record of the parameter values and associates the record with a corresponding flight log.

16. An apparatus comprising:

one or more non-transitory storage media; and instructions stored on the one or more non-transitory storage media that, when executed by one or more processors, cause the one or more processors to:

receive sensor data from a sensor onboard an unmanned aerial vehicle (UAV);

receive information indicative of a behavioral objective;

expose parameterizations of a behavioral objective to a third-party application;

receive a call that sets or modifies one or more parameters of the behavioral objective, the parameters including at least one of: a target, a dead-zone region about the target, or a weighting factor;

input the sensor data and the one or more parameters into a multi-objective trajectory generation process to generate a proposed trajectory that most closely satisfies the behavioral objective in view of another behavioral objective or constraint;

enforce one or more built-in safety objectives including obstacle avoidance and airframe dynamic limits as immutable constraints that are not alterable via the third-party application; and generate control commands configured to cause the UAV to autonomously maneuver through the physical environment based on the proposed trajectory.

17. The apparatus of claim 16, wherein the dead-zone region defines a tolerance region around the target within which the multi-objective trajectory generation refrains from adjusting the proposed trajectory.

18. The apparatus of claim 16, wherein the multi-objective trajectory generation is performed continually as updated sensor data and/or updated parameters are received.

19. The apparatus of claim 16, wherein the weighting factor defines a relative influence of the behavioral objective with respect to another behavioral objective or constraint.

* * * * *